United States Patent
Presby

(10) Patent No.: US 9,783,439 B2
(45) Date of Patent: Oct. 10, 2017

(54) MODULAR LIQUID WASTE TREATMENT SYSTEM AND METHOD

(71) Applicant: Presby Patent Trust, Whitefield, NH (US)

(72) Inventor: David W. Presby, Sugar Hill, NH (US)

(73) Assignee: PRESBY PATENT TRUST, Whitefield, NH (US)

( * ) Notice: Subject to any disclaimer, the term of this patent is extended or adjusted under 35 U.S.C. 154(b) by 64 days.

(21) Appl. No.: 14/716,572

(22) Filed: May 19, 2015

(65) Prior Publication Data
US 2015/0329396 A1    Nov. 19, 2015

Related U.S. Application Data

(60) Provisional application No. 62/000,241, filed on May 19, 2014.

(51) Int. Cl.
*E02B 11/00*    (2006.01)
*E02B 13/00*    (2006.01)
(Continued)

(52) U.S. Cl.
CPC .............. *C02F 3/046* (2013.01); *C02F 1/281* (2013.01); *C02F 1/283* (2013.01); *C02F 1/285* (2013.01);
(Continued)

(58) Field of Classification Search
CPC ........ E03F 1/005; E02B 11/005; C02F 3/288; C02F 1/006; C02F 3/046; C02F 1/285; C02F 3/104
(Continued)

(56) References Cited

U.S. PATENT DOCUMENTS 2,518,292 A * 8/1950 De Anglis ................ E03F 5/02
                                                      285/125.1
5,954,451 A * 9/1999 Presby .................... B01D 29/23
                                                      405/36
(Continued)

FOREIGN PATENT DOCUMENTS

JP      11319863        11/1999
JP      2007111599      5/2007
(Continued)

OTHER PUBLICATIONS

International Search Report and Written Opinion received in PCT Application No. PCT/US2015/031602, mail date Aug. 19, 2015, 14 pages.
(Continued)

*Primary Examiner* — Claire Norris
(74) *Attorney, Agent, or Firm* — Finch & Maloney PLLC

(57) ABSTRACT

A modular liquid waste treatment system is disclosed. In accordance with some embodiments, the system includes a central distribution unit and one or more treatment fins in flow communication therewith. The distribution unit may be configured to receive liquid waste from a given source and distribute that waste, at least in part, to one or more treatment fins. In turn, bacteria present in a given treatment fin treat the liquid waste, and the resultant treated liquid may drain from the fin to the surrounding environment. In some embodiments, a given treatment fin may include porous media providing a large surface area on which bacteria may grow to facilitate treatment. The system may be installed in and/or above the ground, and in some cases may be surrounded, at least in part, with treatment sand and/or other treatment media. The system may be used in aerobic and/or anaerobic processing of liquid waste.

24 Claims, 23 Drawing Sheets

(51) Int. Cl.
*C02F 3/10* (2006.01)
*C02F 3/04* (2006.01)
*C02F 3/28* (2006.01)
*C02F 1/28* (2006.01)
*C02F 1/44* (2006.01)
*C02F 1/32* (2006.01)
*C02F 1/76* (2006.01)

(52) U.S. Cl.
CPC ............... *C02F 1/44* (2013.01); *C02F 3/105* (2013.01); *C02F 3/108* (2013.01); *C02F 3/28* (2013.01); *C02F 1/32* (2013.01); *C02F 1/76* (2013.01); *C02F 2201/002* (2013.01); *C02F 2301/046* (2013.01); *C02F 2303/04* (2013.01); *Y02W 10/15* (2015.05)

(58) Field of Classification Search
USPC ....... 405/43, 45, 36, 49, 50, 51; 210/170.08, 210/170.03
See application file for complete search history.

(56) References Cited

U.S. PATENT DOCUMENTS

| | | | |
|---|---|---|---|
| 6,406,619 B1 | 6/2002 | Donald et al. | |
| 7,309,423 B1 | 12/2007 | Branz | |
| 8,104,994 B1 | 1/2012 | Donlin | |
| 8,777,515 B1* | 7/2014 | Donlin | E02B 11/005 405/36 |
| 8,857,641 B1* | 10/2014 | Moore, Jr. | B65D 88/06 220/4.12 |
| 2001/0007309 A1 | 7/2001 | Malone et al. | |
| 2002/0043497 A1* | 4/2002 | Wallace | C02F 3/046 210/605 |
| 2010/0304024 A1 | 12/2010 | Ohanessian | |
| 2011/0062069 A1 | 3/2011 | Couch et al. | |
| 2011/0284477 A1* | 11/2011 | Presby | C02F 3/288 210/750 |

FOREIGN PATENT DOCUMENTS

JP 2012081396 4/2012
WO 03046295 A2 6/2003

OTHER PUBLICATIONS

Eljen Corporation, "Eljen GSF Geotextile Sand Filter—How the Eljen GSF System Works," http://www.eljen.com/Pages/GSF/GSFhowworks.html, downloaded Feb. 24, 2014, 2 pages.

Eljen Corporation, "Mantis Wastewater Leaching System—How the Mantis System Works," http://www.eljen.com/Pages/MantisGSF/Mantishowworks.html, downloaded Feb. 24, 2015, 2 pages.

The Natural Home Building Source—TheNaturalHome.com—"Greywater disposal systems and recycling kits for graywater reuse with irrigation," http://www.thenaturalhome.com/greywater.html, downloaded Feb. 28, 2014, 13 pages.

* cited by examiner

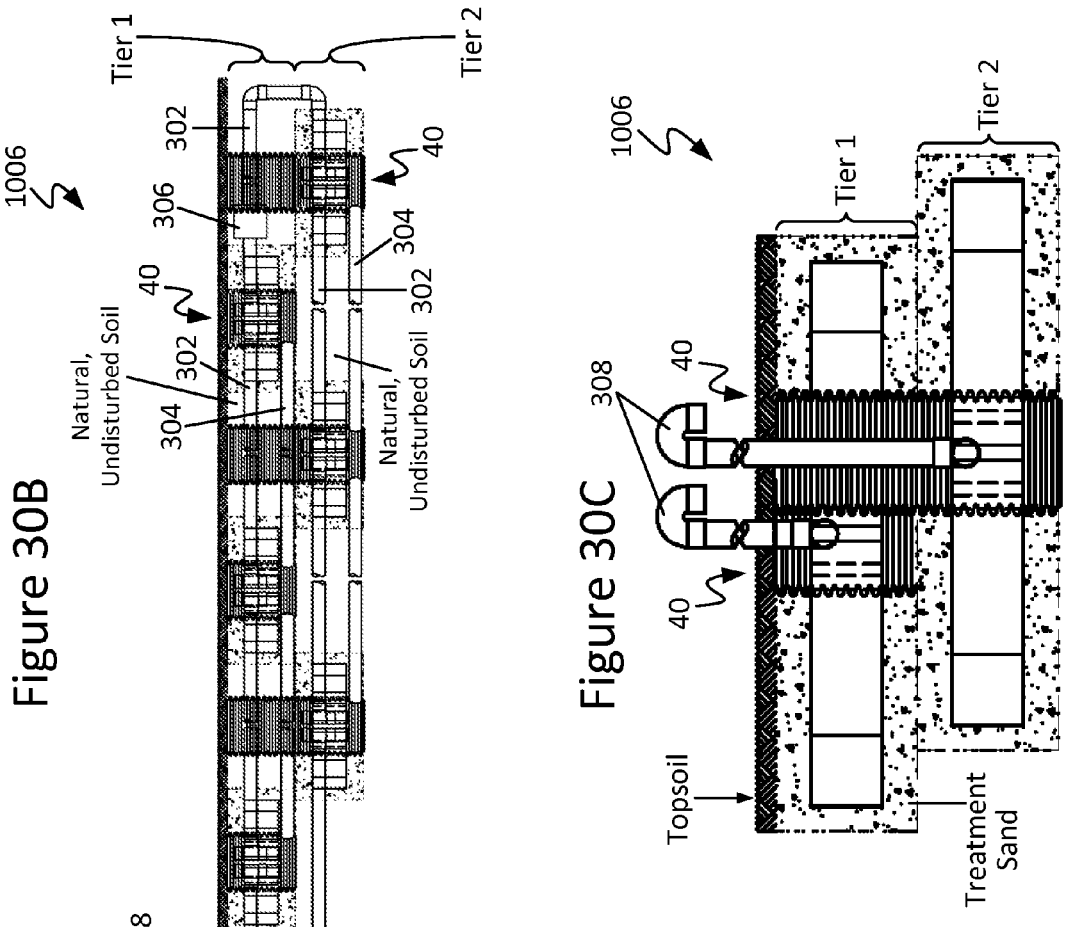
Figure 30A
Figure 30B
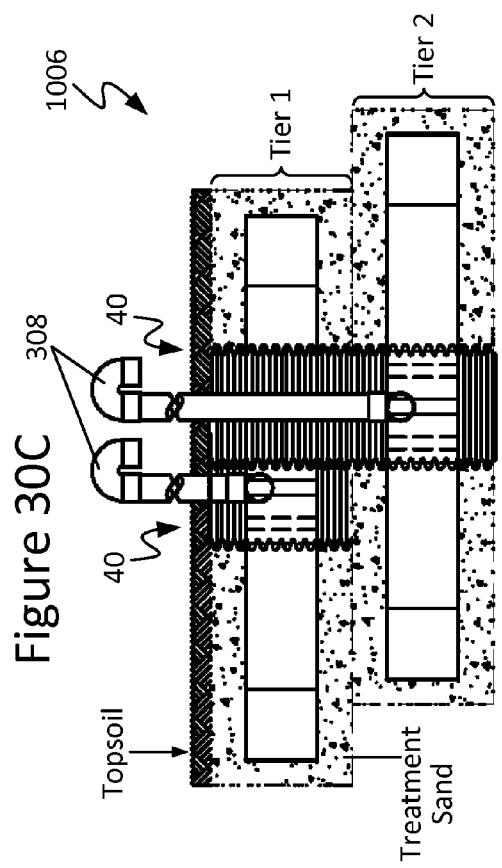
Figure 30C

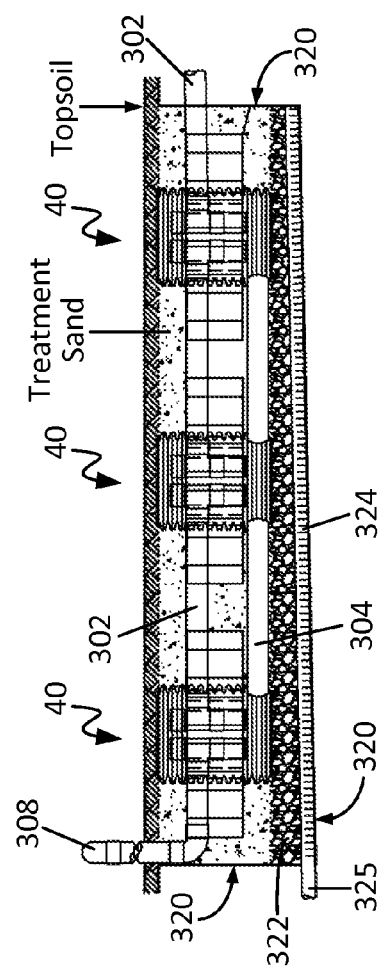
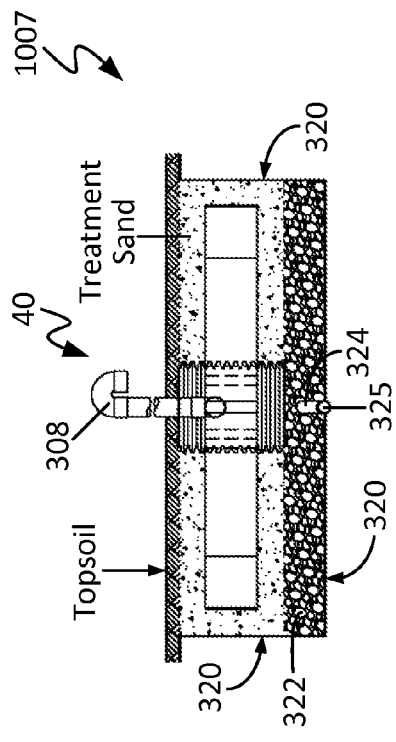
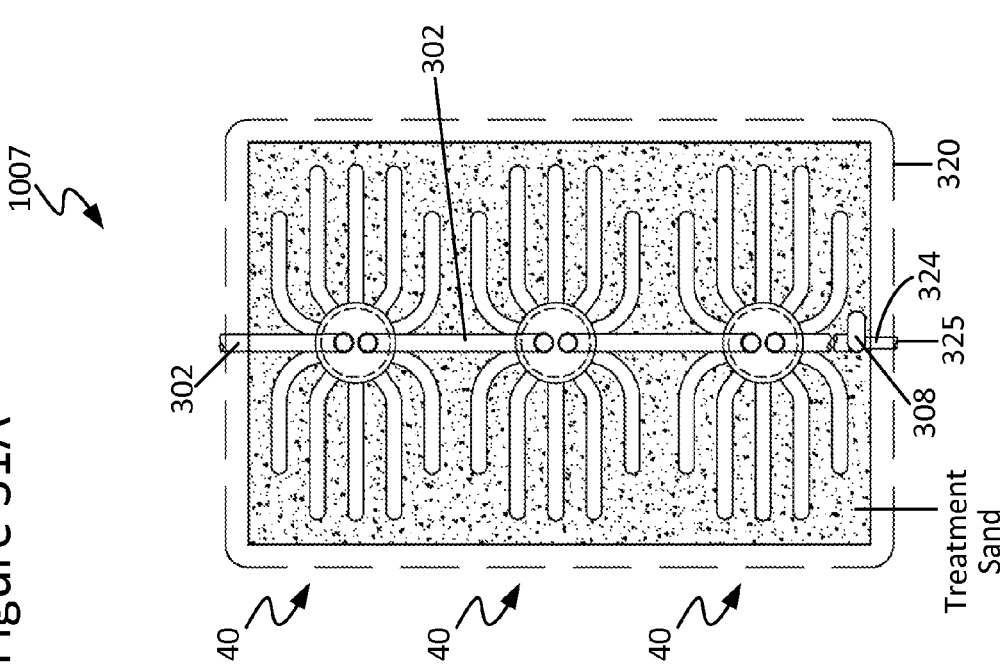
Figure 31A
Figure 31B
Figure 31C

MODULAR LIQUID WASTE TREATMENT SYSTEM AND METHOD

CROSS-REFERENCE TO RELATED APPLICATIONS

This patent application claims the benefit of U.S. Provisional Patent Application No. 62/000,241, titled "Modular Liquid Waste Treatment System and Method," filed on May 19, 2014, which is herein incorporated by reference in its entirety.

FIELD OF THE DISCLOSURE

The present disclosure relates to treatment of liquid waste, and more particularly to treatment of wastewater and septic effluent.

BACKGROUND

Common liquid waste treatment options include aerobic digestion and anaerobic digestion. In the bacterial process known as aerobic digestion, microorganisms break down biodegradable material in the presence of oxygen. In such aerobic processes, gaseous byproducts may be produced including, for example, carbon dioxide. In the bacterial process known as anaerobic digestion, microorganisms break down biodegradable material in the absence of oxygen. In such anaerobic processes, gaseous byproducts may be produced including, for example, methane.

SUMMARY

One example embodiment provides a liquid waste treatment system including: a distribution unit having an interior and an exterior and including a sidewall portion defining one or more passageways; and at least one treatment fin external to the distribution unit and in flow communication with its interior via the one or more passageways, the at least one treatment fin including: a porous medium; and an outer fabric layer at least partially surrounding the porous medium. In some cases, the distribution unit is substantially cylindrical and has an average width/diameter in the range of about 2-48 inches. In some instances, the distribution unit has a length in the range of about 12-120 inches. In some cases, the distribution unit length is configured to be oriented substantially vertically with respect to the ground. In some instances, the distribution unit is a distribution box. In some cases, the distribution unit further includes: a headspace portion formed above the one or more passageways; and a sump portion formed below the one or more passageways. In some instances, the system further includes: a first opening positioned above the one or more passageways and extending through the sidewall portion of the distribution unit; an inlet baffle disposed within the distribution unit and aligned with the first opening; a second opening positioned above the one or more passageways and extending through the sidewall portion of the distribution unit; and an outlet baffle disposed within the distribution unit and aligned with the second opening. In some cases, the system further includes at least one of: a source of liquid waste coupled with the inlet baffle through the first opening; and/or a vent stack coupled with the outlet baffle through the second opening. In some instances, the distribution unit is a corrugated conduit of at least one of cylindrical and/or prismatic shape. In some cases, the distribution unit further includes one or more skimmer tabs disposed within its interior over its sidewall portion. In some instances, the sidewall portion of the distribution unit includes one or more ridges disposed along its exterior over its sidewall portion. In some cases, the sidewall portion defines a plurality of passageways, each passageway having a dimension in the range of about 0.01-1.5 inches across the sidewall portion. In some instances, the plurality of passageways is vertically aligned along the sidewall portion. In some cases, the porous medium includes coarse, randomly distributed fibers. In some instances, the porous medium includes at least one of coarse sand, stone, and/or gravel. In some cases, the porous medium includes at least one of polymeric beads and/or glass beads. In some instances, the porous medium includes carbon blocks. In some cases, the porous medium includes a natural aggregate. In some instances, the porous medium includes a synthetic aggregate. In some cases, the porous medium includes at least one of polypropylene, polyethylene, and/or polystyrene. In some instances, the outer fabric layer includes at least one of polypropylene, polyethylene, and/or polyester fabric. In some instances, the outer fabric layer includes a geotextile fabric. In some cases, the at least one treatment fin further includes a semi-permeable or impermeable barrier layer disposed within the porous medium, and there is space between the outer layer and the barrier layer, the space filled at least partially with the porous medium. In some instances, the barrier layer is a partial layer that surrounds less than the total volume of the porous medium. In some cases, the barrier layer includes at least one of polypropylene, polyethylene, and/or polyester fabric. In some instances, the barrier layer includes a geotextile fabric. In some cases, the at least one treatment fin further includes a plurality of semi-permeable or impermeable barrier layers disposed within the porous medium, wherein: there is space between adjacent barrier layers, the space filled at least partially with the porous medium; and each successive barrier layer, going from innermost to outermost, is of at least one of greater surface area and/or greater size than one before it. In some instances, the at least one treatment fin further includes a plurality of semi-permeable or impermeable barrier layers disposed within the porous medium, wherein: there is space between adjacent barrier layers, the space filled at least partially with the porous medium; and each successive barrier layer, going from innermost to outermost, is of at least one of lesser surface area and/or lesser size than one before it. In some cases, at least one of the plurality of semi-permeable or impermeable barrier layers is a partial layer that surrounds less than the total volume of the porous medium. In some instances, the plurality of semi-permeable or impermeable barrier layers includes: a first impermeable barrier layer forming a reservoir having a first volume; and a second impermeable barrier layer positioned outside of the first impermeable barrier layer and forming a second volume greater than the first volume. In some cases, the at least one treatment fin further includes at least one pipe disposed within the porous medium and coupled with at least one of the one or more passageways defined by the sidewall portion of the distribution unit. In some instances, at least a portion of the at least one pipe is perforated. In some cases, at least a portion of the at least one pipe is corrugated. In some instances, the at least one pipe is configured to permit air flow within the at least one treatment fin. In some cases, the system further includes at least one of: a source of liquid waste coupled with the at least one pipe; and/or a vent stack coupled with the at least one pipe. In some instances, the system further includes an aeration pump configured to agitate liquid waste contained within the distribution unit, wherein the aeration pump is either:disposed within the interior of the distribution unit; or external to the distribution unit and coupled with the interior of the distribution unit via a hose or conduit. In some cases, the system further includes a discharge pump configured to discharge liquid waste from the interior of the distribution unit, wherein the discharge pump is disposed within the interior of the distribution unit. In some instances, the at least one treatment fin has a curvilinear cross-sectional geometry. In some cases, the at least one treatment fin has a polygonal cross-sectional geometry. In some instances, the at least one treatment fin has an average width/diameter in the range of about 3-18 inches. In some cases, the at least one treatment fin has an average height in the range of about 6-24 inches. In some instances, the at least one treatment fin has a length in the range of about 24-84 inches. In some cases, the at least one treatment fin has a uniform profile along its length. In some instances, the at least one treatment fin has a non-uniform profile along its length. In some cases, the at least one treatment fin has a uniform cross-sectional profile. In some instances, the at least one treatment fin has a non-uniform cross-sectional profile. In some cases, the system further includes a treatment material surrounding at least one of the distribution unit and/or the at least one treatment fin, the treatment material including at least one of treatment sand, crushed stone, gravel, soil, natural aggregate, synthetic aggregate, glass beads, polymer beads, expanded polymer beads, organic material, cellulose, and/or a combination of any one or more thereof. In some instances, the system further includes a liner surrounding at least a portion of the treatment sand, wherein the liner includes an impermeable or semi-permeable material. In some cases, a first portion of the liner differs in permeability as compared to a second portion of the liner. In some instances, the system further includes a drainage material disposed between the liner and at least one of the distribution unit and/or the at least one treatment fin. In some cases, the at least one treatment fin has a volume of about one gallon or greater. In some instances, the system includes a single distribution unit and exhibits a total treatment fin surface area of greater than about 10 $ft^2$. In some cases, the at least one treatment fin includes at least one of a bacterial layer and/or a filtration layer. In some instances, the at least one treatment fin is flexible and can be wrapped around a 6 inch-diameter pipe without breakage. In some cases, the at least one treatment fin is malleable such that its thickness can be changed by ±10% without causing damage thereto. In some instances, the system includes at least four treatment fins. In some cases, the system includes two or more treatment fins that extend radially in a horizontal plane from the distribution unit. In some instances, the distribution unit and the at least one treatment fin in flow communication therewith can treat an amount of liquid waste associated with one bedroom. In some cases, the distribution unit and the at least one treatment fin in flow communication therewith can treat an amount of liquid waste associated with two or more bedrooms. In some instances, the system covers less than 250 $ft^2$ of land and is configured to treat an amount of liquid waste associated with a four bedroom house. In some cases, the at least one treatment fin has an exterior surface area greater than an exterior surface area of the distribution unit. In some instances, the system is further configured to provide for at least one of recirculation and/or denitrification of the liquid waste. In some cases, a system is provided, the system including: a first treatment cell including a first liquid waste treatment system configured as described herein; and a second treatment cell including a second liquid waste treatment system configured as described herein; wherein the first treatment cell is configured to be positioned at a first depth with respect to the ground and the second treatment cell is configured to be positioned at a different second depth with respect to the ground. In some cases, a system is provided, the system including: a first treatment cell including a first liquid waste treatment system configured as described herein, the first treatment cell having an areal footprint of X $ft^2$; and a second treatment cell including a second liquid waste treatment system configured as described herein, the second treatment cell having an areal footprint of Y $ft^2$; wherein the first and second treatment cells are installed in an area that is less than X $ft^2$+Y $ft^2$.

Another example embodiment provides a method of treating liquid waste, the method including: passing liquid waste through a sidewall of a distribution unit into a treatment fin in flow communication with the distribution unit, the treatment fin including a porous medium; treating the liquid waste via bacterial digestion by passing the liquid waste through the porous medium of the treatment fin; and passing the resultant treated liquid from the treatment fin. In some cases, bacterial digestion occurs at least one of in and/or on the treatment fin. In some instances, passing the resultant treated liquid from the treatment fin includes: passing the resultant treated liquid into a medium surrounding the treatment fin. In some cases, the medium surrounding the treatment fin includes at least one of treatment sand, crushed stone, gravel, soil, natural aggregate, synthetic aggregate, glass beads, polymer beads, expanded polymer beads, organic material, cellulose, and/or a combination of any one or more thereof. In some instances, the method further includes: settling the liquid waste in the distribution unit. In some cases, the method further includes: flowing liquid waste from the distribution unit to a second distribution unit via a discharge pump. In some instances, the method further includes: flowing liquid waste from the distribution unit to a second distribution unit via gravitational force only. In some cases, the method further includes: reducing biochemical oxygen demand (BOD) of the liquid waste by about 90% or greater. In some instances, the liquid waste passed through the sidewall of the distribution unit into the treatment fin passes into only a lower portion of that treatment fin. In some cases, the method further includes: retaining liquid in a lower portion of the treatment fin. In some instances, the method further includes: flowing sump fluid of the liquid waste from the distribution unit into a second distribution unit. In some cases, the method further includes: allowing solids to settle from the liquid waste in the distribution unit. In some instances, the treatment fin includes a permeable layer covering at least a portion of the porous medium, and passing the resultant treated liquid from the treatment fin includes: passing the resultant treated liquid through the permeable layer. In some cases, the permeable layer includes at least one of polypropylene, polyethylene, and/or polyester fabric. In some instances, the permeable layer includes a geotextile fabric. In some cases, the treatment fin includes at least one semi-permeable or impermeable barrier layer disposed within the porous medium, and passing the resultant treated liquid from the treatment fin includes: collecting liquid in a volume formed by the at least one barrier layer. In some instances, the at least one semi-permeable or impermeable barrier layer is a partial layer that surrounds less than the total volume of the porous medium. In some cases, the at least one semi-permeable or impermeable barrier layer includes at least one of polypropylene, polyethylene, and/or polyester fabric. In some instances, the at least one semi-permeable or impermeable barrier layer includes a geotextile fabric. In some cases, the at least one semi-permeable or impermeable barrier layer is a plurality of semi-permeable or impermeable barrier layers, there is space between adjacent barrier layers, the space filled at least partially with the porous medium, and each successive barrier layer, going from innermost to outermost, is of at least one of greater surface area and/or greater size than one before it. In some instances, the at least one semi-permeable or impermeable barrier layer is a plurality of semi-permeable or impermeable barrier layers, there is space between adjacent barrier layers, the space filled at least partially with the porous medium, and each successive barrier layer, going from innermost to outermost, is of at least one of lesser surface area and/or lesser size than one before it. In some cases, at least one of the plurality of semi-permeable or impermeable barrier layers is a partial layer that surrounds less than the total volume of the porous medium. In some instances, the method further includes at least one of: drawing air from a surrounding environment into the distribution unit via a vent stack coupled with the distribution unit; and/or venting gas from the distribution unit into a surrounding environment via a vent stack coupled with the distribution unit. In some cases, the method further includes: treating the liquid waste via at least one of recirculation and/or denitrification. In some instances, the liquid waste includes at least one of sewage, septic effluent, industrial effluent, contaminated groundwater, household wastewater, and/or storm runoff.

Another example embodiment provides a liquid waste treatment system including: a first treatment cell including: a first distribution unit including a sidewall, the first distribution unit including: a first sump portion in a lower portion of the first distribution unit; a first headspace portion in an upper portion of the first distribution unit; and a first middle portion positioned between the first sump portion and the first headspace portion, the sidewall of the first middle portion defining a first passageway; and at least one treatment fin in flow communication to an interior of the first middle portion via the first passageway, wherein the at least one treatment fin includes a porous medium. In some cases, the system further includes: a second treatment cell downstream of the first treatment cell, the second treatment cell including: a second distribution unit including a sidewall, the second distribution unit including: a second sump portion in a lower portion of the second distribution unit; a second headspace portion in an upper portion of the second distribution unit; and a second middle portion positioned between the second sump portion and the second headspace portion, the sidewall of the second middle portion defining a second passageway; and at least one treatment fin in flow communication to an interior of the second middle portion via the second passageway, wherein the at least one treatment fin includes a porous medium. In some instances, the first distribution unit is in direct flow communication with the second distribution unit. In some cases, the first sump portion is in direct flow communication with the second sump portion. In some instances, the first middle portion is in direct flow communication with the second middle portion. In some cases, the system further includes a vent stack in flow communication with the first headspace and the second headspace. In some instances, the first treatment cell is elevated in relation to the second treatment cell. In some cases, the first treatment cell is configured to be positioned at a first depth with respect to the ground and the second treatment cell is configured to be positioned at a different second depth with respect to the ground. In some instances, at least one of the first treatment cell and/or the second treatment cell is in flow communication with a distribution box. In some cases, the first and second treatment cells at least partially interlock with one another.

Another example embodiment provides a liquid waste treatment apparatus including: a porous medium; and a first fabric layer at least partially surrounding the porous medium; wherein a first portion of the apparatus is configured to be in flow communication with a source of liquid waste. In some cases, a second portion of the apparatus is configured to be in flow communication with the source of liquid waste. In some instances, the porous medium includes coarse, randomly distributed fibers. In some cases, the porous medium includes at least one of coarse sand, stone, and/or gravel. In some instances, the porous medium includes at least one of polymeric beads and/or glass beads. In some cases, the porous medium includes carbon blocks. In some instances, the porous medium includes a natural aggregate. In some cases, the porous medium includes a synthetic aggregate. In some instances, the porous medium includes at least one of polypropylene, polyethylene, and/or polystyrene. In some cases, the outer fabric layer includes at least one of polypropylene, polyethylene, and/or polyester fabric. In some instances, the outer fabric layer includes a geotextile fabric. In some cases, the apparatus further includes a semi-permeable or impermeable barrier layer disposed within the porous medium, wherein there is space between the outer layer and the barrier layer, the space filled at least partially with the porous medium. In some instances, the barrier layer is a partial layer that surrounds less than the total volume of the porous medium. In some cases, the barrier layer includes at least one of polypropylene, polyethylene, and/or polyester fabric. In some instances, the barrier layer includes a geotextile fabric. In some cases, the apparatus further includes a plurality of semi-permeable or impermeable barrier layers disposed within the porous medium, wherein each successive barrier layer, going from innermost to outermost, is of at least one of greater surface area and/or greater size than one before it. In some instances, the apparatus further includes a plurality of semi-permeable or impermeable barrier layers disposed within the porous medium, wherein each successive barrier layer, going from innermost to outermost, is of at least one of lesser surface area and/or lesser size than one before it. In some cases, at least one of the plurality of semi-permeable or impermeable barrier layers is a partial layer that surrounds less than the total volume of the porous medium. In some cases, the apparatus further includes at least one pipe disposed within the porous medium. In some instances, at least a portion of the at least one pipe is perforated. In some cases, at least a portion of the at least one pipe is corrugated. In some instances, the at least one pipe is configured to permit air flow within the apparatus. In some cases, the at least one pipe is configured to be coupled with at least one of a source of liquid waste and/or a vent stack. In some instances, the apparatus has a curvilinear cross-sectional geometry. In some cases, the apparatus has a polygonal cross-sectional geometry. In some instances, the apparatus has an average width/diameter in the range of about 3-18 inches. In some cases, the apparatus has an average height in the range of about 6-24 inches. In some instances, the apparatus has a length in the range of about 24-84 inches. In some cases, the apparatus has a uniform profile along its length. In some instances, the apparatus has a non-uniform profile along its length. In some cases, the apparatus has a uniform cross-sectional profile. In some instances, the apparatus has a non-uniform cross-sectional profile. In some cases, the apparatus has a volume of about one gallon or greater. In some instances, the apparatus further includes at least one of a bacterial layer and/or a filtration layer. In some cases, the apparatus is flexible and can be wrapped around a 6 inch-diameter pipe without breakage. In some instances, the source of liquid waste includes a distribution box.

Another example embodiment provides a treatment fin for treating wastewater, the treatment fin including: an interior portion having a first volume at least partially filled with a porous medium; a fabric layer surrounding at least a portion of the porous medium; and a passageway providing flow communication between the porous medium and an exterior of the treatment fin, the passageway configured to make a fluid flow connection with a wastewater source. In some cases, the porous medium has a volume that is at least 90% of the first volume. In some instances, the porous medium has a pore volume of greater than 20%. In some cases, the porous medium has a pore volume of greater than 50%. In some instances, the porous medium has a pore volume of less than 50%. In some cases, the porous medium has a pore volume of less than 20%. In some instances, the porous medium provides a surface area that is more than five times an outer surface area of the treatment fin. In some cases, the porous medium provides a surface area that is more than twenty times an outer surface area of the treatment fin. In some instances, the treatment fin has at least one of a circular, oblong, oval, ellipsoidal, and polygonal cross-sectional shape. In some cases, the treatment fin has a cross-sectional shape that changes in at least one of size and/or geometry from a first end to a second end thereof. In some instances, the first end includes the passageway. In some cases, the fabric layer is semi-permeable and is configured to reduce a flow of water through the treatment fin as compared to a flow of water that would occur in the absence of the semi-permeable fabric layer. In some instances, the treatment fin further includes a second fabric layer positioned in the porous medium and configured to retain water and reduce a flow of water downwardly through the porous medium and, optionally, without reducing longitudinal flow of water through the porous medium. In some cases, the treatment fin further includes a third fabric layer positioned in the porous medium and nested with the second fabric layer, wherein there is space between the second and third fabric layers, as well as between the first and second fabric layers. In some instances, the porous medium fills the space between the second and third fabric layers. In some cases, the treatment fin has a flexibility allowing at least a portion thereof to be wrapped around a 6 inch, 12 inch, 18 inch, or 24 inch radius without breaching the fabric layer and without preventing fluid flow through the porous medium. In some instances, the entire treatment fin has the flexibility. In some cases, a wastewater treatment system is provided, the system including at least one treatment fin configured as described herein, wherein the at least one treatment fin is in flow communication with a wastewater source. In some instances, the wastewater source includes at least one of a septic tank, a distribution box, and a storm drain. In some cases, the system is configured to treat household wastewater. In some instances, the at least one treatment fin is a plurality of treatment fins extending radially from a distribution unit in flow communication with the plurality of treatment fins. In some cases, the plurality of treatment fins is attached by a shared sleeve configured to secure the plurality in flow communication with the distribution unit. In some instances, the at least one treatment fin is two treatment fins, the two treatment fins sharing a common passageway in flow communication with a distribution unit. In some cases, the at least one treatment fin is a plurality of treatment fins installed in an asymmetrical pattern. In some instances, the at least one treatment fin is a plurality of treatment fins installed in a symmetrical pattern. In some cases, the at least one treatment fin is a plurality of treatment fins configured such that a horizontal plane passes through each treatment fin of the plurality. In some instances, the at least one treatment fin is a plurality of treatment fins configured such that a horizontal plane passes through at least one, but not all, treatment fins of the plurality. In some cases, the at least one treatment fin is a plurality of treatment fins, and wherein at least two of the treatment fins are positioned at different depths. In some instances, the at least one treatment fin is a plurality of treatment fins, and wherein at least two of the treatment fins are configured with different shapes. In some cases, the at least one treatment fin includes at least two passageways and is in flow communication with a distribution unit at more than one location. In some instances, the at least one treatment fin is a plurality of treatment fins, and wherein at least two of the treatment fins are positioned substantially parallel to one another. In some cases, the wastewater treatment system includes at least a first treatment cell and a second treatment cell, wherein each of the first and second treatment cells includes at least one of the at least one treatment fin in flow communication with at least one distribution unit. In some instances, the first treatment cell has a first areal footprint; the second treatment cell has a second areal footprint; and the first and second areal footprints at least partially overlap one another. In some cases, the first and second treatment cells are in parallel flow communication with a wastewater source. In some instances, the first and second treatment cells are in serial flow communication with a wastewater source. In some cases, the wastewater treatment system further includes at least a third treatment cell and a fourth treatment cell, wherein: at least two treatment cells are in serial flow communication with one another; and at least two treatment cells are in parallel flow communication with a wastewater source. In some instances, at least two treatment cells are in serial flow communication with one another, and at least one treatment cell is downhill of another. In some cases, at least one of the at least one treatment fin is in contact with a porous material including at least one of treatment sand, crushed stone, gravel, soil, natural aggregate, synthetic aggregate, glass beads, polymer beads, expanded polymer beads, organic material, cellulose, and a combination of any one or more thereof. In some instances, any portion of the at least one treatment fin not contacting a distribution unit is surrounded by the porous medium. In some cases, a first treatment cell has an areal footprint of X $ft^2$; a second treatment cell has an areal footprint of Y $ft^2$; and the first and second treatment cells are installed in an area that is less than X $ft^2$+Y $ft^2$. In some instances, the interior portion of the treatment fin includes: a first section containing the porous medium; and a second section that is devoid of the porous medium. In some cases, the first section is separated from the second section by a rigid framework. In some instances, the rigid framework is configured to allow fluid flow there through and prevent passage of the porous medium there through.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

BRIEF DESCRIPTION OF THE DRAWINGS

FIG. 30A is a plan view of a multi-tiered arrangement of rectangular treatment cells configured in accordance with an embodiment of the present disclosure.

FIG. 30B is a side view of the multi-tiered arrangement of FIG. 30A.

FIG. 30C is another side view of the multi-tiered arrangement of FIG. 30A.

FIG. 31A is a plan view of a serial arrangement of rectangular treatment cells configured in accordance with another embodiment of the present disclosure.

FIG. 31B is a side view of the serial arrangement of FIG. 31A.

FIG. 31C is another side view of the serial arrangement of FIG. 31A.

Figure 1A:
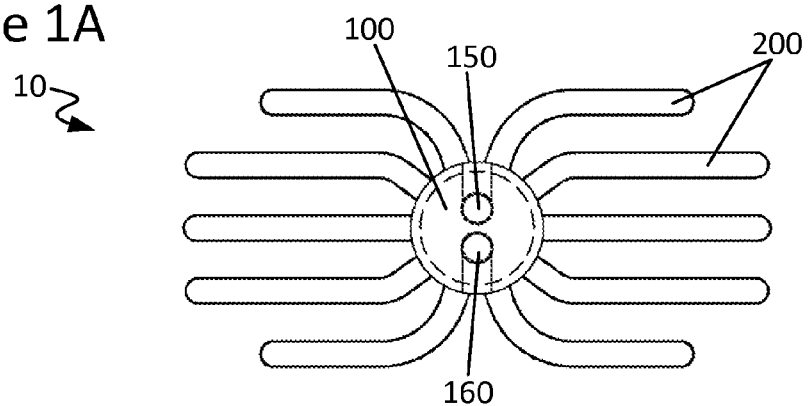
FIG. 1A is a plan view of a treatment module configured in accordance with an embodiment of the present disclosure.
Figure 1B:
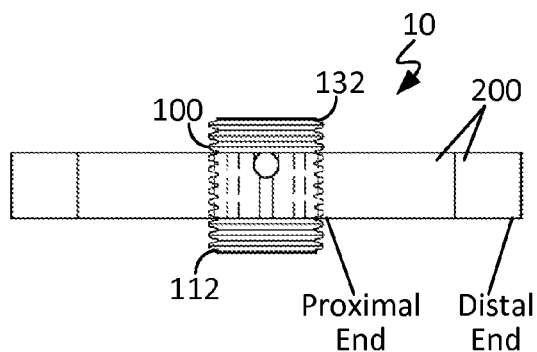
FIG. 1B is a side view of the treatment module of FIG. 1A configured in accordance with an embodiment of the present disclosure.
Figure 1C:
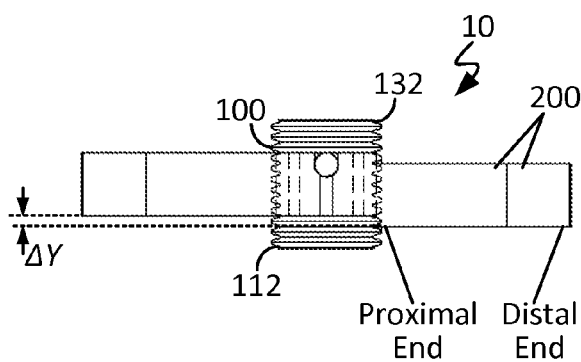
FIG. 1C is a side view of the treatment module of FIG. 1A configured with staggered treatment fins, in accordance with another embodiment of the present disclosure.
Figure 1D:
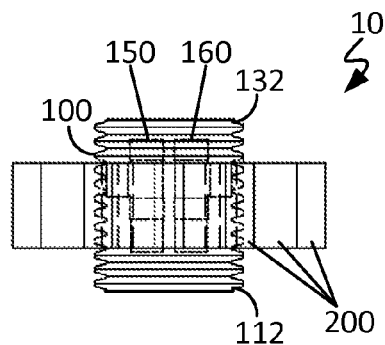
FIG. 1D is another side view of the treatment module of FIG. 1A.

These and other features of the present embodiments will be understood better by reading the following detailed description, taken together with the figures herein described. The accompanying drawings are not intended to be drawn to scale. In the drawings, each identical or nearly identical component that is illustrated in various figures may be represented by a like numeral. For purposes of clarity, not every component may be labeled in every drawing.

DETAILED DESCRIPTION

A modular liquid waste treatment system is disclosed. In accordance with some embodiments, the system includes a central distribution unit and one or more treatment fins in flow communication therewith. The distribution unit may be configured to receive liquid waste from a given source and distribute that liquid waste, at least in part, to one or more treatment fins. In turn, bacteria may be present in a given treatment fin or fins to treat the liquid waste, and the resultant treated liquid may drain from the fin to the surrounding environment. In some embodiments, a given treatment fin may include porous media providing a large surface area on which bacteria may grow to facilitate treatment. The system may be installed in and/or above the ground, as desired, and in some cases may be surrounded, at least in part, with treatment sand and/or other treatment media. The system may be used in aerobic and/or anaerobic processing of liquid waste. Numerous configurations and variations will be apparent in light of this disclosure.

General Overview

A modular liquid waste treatment system is disclosed. In accordance with some embodiments, the treatment system includes one or more treatment modules. A treatment module includes a central distribution unit and one or more treatment fins in flow communication therewith. The distribution unit may be configured to receive liquid waste from a given source, such as a septic tank, a distribution box, a storm drain, or another upstream distribution unit. The distribution unit may hold the liquid waste until a sufficient liquid level is reached, at which point some of the liquid waste may exit through a passageway in the sidewall of the unit, for example, to the one or more treatment fins associated therewith and/or to another downstream distribution unit.

A treatment fin, as used herein, is configured to be in flow communication with a central distribution unit so that wastewater or other liquid to be treated can pass from the central distribution unit into the fin. A treatment fin includes one or more porous media that are (optionally) retained by an outer retaining material, such as a fabric. The porous material may be added to the treatment fin (e.g., the treatment fin is filled with porous material) after placement at the site, or it may be in place when the treatment fin is shipped or installed. In some cases, a treatment fin may be limited to a single opening that is in flow communication with a distribution unit. In many embodiments, treated liquid (e.g., water) exiting a treatment fin passes through a material that at least partially retains fluids or retards fluid flow. The fabric optionally surrounding at least a portion of the porous material of a given treatment fin may be, for example, permeable, semi-permeable, or impermeable (e.g., to water), and different types of fabrics may be used to cover different portions of the treatment fin. Additional layers of fabric, for example, permeable or semi-permeable fabric, may be used inside the treatment fin so that successive layers of fabric and porous media are apparent passing from the external surface to the inner core of the treatment fin. The length of a treatment fin can be measured, for example, from the point of contact with a central distribution unit to an end that is most distal from the central distribution unit. The width of a treatment fin can be measured, for example, across the fin in a horizontal direction (when installed) that is orthogonal (e.g., offset by 90°) to the length. The height of a treatment fin is the distance from the top of the treatment fin to the bottom thereof when the treatment fin is in an installed position. The length-to-width ratio of a treatment fin may be, for example, greater than 2:1, greater than 3:1, greater than 5:1, greater than 10:1, less than 50:1, less than 20:1, less than 10:1, or less than 5:1. The length-to-height ratio of a treatment fin may be, for example, greater than 1:1, greater than 2:1, greater than 3:1, less than 10:1, less than 5:1, or less than 2:1. The outer surface area-to-volume ratio ($ft^2/ft^3$) of a treatment fin may be, for example, greater than 2:1, greater than 5:1, greater than 10:1, less than 20:1, less than 10:1, less than 5:1 or less than 2:1. A treatment fin may be self-supportive or may be supported, for instance, by treatment sand or other material after installation. A treatment fin may be stiff or flexible (or have portions of both) and in some cases can be curved and re-curved in situ to minimize the square footage that is required for the functional installation of the treatment module. A treatment fin may include a flange, typically around the opening thereof, that mates with the distribution unit. The flange may aid in positioning or fixing the fin to the distribution unit or to a sleeve or other connector that is later affixed to the distribution unit. Numerous configurations will be apparent in light of this disclosure.

A given treatment fin may treat the liquid waste received from the distribution unit via bacterial digestion and then drain the resultant treated liquid to the surrounding environment. To that end, in some embodiments, a given treatment fin may include one or more types of porous media which provide a large surface area on which bacteria may grow, facilitating treatment of the liquid waste. A system configured as described herein may be installed in and/or above the ground, as desired, and in some cases may be surrounded, at least in part, with treatment sand and/or other supplemental treatment media, as desired for a given target application or end-use. The entire treatment fin and its constituent components, such as, for example, one or more porous media, one or more outer layers, and/or one or more interior layers may be gas-permeable, in some embodiments.

In accordance with some embodiments, a treatment system configured as described herein can be utilized to treat any of a wide range of liquid wastes, including, for example: (1) sewage/septic effluent; (2) industrial effluent; (3) contaminated groundwater; (4) storm runoff; (5) household wastewater; and/or (6) any other type of wastewater which may undergo aerobic and/or anaerobic treatment. In some cases, a system configured as described herein may be gravity fed (i.e., liquid waste may flow via gravitational force) and, in some instances, aided by capillary action provided by the porous media of a given treatment fin. However, the present disclosure is not so limited, as in some cases, liquid waste may be pumped and/or vacuum-drawn through the disclosed system. Treatment of the liquid waste using the disclosed treatment system may be performed under aerobic and/or anaerobic conditions, as desired for a given target application or end-use.

As previously noted, a treatment system configured as described herein may be configured, in accordance with some embodiments, to be installed, in part or in whole, above the ground and/or within the ground. In some cases, the space around the distribution unit and the one or more treatment fins of a given system may be backfilled with treatment sand (and/or other suitable treatment/filtration media), and topsoil may be disposed there over. The depth at which a treatment system is installed may be customized, as desired for a given target application or end-use. In some embodiments, extremely efficient treatment may allow for shallow placement of the treatment system in areas having high water tables or poor percolation.

In accordance with some embodiments, multiple treatment systems configured as described herein can be coupled with one another in any of a wide range of system arrangements to provide for great variation in treatment configurations. For instance, series arrangements, terraced arrangements, arrangements including a distribution box, and varying system footprints (e.g., linear; rounded; narrow; interlocking) may be provided using the disclosed treatment system. In accordance with some embodiments, the treatment capacity/throughput of a system configured as described herein can be customized, as desired for a given target application or end-use. In an example case, a treatment system may include one or more treatment modules. A treatment module includes a central distribution unit and the treatment fins that are attached (or otherwise operatively coupled) thereto. A treatment module may be sized and configured to treat the amount of liquid waste associated with a bedroom or may be sized and configured to treat the waste associated with a fraction of a bedroom (e.g., ½ or ⅓ of a bedroom) or multiple bedrooms (e.g., 2, 3, 4, or more bedrooms). In one set of example embodiments, a treatment module may be sized so as to occupy less than 50 ft$^2$, less than 100 ft$^2$, less than 250 ft$^2$, or less than 500 ft$^2$ of land while allowing for treatment of an amount of liquid waste associated with a four bedroom house. A treatment system may include 1, 2, 3, 4, 5, or more treatment modules. This can provide for a modular system in which an installer or engineer can specify a specific number of treatment modules on, for example, a per bedroom, per volume, or per person basis. For instance, a four bedroom house may call for a system that includes four treatment modules. The distribution unit of each of the treatment modules may be fed by a common source, and the distribution units may be arranged in parallel or serial (or both) flow communication with each other. In some embodiments, a treatment system provided as described herein may be configured to treat liquid waste to reduce its biochemical oxygen demand (BOD), for example, by about 70% or greater, about 80% or greater, or about 90% or greater. In accordance with some embodiments, nitrification and/or denitrification may be performed directly within a treatment system configured as described herein. Numerous configurations and treatment capacities will be apparent in light of this disclosure.

In some instances, a treatment system provided using the disclosed techniques can be configured, for example, as: (1) a partially/completely assembled treatment system unit; and/or (2) a kit or other collection of discrete components (e.g., distribution unit; one or more treatment fins; etc.) which may be operatively coupled as desired. In accordance with some embodiments, a treatment system provided as described herein may be configured for compatibility with anaerobic processing. For instance, in an example embodiment, a treatment system provided as described herein may be coupled with an anaerobic processing module such as that disclosed in U.S. Pat. No. 8,501,006, titled "Apparatus and Method for Processing Liquid Waste," which is herein incorporated by reference in its entirety.

As used herein, an impermeable material is one which prevents the flow of water and/or other liquids therethrough, and in some cases may be designed to retain liquid indefinitely. A semi-permeable material may be one which allows water and/or other liquids to pass therethrough after a period of retention, which may vary with the composition and structure of the material. In some instances, water and/or other liquids may pass through a semi-permeable material, but most solids may be retained thereby. An impermeable material which has been breached (e.g., needle-punched or otherwise punctured) may serve as a semi-permeable material. A permeable material may be one which allows water and/or other liquids to pass freely therethrough with minimal or no retention. Permeable materials may include pores that allow for the free flow of water and/or other liquids, while preventing the passage of some undissolved solids.

Furthermore, it should be noted that although reference is generally made herein to the use of one or more treatment fins, the present disclosure is not so limited only to the use of generally fin-like structures. In a more general sense, and in accordance with some other embodiments, a given treatment body configured as described herein to be operatively coupled with a distribution unit, a distribution box, or other source of liquid waste can be of any desired shape, geometry, and dimensions, fin-like or otherwise, as desired for a given target application or end-use. Numerous configurations and variations will be apparent in light of this disclosure.

System Structure and Operation

FIGS. 1A-1D illustrate several views of a treatment module 10 configured in accordance with an embodiment of the present disclosure. As can be seen, treatment module 10 includes a distribution unit 100 and one or more treatment fins 200 in flow communication therewith. In some embodiments, the treatment fins 200 of a given treatment module 10 may be arranged in line with one another (e.g., as in FIG. 1B), whereas in some other embodiments, at least a first treatment fin 200 may be vertically offset from a second treatment fin 200 by a vertical distance (ΔY) along the length of unit 100 (e.g., as in FIG. 1C). As can be seen further, treatment module 10 may include an inlet baffle 150 and an outlet baffle 160, in some embodiments. A discussion of these elements is provided below.

The distribution unit 100 of a given treatment module 10 may have any of a wide range of configurations. For example, consider FIGS. 2A-2C, which illustrate several views of a distribution unit 100 configured in accordance with an embodiment of the present disclosure. As can be seen here, distribution unit 100 may be formed, in some embodiments, as a generally tubular body including a lower sump portion 110, a mid-portion 120, and an upper headspace portion 130 (each discussed below), arranged as generally shown. The sidewall 102 of distribution unit 100 may define an interior hollow region 105, which, in some embodiments, extends through the entire length of distribution unit 100, passing from lower end 112 to upper end 132 and thus providing a longitudinal passageway within distribution unit 100. In some other embodiments, however, interior hollow region 105 may pass through only a portion of the length of distribution unit 100, partially extending, for example, from upper end 132 towards lower end 112 and thus providing a longitudinal recess within distribution unit 100. The longitudinal passageway defines an axis, and the axis of the distribution unit 100 may be oriented substantially (e.g., within 10°) vertically or vertically when installed. In other embodiments, the axis of the distribution unit 100 may be substantially horizontal (e.g., within 10°) or horizontal, or between horizontal and vertical.

In some embodiments, distribution unit 100 may be formed such that at least one of its lower end 112 and/or its upper end 132 is unoccluded by sidewall 102, and thus that distribution unit 100 may be considered open-ended, at least in part. In an example case, distribution unit 100 includes both a lower end 112 and an upper end 132 that are unoccluded by sidewall 102. In some other embodiments, however, distribution unit 100 may be formed such that at least one of its lower end 112 and/or its upper end 132 is occluded by sidewall 102, and thus that distribution unit 100 may be considered closed-ended, at least in part. In an example case, distribution unit 100 includes a lower end 112 that is occluded by sidewall 102 and an upper end 132 that is unoccluded by sidewall 102. Either or both ends also may be covered by a material such as a fabric and may be permeable, semi-permeable, or impermeable.

Figure 4A:
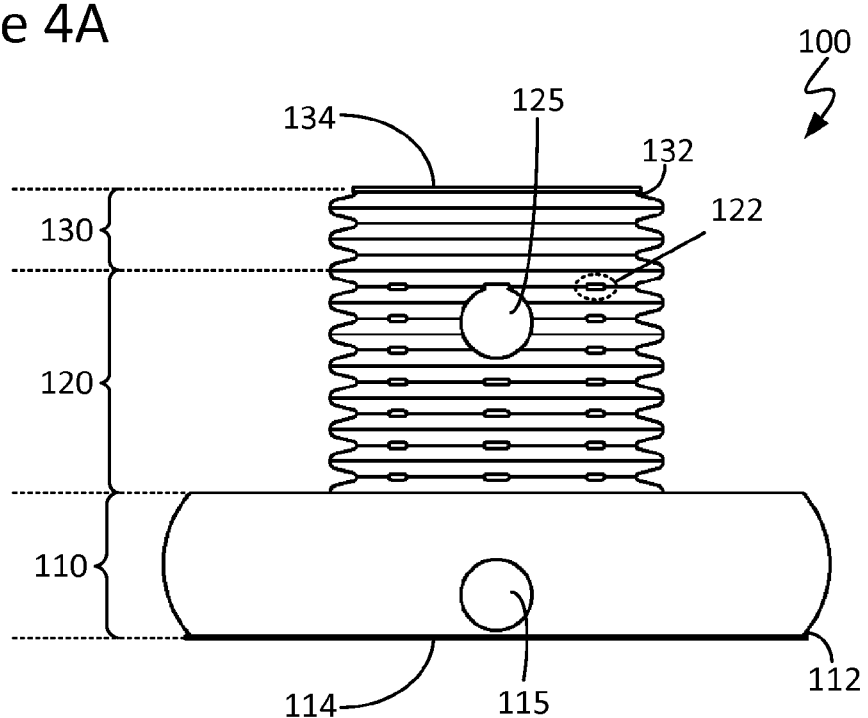
FIG. 4A is a side view of a distribution unit configured in accordance with another embodiment of the present disclosure.
Figure 4B:
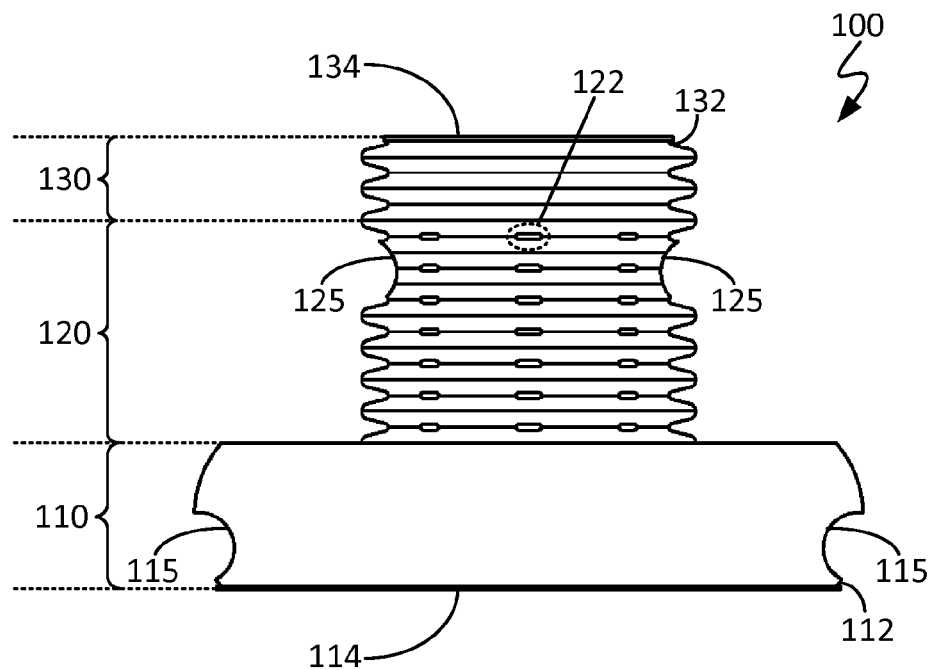
FIG. 4B is another side view of the distribution unit of FIG. 4A.

The interior and/or the exterior of distribution unit 100 may be corrugated, in part or in whole. In some embodiments, distribution unit 100 may be corrugated along substantially its entire length (e.g., as in FIGS. 2A-2B). In some other embodiments, however, distribution unit 100 may have one or more non-corrugated portions (e.g., such as can be seen with respect to distribution unit 100 in FIGS. 4A-4B, discussed below). Corrugation of a given portion (e.g., sump portion 110, mid-portion 120, and/or headspace portion 130) of distribution unit 100 may provide for additional surface area on which bacteria may grow, which in turn may facilitate treatment of liquid waste received by that unit 100, in accordance with some embodiments. Corrugations also may provide flexibility to the distribution unit 100.

Distribution unit 100 may be constructed from any of a wide range of materials, and in some instances may be made from a substantially rigid, non-degradable material. The material selected for a given distribution unit 100 may be hydrophilic or hydrophobic, as desired for a given target application or end-use. Some example suitable materials from which distribution unit 100 may be constructed include: (1) a polymer, such as polyolefins including polypropylene and polyethylene, polyolefin, polycarbonate, polyvinyl chloride (PVC), and/or acrylonitrile butadiene styrene (ABS); (2) a metal or alloy, such as copper (Cu), aluminum (Al), steel, and/or cast iron; (3) wood; (4) concrete; (5) clay; (6) glass; (7) ceramic; (8) a refractory material; and/or (9) a combination of any one or more of the aforementioned materials. Polymers may be, for example, homopolymers, copolymers, or terpolymers, and distribution unit 100 may be formed using techniques known to those of skill in the art, such as, for example, extrusion, blow molding, or combinations thereof. In some cases, a first portion of distribution unit 100 may be formed from a first material (or combination of materials), whereas a second portion thereof may be formed from a second, different material (or combination of materials). For instance, in an example case, distribution unit 100 may include a concrete sump portion 110 and a mid-portion 120 and headspace portion 130 (see FIG. 4) which are formed from a polymer. In some embodiments, the distribution unit 100 may include two or more separate portions that are joined at opening 125, so that when the two or more portions are joined, they can clamp around the proximal end of a treatment fin 200, securing it in place. The portions may be joined together by a fastener such as a locking ring, a clamp, screw, bolt, tape, hook and loop fastener, and/or heat shrink tubing sized to fit around the distribution unit 100. Portions also may be welded together or fastened with an adhesive. A gasket or other material may be used at the interface between the portions. In another example case, distribution unit 100 may include a steel sump portion 110 and a mid-portion 120 and headspace portion 130 which are formed from a plastic. In some cases, distribution unit 100 may be formed from a material that may be injection molded. In some cases, the interior and/or the exterior of distribution unit 100 may be coated, for example, with one or more coatings which promote or discourage bacterial growth, as desired. Other suitable materials for distribution unit 100 will depend on a given application and will be apparent in light of this disclosure.

Figure 2A:
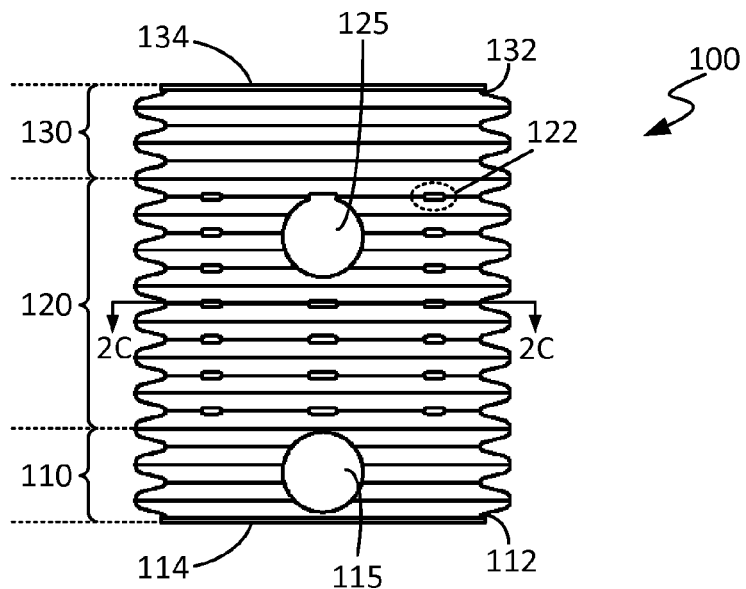
FIG. 2A is a side view of a distribution unit configured in accordance with an embodiment of the present disclosure.
Figure 2B:
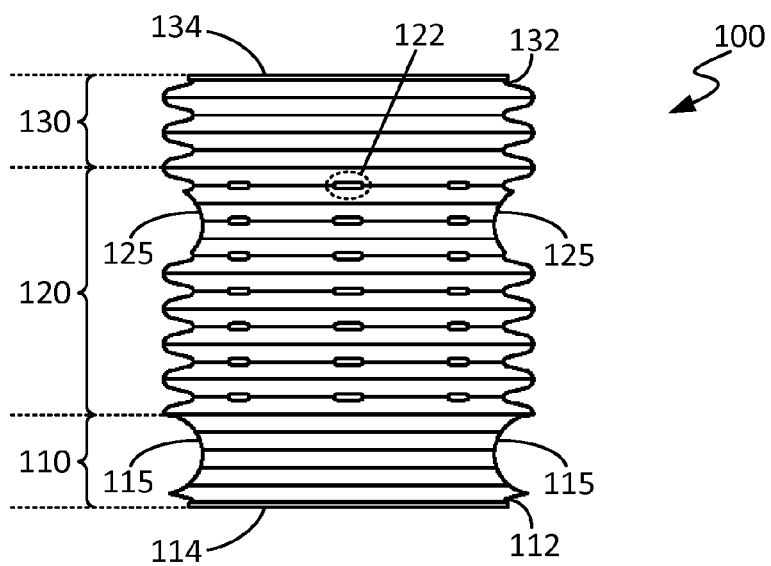
FIG. 2B is another side view of the distribution unit of FIG. 2A.
Figure 2C:
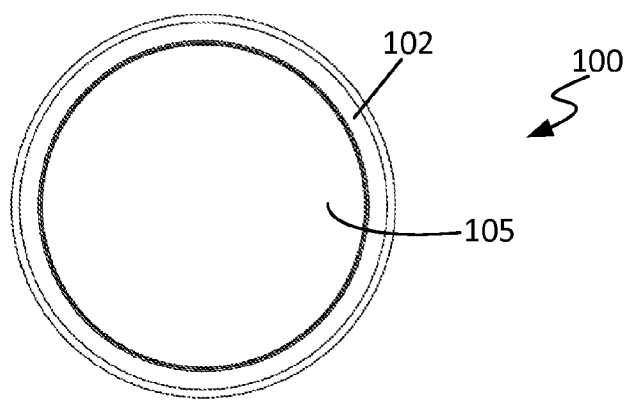
FIG. 2C is a cross-sectional view of the distribution unit of FIG. 2A taken along line 2C-2C therein.
Figure 3A:
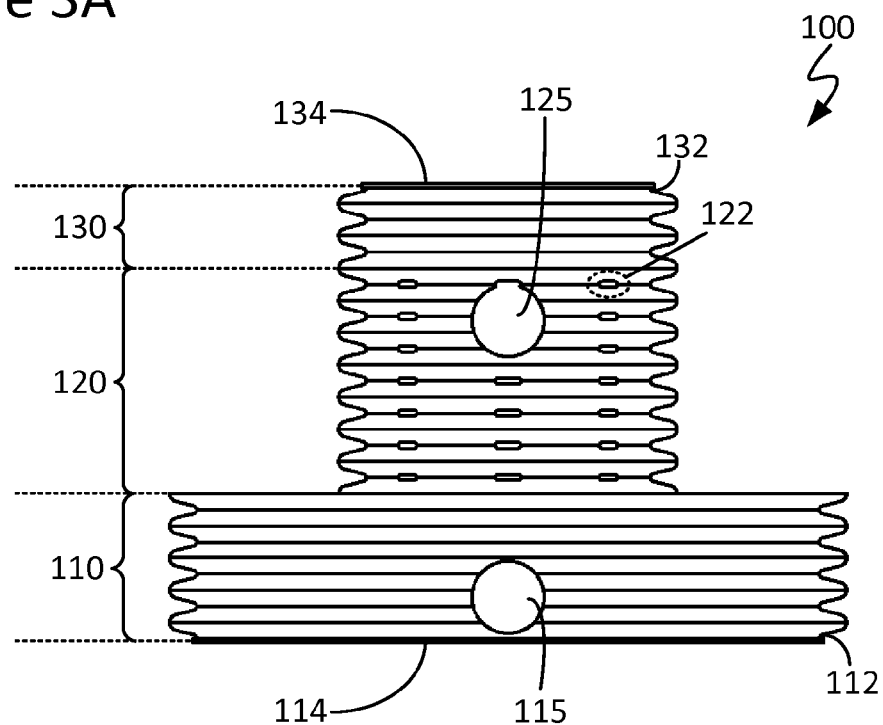
FIG. 3A is a side view of a distribution unit configured in accordance with another embodiment of the present disclosure.
Figure 3B:
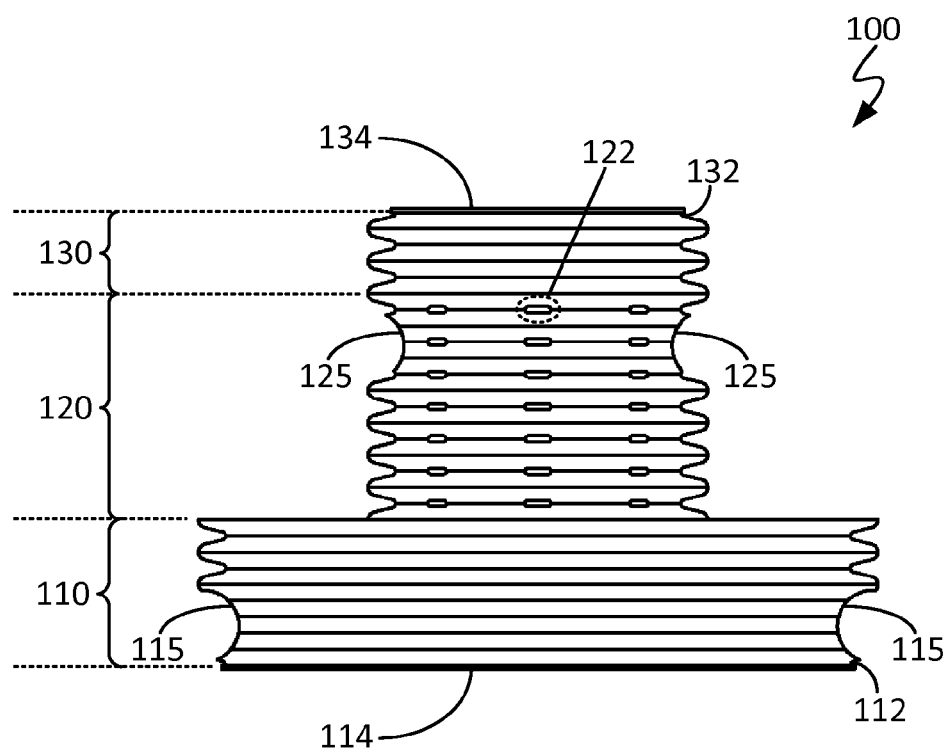
FIG. 3B is another side view of the distribution unit of FIG. 3A.
Figure 22:
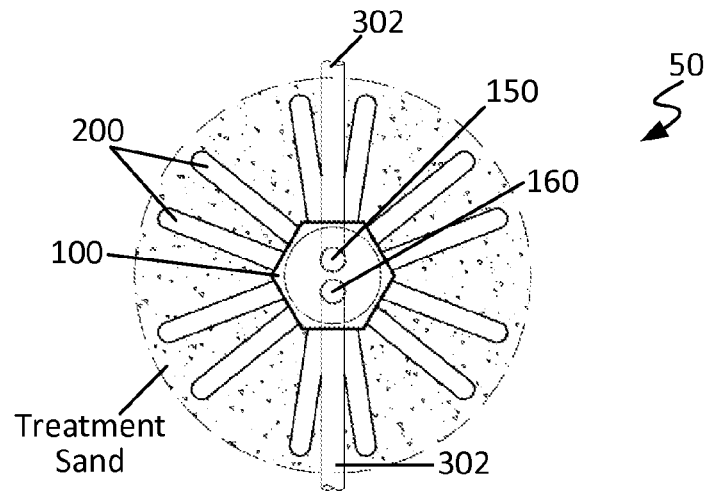
FIG. 22 is a plan view of a rounded treatment cell configured in accordance with another embodiment of the present disclosure.

In some embodiments, distribution unit 100 may be generally cylindrical in shape, having a circular, elliptical, or other curvilinear cross-sectional profile (e.g., as in FIG. 2C). In some other embodiments, however, distribution unit 100 may be generally prismatic in shape, having a polygonal cross-sectional profile (e.g., triangular; square/rectangular; hexagonal as in FIG. 22; octagonal; etc.). Other suitable geometries for distribution unit 100 will depend on a given application and will be apparent in light of this disclosure.

The size of distribution unit 100 may be customized. In some cases, the sidewall 102 may have a thickness, for example, in the range of about 0.01-8.0 inches (e.g., about 0.01-1.0 inches, about 1.0-2.5 inches, about 2.5-5.0 inches, about 5.0-8.0 inches, or any other sub-range in the range of about 0.01-8.0 inches). In some instances, the thickness of sidewall 102 may be, for example, less than 2 inches, 1 inch, 0.5 inches, or 0.25 inches. In some other cases, the sidewall 102 may have a thickness, for example, greater than or equal to about 1 inch, 2 inches, 4 inches, 8 inches, 12 inches, or 15 inches. In some cases, distribution unit 100 may have a length, for example, in the range of about 12-120 inches (e.g., about 12-24 inches, about 24-36 inches, about 36-48 inches, about 48-60 inches, about 60-90 inches, about 90-120 inches, or any other sub-range in the range of about 12-120 inches). In some cases, distribution unit 100 may have a width/diameter, for example, in the range of about 2-48 inches (e.g., about 2-8 inches, about 8-12 inches, about 12-18 inches, about 18-24 inches, about 24-30 inches, about 30-36 inches, about 36-42 inches, about 42-48 inches, or any other sub-range in the range of about 2-48 inches). In some other cases, distribution unit 100 may have a width/diameter, for example, greater than or equal to about 48 inches (e.g., about 54 inches or greater; about 60 inches or greater). It should be noted, however, that the present disclosure is not so limited to only these example dimensional ranges for a given distribution unit 100, as in a more general sense, and in accordance with an embodiment, the size of distribution unit 100 may be customized, as desired for a given target application or end-use. In some instances, distribution unit 100 may be of substantially uniform width/diameter along its length, whereas in some other instances, distribution unit 100 may be of a non-uniform width/diameter along its length (e.g., tapered or otherwise varied). Numerous configurations will be apparent in light of this disclosure.

In some instances, the lower end 112 of distribution unit 100 optionally may be fitted with a cover 114. In accordance with an embodiment, optional cover 114 may serve to provide a liquid-tight seal that prevents or otherwise reduces leakage of liquid waste contained within distribution unit 100 from sump portion 110 thereof. In some instances, the upper end 132 of distribution unit 100 optionally may be fitted with a cover 134. In accordance with an embodiment, optional cover 134 may serve to: (1) provide a seal that prevents or otherwise reduces entry of foreign debris (e.g., surrounding soil, sand, etc.) into distribution unit 100 through upper end 132; and/or (2) allow access into the interior hollow region 105 of distribution unit 100 (e.g., for cleaning thereof). Optional covers 114 and 134 can be constructed from any suitable material, as will be apparent in light of this disclosure, and in some cases may be constructed from the same material(s) as distribution unit 100, discussed above. Also, the geometry and size of optional covers 114 and 134 can be customized, as desired for a given target application or end-use, and in some embodiments may be selected so as to substantially match the geometry and size of distribution unit 100 (e.g., at lower end 112 thereof; at upper end 132 thereof). A given optional cover 114/134 may be affixed to distribution unit 100 in a temporary or permanent manner, using any suitable means, such as, for example: a threaded fit; a pressure fit; one or more fasteners (e.g., screws; bolts); and/or an adhesive or other sealant. In some cases, optional cover 114 may be inserted within or otherwise received by lower end 112, whereas in some other cases, it may be seated on/over lower end 112. In some cases, optional cover 134 may be inserted within or otherwise received by upper end 132, whereas in some other cases, it may be seated on/over upper end 132.

In accordance with some embodiments, the sump portion 110 of a given distribution unit 100 may be configured, for example, to collect sludge and/or other waste solids that may settle out of the liquid waste received by distribution unit 100. The geometry and size of sump portion 110 may be customized, and in some cases may be selected, at least in part, based on the amount of sludge/solids that it may receive in use. Thus, the dimensions of sump portion 110 may be varied to accommodate a lesser or greater volume of sludge/solids, as desired for a given target application or end-use.

In some embodiments, the width/diameter of the sump portion 110 of distribution unit 100 may be substantially the same as the width/diameter of the mid-portion 120 and/or headspace portion 130 of that unit 100 (e.g., as in FIGS. 2A-2B). In some other embodiments, however, the width/diameter of the sump portion 110 may be larger than the width/diameter of the mid-portion 120 and/or headspace portion 130 of that unit 100. For instance, consider FIGS. 3A-3B and FIGS. 4A-4B, which illustrate views of several example distribution units 100 configured in accordance with some embodiments of the present disclosure. In some cases, the sump portion 110 of a given distribution unit 100 may have a width/diameter that is in the range of about 1-5× (e.g., about 1½×, about 2×, about 2½×, about 3×, about 3½×, about 4×, about 4½×, about 5×) the width/diameter of the mid-portion 120 and/or the headspace portion 130 of that unit 100. In an example case, a distribution unit 100 may include: (1) a headspace portion 130 and a mid-portion 120 having a width/diameter of about 12 inches; and (2) a sump portion 110 having a width/diameter of about 18 inches. In another example case, a distribution unit 100 may include: (1) a headspace portion 130 and a mid-portion 120 having a width/diameter of about 18 inches; and (2) a sump portion 110 having a width/diameter of about 36 inches. In another example case, a distribution unit 100 may include: (1) a headspace portion 130 and a mid-portion 120 having a width/diameter of about 24 inches; and (2) a sump portion 110 having a width/diameter of about 48 inches. It should be noted, however, that the present disclosure is not so limited to only these example dimensional ranges, as in a more general sense, and in accordance with an embodiment, the size of sump portion 110 may be customized, as desired for a given target application or end-use. Numerous configurations will be apparent in light of this disclosure.

As previously discussed, the interior and/or the exterior of distribution unit 100 may be corrugated or non-corrugated, in part or in whole, as desired. Thus, in some embodiments, sump portion 110 may be corrugated (e.g., as in FIGS. 2A-2B). In some other embodiments, however, the sump portion 110 of distribution unit 100 may be non-corrugated (e.g., as in FIGS. 4A-4B).

In accordance with some embodiments, a given distribution unit 100 may have one or more openings 115 formed in its sidewall 102, for example, at sump portion 110. In some cases, a given opening 115 may be provided, in part or in whole, by a prefabricated hole cut into sidewall 102 of distribution unit 100. In some other cases, a given opening 115 may be provided by a removable insert stamped out of sidewall 102 of distribution unit 100. In some other cases, a given opening 115 may be provided by removing (e.g., punching out) a piece of sidewall 102 of distribution unit 100 defined, for example, by a perforated or indented outline that provides an area of weakness in the wall that can be easily punched through when desired.

In some cases, a given opening 115 may be generally curvilinear in shape (e.g., circular, elliptical, etc.). In some other cases, a given opening 115 may be generally polygonal in shape (e.g., triangular, square, rectangular, hexagonal, etc.). In some cases, a given opening 115 may have a width/diameter, for example, in the range of about 0.5-12 inches (e.g., about 0.5-3 inches, about 3-4½ inches, about 4½-6 inches, about 6-8 inches, about 8-12 inches, or any other sub-range in the range of about 0.5-12 inches). In some other cases, a given opening 115 may have a width/diameter, for example, greater than or equal to about 12 inches (e.g., about 12-18 inches or greater; about 18-24 inches or greater). It should be noted, however, that the present disclosure is not so limited to only these example geometries and dimensional ranges, as in a more general sense, and in accordance with an embodiment, the shape and size of a given opening 115 may be customized, as desired for a given target application or end-use. Numerous configurations will be apparent in light of this disclosure.

Distribution unit 100 may be provided with any given quantity of openings 115 (e.g., one, two, three, four, or more openings 115) formed in its sidewall 102 at sump portion 110, and the arrangement of those openings 115 can be customized, as desired for a given target application or end-use. In an example case, distribution unit 100 may have two openings 115 which substantially align (e.g., precisely align or otherwise align within a given tolerance) with one another across the breadth of sump portion 110 (e.g., in a generally linear arrangement). In another example case, however, the two openings 115 may not be directly aligned with one another (e.g., in an acute or obtuse L-shaped arrangement). In another example case, distribution unit 100 may have three openings 115, two of which substantially align (e.g., precisely align or otherwise align within a given tolerance) with one another across the breadth of sump portion 110, and the third of which is perpendicular or otherwise offset from such alignment (e.g., in a generally T-shaped arrangement). In yet another example case, however, the three openings 115 may not be directly aligned with one another (e.g., in a generally triangular or Y-shaped arrangement). In still another example case, four openings 115 may be formed in the sidewall 102 of distribution unit 100 (e.g., in a generally plus-shaped, cruciform, or X-shaped arrangement). It may be desirable, in some instances, to ensure that the one or more openings 115 are formed in the sidewall 102 of distribution unit 100 so as not to inhibit any liquid-tight seal offered, for example, by sump portion 110 (e.g., whether closed-ended or by way of being sealed with an optional cover 114). Numerous configurations for opening(s) 115 will be apparent in light of this disclosure.

In accordance with some embodiments, a given opening 115 may be configured to receive or otherwise be coupled with a pipe 304 (e.g., as in FIG. 24B, discussed below) so as to provide for flow communication with the interior hollow region 105 of distribution unit 100 (e.g., at sump portion 110). To that end, a given opening 115 may be configured to interface with a pipe 304 using any standard and/or custom pipe fitting connection, such as, for example: (1) a friction-fit connection; (2) a flanged connection; (3) a threaded connection; (4) a retainer-and-tab connection; (5) a bayonet-type connection; (6) a snap-fit connection; and/or (7) a combination of any one or more thereof. In some cases, a given opening 115 may include a fitting that is molded into sidewall 102, whereas in some other cases, a given opening 115 may include a fitting that is inserted or otherwise disposed therein. Retention of a pipe 304 by a given opening 115 may be aided, for example, by an adhesive (e.g., glue; cement), welding (e.g., heat weld; ultrasonic weld), and/or pressure/friction fit, in accordance with some embodiments. In some cases, a given opening 115 may be configured, for example, to receive and retain a threaded fitting on a pipe 304 even if that opening 115 is not correspondingly threaded. Other suitable configurations for interfacing with the one or more openings 115 of a given distribution unit 100 will depend on a given application and will be apparent in light of this disclosure.

In some cases, a given opening 115 may be configured to interface with a pipe 304 in a liquid-tight sealing relationship. To this end, a given opening 115 may include, in accordance with some embodiments, an O-ring, grommet, rubber sleeve, clamshell sealer, or other suitable gasket configured to prevent or otherwise reduce leakage of the liquid waste contained within distribution unit 100 from the interface of a given opening 115 with pipe 304. It should be noted, however, that a liquid-tight sealing relationship is not required, as a given opening 115 and pipe 304 may be configured, in accordance with some other embodiments, to couple in a secure or permanent but not necessarily liquid-tight manner.

In accordance with some embodiments, the mid-portion 120 of a given distribution unit 100 may be configured, for example, to allow liquid waste to flow into and/or out of that unit 100. To that end, the mid-portion 120 may have one or more apertures 122 (e.g., holes, perforations, elongate slots, or other orifices) defined in its sidewall 102 at mid-portion 120. A given aperture 122 may traverse the full thickness of sidewall 102, providing a fluid passageway from interior hollow region 105, through sidewall 102, and out of unit 100. In accordance with some embodiments, liquid waste that has accumulated to a given target liquid level within interior hollow region 105 may flow through sidewall 102 via the one or more apertures 122 at mid-portion 120 and out of unit 100 (e.g., into one or more treatment fins 200 in flow communication therewith, as discussed below).

In some cases, a given aperture 122 may be generally curvilinear in shape (e.g., circular, elliptical, etc.). In some other cases, a given aperture 122 may be generally polygonal in shape (e.g., triangular, square, rectangular, hexagonal, etc.). In some cases, a given aperture 122 may have a width/diameter, for example, in the range of about 0.01-1.5 inches (e.g., about 0.01-0.25 inches, about 0.25-0.5 inches, about 0.5-0.75 inches, about 0.75-1.0 inches, about 1.0-1.25 inches, about 1.25-1.5 inches, or any other sub-range in the range of about 0.01-1.5 inches). In some cases, a given aperture 122 may have a length, for example, in the range of about 0.1-10.0 inches (e.g., about 0.1-2.5 inches, about 2.5-5.0 inches, about 5.0-7.5 inches, about 7.5-10.0 inches, or any other sub-range in the range of about 0.1-10.0 inches. It should be noted that the apertures 122 of distribution unit 100 are not all required to be of uniform geometry, size, or type, and further that the present disclosure is not so limited to only these example geometries and dimensional ranges, as in a more general sense, and in accordance with an embodiment, the shape and size of a given aperture 122 may be customized, as desired for a given target application or end-use. Numerous configurations will be apparent in light of this disclosure.

In some instances, a plurality of apertures 122 may be randomly distributed across the mid-portion 120 of a given distribution unit 100. In some other instances, a plurality of apertures 122 may be regularly or semi-regularly distributed across mid-portion 120. For instance, in an example case, the apertures 122 of mid-portion 120 may be substantially vertically aligned (e.g., precisely vertically aligned or otherwise vertically aligned within a given tolerance). In another example case, the apertures 122 of mid-portion 120 may be substantially horizontally aligned (e.g., precisely horizontally aligned or otherwise horizontally aligned within a given tolerance).

The geometry and size of mid-portion 120 can be customized, and in some cases may be selected, at least in part, based on the amount of liquid waste that is to pass therethrough in use. Thus, the dimensions of mid-portion 120 may be varied to accommodate a lesser or greater flow of liquid waste, as desired for a given target application or end-use. In some embodiments, the width/diameter of the mid-portion 120 of distribution unit 100 may be substantially the same as the width/diameter of the sump portion 110 and/or headspace portion 130 of that unit 100 (e.g., as in FIGS. 2A-2B). In some other embodiments, however, the width/diameter of the mid-portion 120 may be smaller than the width/diameter of the sump portion 110 and/or headspace portion 130 of that unit 100 (e.g., as in FIGS. 3A-3B).

In an example case, a distribution unit 100 may include: (1) a headspace portion 130 and a mid-portion 120 having a width/diameter of about 12 inches; and (2) a sump portion 110 having a width/diameter of about 18 inches. In another example case, a distribution unit 100 may include a headspace portion 130, a mid-portion 120, and a sump portion 110 each having a width/diameter of about 18 inches. In another example case, a distribution unit 100 may include a headspace portion 130, a mid-portion 120, and a sump portion 110 each having a width/diameter of about 24 inches. It should be noted, however, that the present disclosure is not so limited to only these example dimensional ranges, as in a more general sense, and in accordance with an embodiment, the size of mid-portion 120 may be customized, as desired for a given target application or end-use. Numerous configurations will be apparent in light of this disclosure.

As previously discussed, the interior and/or the exterior of distribution unit 100 may be corrugated or non-corrugated, in part or in whole, as desired. Thus, in some embodiments, mid-portion 120 may be corrugated (e.g., as in FIGS. 2A-2B). In some other embodiments, however, mid-portion 120 may be non-corrugated.

In accordance with some embodiments, a given distribution unit 100 may have one or more openings 125 formed in its sidewall 102, for example, at mid-portion 120. As will be appreciated in light of this disclosure, a given opening 125 may be provided using any of the example techniques discussed above, for instance, with respect to forming opening(s) 115 in sidewall 102. As will be further appreciated, the geometry, size, quantity, and arrangement of opening(s) 125 may be customized, as desired for a given target application or end-use, and in some cases may be selected from any of the example geometries, sizes, quantities, and arrangements discussed above, for instance, with respect to opening(s) 115. In accordance with some embodiments, the location of a given opening 125 in sidewall 102 may be selected, at least in part, so as to permit liquid waste to accumulate within the interior hollow region 105 of unit 100 to a given target liquid level, at which point at least a portion of the liquid waste begins to flow out of unit 100 through that opening 125 (e.g., via an associated inlet baffle 150 or outlet baffle 160, as discussed below). Numerous configurations for opening(s) 125 will be apparent in light of this disclosure.

In accordance with some embodiments, a given opening 125 may be configured to receive or otherwise be coupled with a pipe 302 (e.g., as in FIG. 24B, discussed below) so as to provide for flow communication with the interior hollow region 105 of distribution unit 100 (e.g., at mid-portion 120). To that end, a given opening 125 may be configured to interface with a pipe 302 using any standard and/or custom pipe fitting connection, including the example interfacing configurations discussed above, for instance, with respect to opening(s) 115. In some cases, a given opening 125 may be configured to interface with a pipe 302 in a liquid-tight sealing relationship using any of the example configurations discussed above, for instance, with respect to providing liquid-tight opening(s) 115. It should be noted, however, that a liquid-tight sealing relationship is not required, as a given opening 125 and pipe 302 may be configured, in accordance with some other embodiments, to couple in a secure but not necessarily liquid-tight manner.

In accordance with some embodiments, the headspace portion 130 of a given distribution unit 100 may be configured, for example, to collect gases produced by liquid waste contained within that unit 100. The geometry and size of headspace portion 130 may be customized, and in some cases may be selected, at least in part, based on the volume of gas that may accumulate within distribution unit 100 in use. Thus, the dimensions of headspace portion 130 may be varied to accommodate a lesser or greater gaseous volume, as desired for a given target application or end-use. In some embodiments, the width/diameter of the headspace portion 130 of distribution unit 100 may be substantially the same as the width/diameter of the sump portion 110 and/or mid-portion 120 of that unit 100 (e.g., as in FIGS. 2A-2B). In some other embodiments, however, the width/diameter of the headspace portion 130 may be smaller than the width/diameter of the sump portion 110 and/or mid-portion 120 of that unit 100 (e.g., as in FIGS. 3A-3B). In an example case, a distribution unit 100 may include: (1) a headspace portion 130 and a mid-portion 120 having a width/diameter of about 12 inches; and (2) a sump portion 110 having a width/diameter of about 18 inches. In another example case, a distribution unit 100 may include a headspace portion 130, a mid-portion 120, and a sump portion 110 each having a width/diameter of about 18 inches. In another example case, a distribution unit 100 may include a headspace portion 130, a mid-portion 120, and a sump portion 110 each having a width/diameter of about 24 inches. It should be noted, however, that the present disclosure is not so limited to only these example dimensional ranges, as in a more general sense, and in accordance with an embodiment, the size of headspace portion 130 may be customized, as desired for a given target application or end-use. Numerous configurations will be apparent in light of this disclosure.

As previously discussed, the interior and/or the exterior of distribution unit 100 may be corrugated or non-corrugated, in part or in whole, as desired. Thus, in some embodiments, headspace portion 130 may be corrugated (e.g., as in FIGS. 2A-2B). In some other embodiments, however, headspace portion 130 may be non-corrugated.

As previously noted, distribution unit 100 may include an inlet baffle 150 and/or an outlet baffle 160, in accordance with some embodiments. Inlet baffle 150 and outlet baffle 160 can be configured as typically done. As can be seen from FIGS. 1A-1D, inlet baffle 150 may be disposed within the interior hollow region 105 of distribution unit 100 so as to substantially align (e.g., precisely align or otherwise align within a given tolerance) with an opening 125 (e.g., at mid-portion 120), in accordance with an embodiment. As can be seen further, outlet baffle 160 may be disposed within the interior hollow region 105 of distribution unit 100 so as to substantially align (e.g., precisely align or otherwise align within a given tolerance) with another opening 125 (e.g., at mid-portion 120), in accordance with an embodiment.

Inclusion of an inlet baffle 150 and/or an outlet baffle 160 within a given distribution unit 100 may allow for any of a wide range of connections for flow communication into and/or out of distribution unit 100. For example, in some cases, a pipe 302 may be coupled with inlet baffle 150 and with an upstream source of liquid waste (e.g., a septic tank; a distribution box; an upstream treatment module 10), thereby allowing liquid waste to flow from that source, through pipe 302, and into distribution unit 100 via inlet baffle 150. In some cases, a pipe 302 may be coupled with outlet baffle 160 and, for example, with another treatment module 10 downstream, thereby allowing liquid waste to flow from a first distribution unit 100 of a first treatment module 10, through pipe 302, and into a second, downstream distribution unit 100 of a second, downstream treatment module 10. The flow of liquid waste into and/or out of a given distribution unit 100 may be provided, in part or in whole, by gravity feed, pumping, and/or vacuum draw, in accordance with some embodiments.

Figure 21A:
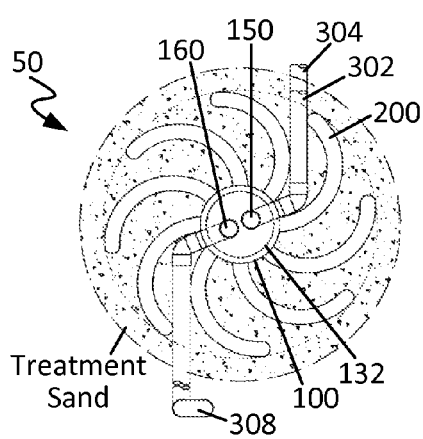
FIG. 21A is a plan view of a rounded treatment cell configured in accordance with another embodiment of the present disclosure.

In some cases, such as when a given treatment module 10 is the last in a series of treatment modules 10 or when it is the only treatment module 10 present, a pipe 302 may be coupled, for example, with outlet baffle 160 and with a vent stack 308, thereby allowing: (1) air from the surrounding environment to flow into distribution unit 100 (e.g., to aid in aerobic processing of liquid waste contained therein); and/or (2) gases produced during treatment of the liquid waste to vent from the interior of distribution unit 100 to the atmosphere. Vent stack 308 also may provide a path of gaseous communication between the atmosphere at the end of the system and the atmosphere at a gaseous waste vent in the structure being serviced. Vent stack 308 may be configured as typically done. In some cases, the inlet baffle 150 and/or outlet baffle 160 (and corresponding openings 125) of a given distribution unit 100 may be arranged in an offset manner (e.g., as in FIG. 21A) so as not to interfere with the positioning/arrangement of the one or more treatment fins 200 about unit 100. Numerous configurations will be apparent in light of this disclosure.

Figure 5A:
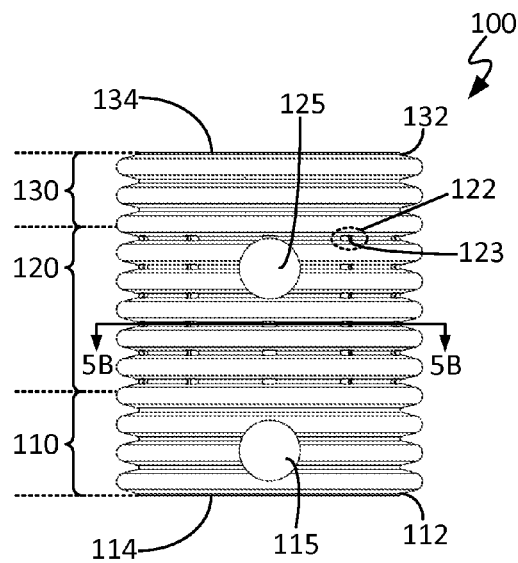
FIG. 5A is a side view of a distribution unit configured in accordance with another embodiment of the present disclosure.
Figure 5B:
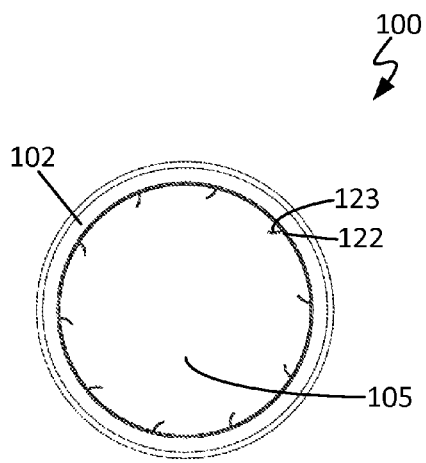
FIG. 5B is a cross-sectional view of the distribution unit of FIG. 5A taken along line 5B-5B therein.

FIGS. 5A-5B illustrate several views of a distribution unit 100 configured in accordance with another embodiment of the present disclosure. As can be seen here, in some cases, distribution unit 100 optionally may include one or more skimmer tabs 123 formed from or otherwise affixed to sidewall 102 (e.g., at mid-portion 120) and extending generally radially inward into interior hollow region 105. In some cases, a given skimmer tab 123 may be provided proximal an aperture 122. When included, the one or more optional skimmer tabs 123 may serve, at least in part, to retain greases, oils, and other floating matter within distribution unit 100, thereby preventing or otherwise reducing the ability of such materials to exit through or clog apertures 122. The quantity and distribution of skimmer tabs 123 may be customized, as desired for a given target application or end-use. In some instances, a plurality of skimmer tabs 123 may be randomly distributed across the mid-portion 120 of a given distribution unit 100. In some other instances, a plurality of skimmer tabs 123 may be regularly or semi-regularly distributed across mid-portion 120. For instance, in an example case, the skimmer tabs 123 of mid-portion 120 may be substantially aligned (e.g., precisely aligned or otherwise aligned within a given tolerance).

In some cases, a given skimmer tab 123 may have a width/diameter, for example, of about ¼ inch or greater, about ½ inch or greater, about ¾ inch or greater, or about 1 inch or greater. In some cases, a given skimmer tab 123 may have a length, for example, in the range of about 0.5-2.0 inches (e.g., about 0.5-1.0 inches, about 1.0-1.5 inches, about 1.5-2.0 inches, or any other sub-range in the range of about 0.5-2.0 inches). It should be noted, however, that the present disclosure is not so limited to only these example dimensional ranges, as in a more general sense, and in accordance with an embodiment, the size of a given skimmer tab 123 may be customized, as desired for a given target application or end-use. Numerous configurations will be apparent in light of this disclosure.

Figure 6A:
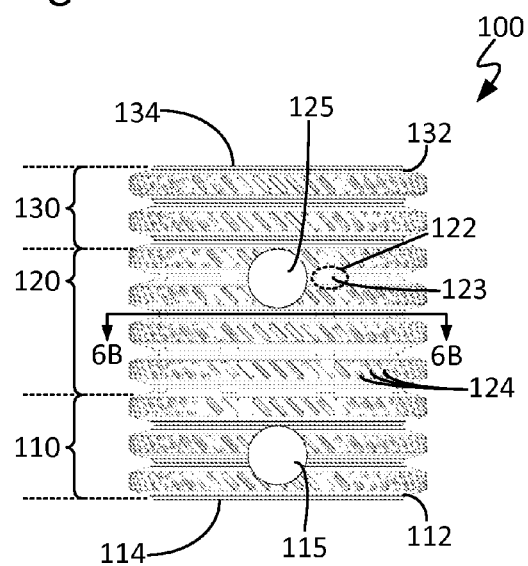
FIG. 6A is a side view of a distribution unit configured in accordance with another embodiment of the present disclosure.
Figure 6B:
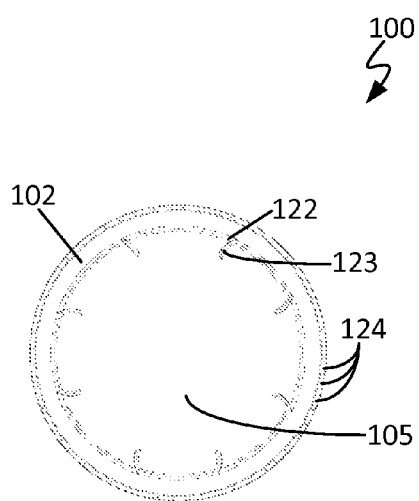
FIG. 6B is a cross-sectional view of the distribution unit of FIG. 6A taken along line 6B-6B therein.
Figure 7A:
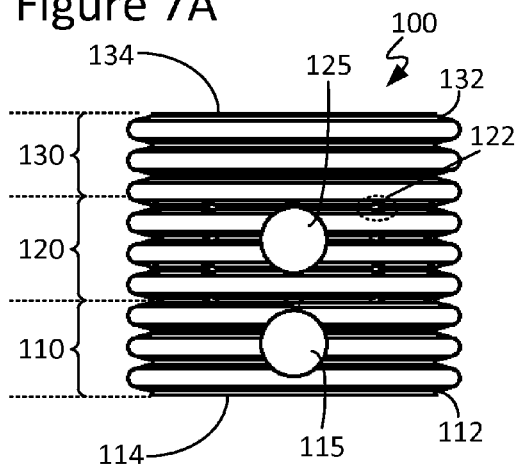
FIG. 7A is a side view of a distribution unit configured in accordance with another embodiment of the present disclosure.
Figure 7B:
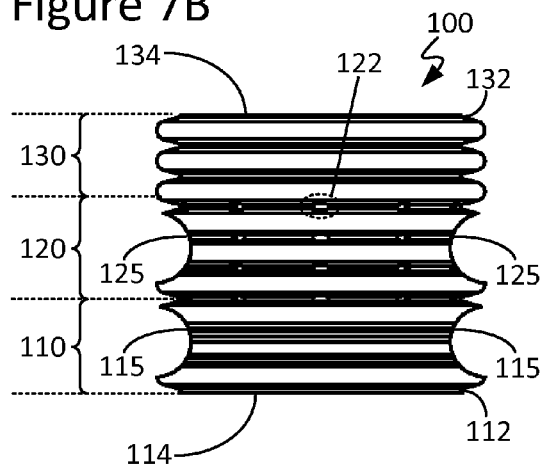
FIG. 7B is another side view of the distribution unit of FIG. 7A.
Figure 7C:
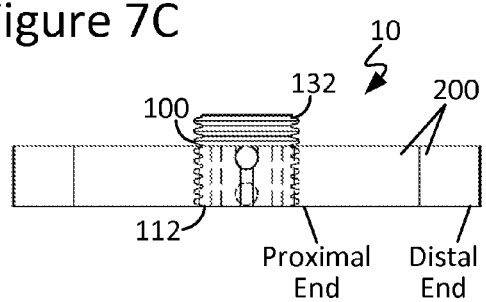
FIG. 7C is a side view of a treatment module including the distribution unit of FIG. 7A, in accordance with an embodiment of the present disclosure.
Figure 7D:
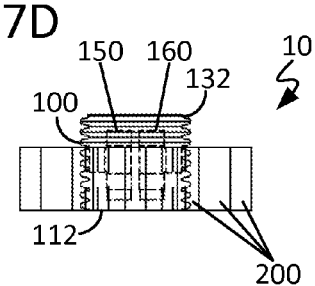
FIG. 7D is another side view of the treatment module of FIG. 7C.

FIGS. 6A-6B illustrate several views of a distribution unit 100 configured in accordance with another embodiment of the present disclosure. As can be seen here, in some cases, distribution unit 100 optionally may include one or more ridges 124 formed from or otherwise affixed to sidewall 102 and extending generally radially outward therefrom. When included, the one or more optional ridges 124 may serve, at least in part, to facilitate liquid flow from mid-portion 120 (e.g., into a given treatment fin 200 in flow communication therewith). For instance, ridge(s) 124 may facilitate liquid flow where flow otherwise would be prevented or inhibited by a sleeve or other material in contact with the exterior surface of sidewall 102 of a distribution unit 100. The quantity and distribution of ridges 124 may be customized, as desired for a given target application or end-use. In some instances, a plurality of ridges 124 may be randomly distributed across distribution unit 100, in part or in whole. In some other instances, a plurality of ridges 124 may be regularly or semi-regularly distributed across distribution unit 100, in part or in whole. For instance, in an example case, a plurality of ridges 124 may be provided along a corrugation rib of distribution unit 100. The dimensions of a given ridge 124 may be customized, as desired for a given target application or end-use. Numerous configurations will be apparent in light of this disclosure.

FIGS. 7A-7D illustrate several views of a distribution unit 100 configured in accordance with another embodiment of the present disclosure. As can be seen here, in some cases, distribution unit 100 optionally may include a sump portion 110 that is truncated or otherwise reduced in length and thus does not extend beyond the bottom of a given treatment fin 200 in flow communication with unit 100. In an example case, the lower end 112 of a distribution unit 100 having a truncated sump portion 110 may be substantially flush with the bottom edge of a given treatment fin 200 in flow communication with that unit 100 (e.g., as in FIGS. 7C-7D). In some such cases, the one or more apertures 122 of mid-portion 120 may be adjusted in arrangement and/or size such that liquid waste passing therethrough initially enters a given treatment fin 200 only at an upper portion thereof (e.g., within the upper longitudinal half of a given fin 200) before draining downward, in accordance with some embodiments. Provision of a truncated sump portion 110 may reduce the overall length of unit 100, which in turn may reduce system size when installed and reduce materials used/cost.

Figure 8A:
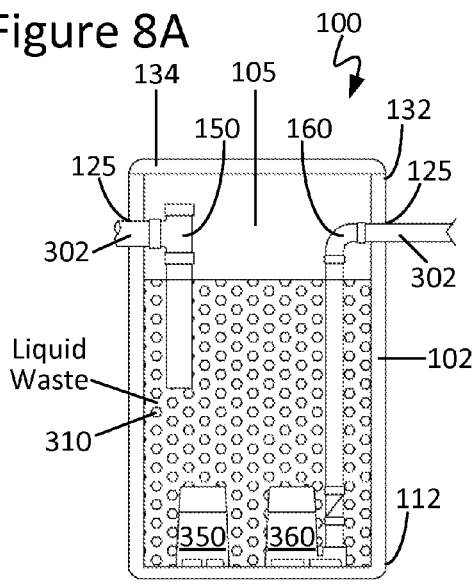
FIG. 8A is a side cross-sectional view of a distribution unit configured in accordance with another embodiment of the present disclosure.
Figure 8B:
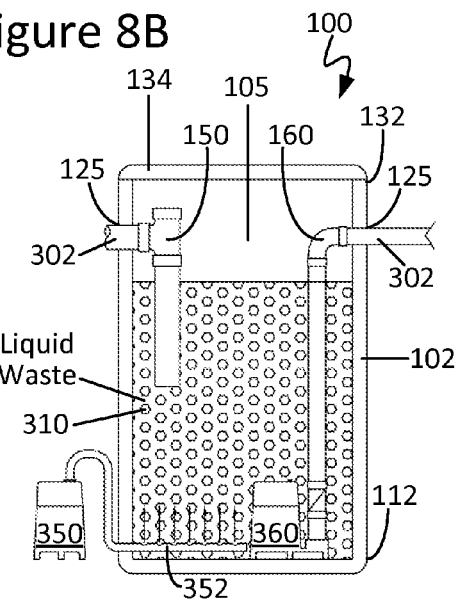
FIG. 8B is a side cross-sectional view of a distribution unit configured in accordance with another embodiment of the present disclosure.

FIGS. 8A-8B illustrate several example distribution units 100 configured in accordance with some embodiments of the present disclosure. As can be seen here, in some cases, an aeration pump 350 optionally may be disposed within distribution unit 100 (e.g., as in FIG. 8A). In some other cases, an aeration pump 350 optionally may be disposed outside of distribution unit 100 and connected with its interior hollow region 105 via an aeration hose/conduit 352 (e.g., such as in FIG. 8B). Optional aeration pump 350 may be configured as typically done and may serve, at least in part, to agitate liquid waste contained within distribution unit 100. In some instances, and in accordance with an embodiment, such agitation may facilitate aerobic treatment of liquid waste contained within a given distribution unit 100.

As can be seen further from FIGS. 8A-8B, in some cases, a discharge pump 360 optionally may be disposed within distribution unit 100. Optional discharge pump 360 may be configured as typically done and may serve, at least in part, to discharge liquid waste contained within a given distribution unit 100, for example, to a septic tank (e.g., to recirculate liquid waste to the septic tank for nitrification and/or denitrification), a dispersal/drain field, a direct dispersal unit, and/or any other liquid waste treatment device, as will be apparent in light of this disclosure.

In some cases, one or more treatment media 310 optionally may be disposed within distribution unit 100 (e.g., as in FIGS. 8A-8B). When included, treatment media 310 may serve, at least in part, to provide additional surface area on which bacteria may grow and which may provide surface contact for treatment of liquid waste contained within unit 100. To that end, treatment media 310 may be any of a wide range of materials, and in some example cases may be any of the example materials discussed below, for instance, with respect to porous media 210.

In accordance with an example embodiment, distribution unit 100 may be constructed, in part or in whole, from ENVIRO-SEPTIC® conduit, available from Presby Environmental, Inc., Whitefield, N.H. In accordance with some example embodiments, distribution unit 100 may be constructed, in part or in whole, from a conduit such as that disclosed in any of U.S. Pat. No. 6,461,078, titled "Plastic Sewage Pipe," U.S. Pat. No. 8,342,212, titled "Fluid Conduit with Layered and Partial Covering Material Thereon," and U.S. Pat. No. 8,501,006, titled "Apparatus and Method for Processing Liquid Waste," each of which is herein incorporated by reference in its entirety. In some cases, multiple distribution units 100 may be cut from a single extruded conduit/pipe. In some instances, a given distribution unit 100 may be assembled from multiple pieces of conduit/pipe fixed together. In some still other embodiments, distribution unit 100 may be a septic distribution box configured as typically done. Numerous suitable configurations for distribution unit 100 will be apparent in light of this disclosure.

Figure 9:
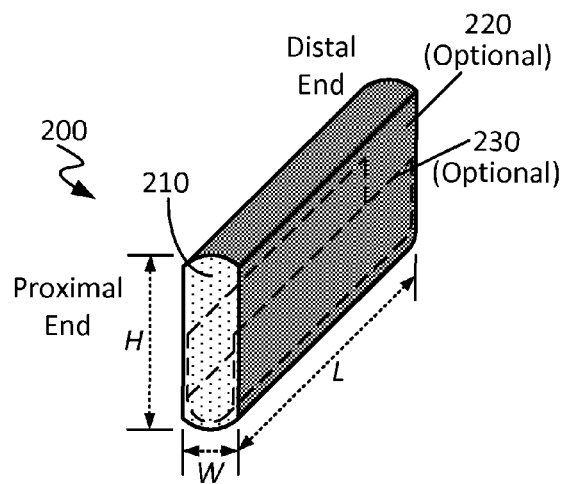
FIG. 9 is an end perspective view of an example treatment fin configured in accordance with an embodiment of the present disclosure.

As previously noted, the distribution unit 100 of a given treatment module 10 may have one or more treatment fins 200 in flow communication therewith. A given treatment fin 200 may have any of a wide range of configurations. FIG. 9 illustrates a treatment fin 200 configured in accordance with an embodiment of the present disclosure. As can be seen here, in some embodiments, treatment fin 200 may include: (1) one or more porous media 210; (2) an optional media retention layer 220 at least partially surrounding porous media 210; and (3) one or more optional internal barrier layers 230 disposed within porous media 210. A discussion of each of these is provided below.

In accordance with some embodiments, the one or more porous media 210 of a given treatment fin 200 may serve, at least in part, to provide surface area upon which bacterial colonies may grow for treatment of liquid waste received from a distribution unit 100 coupled with that treatment fin 200. By varying the size and/or composition of porous media 210, the porosity of a given treatment fin 200 may be customized, as desired for a given target application or end-use. The porous media 210 may provide available surface area for microbial activity and may be, for example, greater than 2×, greater than 5×, greater than 10×, greater than 20×, greater than 50×, or greater than 100× the outer surface area of the treatment fin 200. In some cases, the one or more porous media 210 may occupy at least 90%, at least 80%, at least 70%, at least 60%, or at least 50% of the volume of a host treatment fin 200. In some other cases, the one or more porous media 210 may occupy less than 50% of the volume of a host treatment fin 200.

Porous media 210 may include any of a wide range of porous materials compatible with microbial growth and which exhibit sufficient porosity to allow liquid waste to flow therethrough at a given target rate. In some embodiments, the porous media 210 may have a percent porosity of greater than 50%, greater than 70%, greater than 80%, greater than 90%, or greater than 95%. In some instances, porous media 210 may have a pore volume, for example, of greater than 20% or greater than 50%. In some other instances, porous media 210 may have a pore volume, for example, of less than 50% or less than 20%. In some example embodiments, porous media 210 may include an aggregate material, such as: (1) a natural aggregate, such as crushed stone, coarse sand, gravel, pea gravel, vermiculite, or shells; and/or (2) a synthetic aggregate, such as glass, polymeric beads, sintered glass, sintered polymer, ceramic, an expanded polymer (e.g., polystyrene foam), crushed concrete, or crushed cement. The individual aggregate pieces may be of consistent or varying sizes, as desired, and in some cases, the size may be selected, for example, to optimize or otherwise facilitate liquid flow, bacterial activity, and/or moisture retention for a given treatment fin 200. In some instances, the individual aggregate pieces may be coated with a substance, for example, that increases surface area, increases porosity, increases or reduces surface tension, and/or improves bacterial growth, as desired.

In some embodiments, porous media 210 may include a coarse material, such as, for example: (1) cotton, wool, mineral wool, coconut husk, peat moss, wood chips, mulch, hair, or other natural coarse material; and/or (2) coarse polymeric fibers or beads (e.g., polypropylene; polyethylene; polystyrene), mesh (polymeric; metallic), ground-up plastic, shredded rubber, fiberglass, or other synthetic coarse material. In some instances, the coarse material may be randomly distributed. In some cases, a constituent piece/portion of such coarse material may have an average thickness (e.g., width/diameter), for instance, of: about $\frac{1}{64}$ inch or greater; about $\frac{1}{32}$ inch or greater; about $\frac{1}{16}$ inch or greater; about $\frac{1}{8}$ inch or greater; about $\frac{1}{4}$ inch or greater; or about $\frac{1}{2}$ inch or greater. In some cases, a constituent piece/portion of such coarse material may have an average length, for instance, in the range of about 0.25-1.5 inches (e.g., about 0.25-0.5 inches, about 0.5-0.75 inches, about 0.75-1.0 inches, about 1.0-1.25 inches, about 1.25-1.5 inches, or any other sub-range in the range of about 0.25-1.5 inches). In some embodiments, porous media 210 may include unitary/monolithic blocks of a solid, porous material, such as, for example: (1) a synthetic material, such as porous concrete, an expanded or sintered polymer, or sintered glass; and/or (2) a natural material, such as carbon. In some cases, the blocks may be coated, at least in part, with an impermeable or semi-permeable material (e.g., a sealant) to facilitate retention of liquid therein. For instance, in an example embodiment, an expanded porous foam block may be coated with a semi-permeable polyurethane coating.

In some cases, the porous media 210 of a given treatment fin 200 may be uniform in composition (e.g., a single material is used), whereas in some other cases, the porous media 210 of a given treatment fin 200 may be of non-uniform composition (e.g., multiple materials are used). The porous media 210 utilized in a given treatment fin 200 may be hydrophilic or hydrophobic, as desired for a given target application or end-use. Also, the density of porous material 210 may be varied, in accordance with some embodiments. For instance, in some cases, porous material 210 (or an entire treatment fin 200) may have a density of about 500 g/L or less, about 250 g/L or less, or about 100 g/L or less. In some instances, this may help to provide a treatment fin 200 that is relatively lightweight. Other suitable compositions for the one or more porous media 210 of a given treatment fin 200 will depend on a given application and will be apparent in light of this disclosure.

In accordance with some embodiments, a given treatment fin 200 may be configured such that liquid waste exits the interior of an associated distribution unit 100 and enters into the porous media 210. To that end, liquid waste may flow through a given aperture 122 into a single or multiple treatment fins 200 in flow communication therewith. Such flow of liquid waste may be provided, in part or in whole, by gravity feed, pumping, and/or vacuum draw, in accordance with some embodiments. In some cases, the material composition and structure of the porous media 210 of a given treatment fin 200 may provide for capillary action that facilitates distribution of the liquid waste within fin 200. In accordance with some embodiments, a given treatment fin 200 may be configured, for example, to retain liquid waste (e.g., within an interior/middle region thereof) for an extended period of time, thereby keeping such fin 200 microbially primed during periods of reduced flow from an associated distribution unit 100. To that end, the pore size of porous media 210, the size of treatment fin 200, and/or the location of treatment fin 200 (e.g., in ground; above ground) may be varied, as desired for a given target application or end-use. In some cases, the material composition and structure of porous media 210 may provide for a period of liquid retention that allows for substantial wetting and sufficient dwell time for microbial growth on such media 210. In some cases, such liquid retention may provide for raising of the volume of liquid waste within distribution unit 100 to a level where it can be transferred (e.g., via a pipe 302 coupled with an outlet baffle 160) to a distribution unit 100 of a downstream treatment module 10 coupled therewith. In some instances, porous media 210 may be rigid and resilient against being crushed or otherwise deforming under weight, thereby providing protection against collapse of a given treatment fin 200 (e.g., from or after backfilling).

In accordance with some embodiments, the porous media 210 of a given treatment fin 200 optionally may be disposed within or otherwise enveloped/wrapped with a media retention layer 220. When included, optional media retention layer 220 may serve, at least in part, to: (1) maintain the general structure of porous media 210, thereby helping to maintain a target pore size or pore volume for treatment fin 200; and/or (2) provide for controlled draining/flow of liquid from porous media 210 into the surrounding environment (e.g., treatment sand and/or soil) at a given target rate. To that end, media retention layer 220 may include any of a wide range of permeable, semi-permeable, and/or impermeable materials (e.g., having one or more breaches therein) compatible with microbial growth and which exhibit sufficient porosity to allow liquid to flow therethrough at a given target rate, and may be woven, non-woven, extruded, natural, synthetic, or a combination of any one or more thereof. For example, in some embodiments, media retention layer 220 may be a geotextile fabric (extruded or produced from polymeric or other fibers). The geotextile fabric may be woven or non-woven. As will be appreciated in light of this disclosure, a geotextile fabric may be any fabric that provides one or more of drainage, filtration, separation, reinforcement, protection, erosion control, and stability, for example, of porous media 210. Some example suitable material compositions for optional media retention layer 220 include: polypropylene; polyethylene; polyester; and/or a combination of any one or more thereof. The media retention layer 220 may be hydrophilic or hydrophobic, as desired for a given target application or end-use. In some cases in which media retention layer 220 includes a semi-permeable or an impermeable material, for example, it may be desirable to breach (e.g., needle-punch or otherwise puncture) that material to ensure liquid can flow therethrough at a given target rate. This will render an impermeable layer semi-permeable.

It should be noted, however, that it is not necessary for media retention layer 220 to be so rigid as to support the porous media 210 by itself, as treatment sand, soil, gravel, crushed stone, natural aggregate, synthetic aggregate, glass beads, polymer beads, expanded polymer beads, organic material, cellulose, (or any combination thereof) or other material that surrounds the treatment fin 200 may assist to that end. In some embodiments, optional media retention layer 220 may include a material that is flexible and thus aids in providing a flexible, malleable, or otherwise manipulable treatment fin 200. In some instances, optional media retention layer 220 may be formed from a single, continuous piece of fabric material, whereas in other instances it may be formed from multiple pieces of fabric material that have been assembled with one another. In some cases, optional media retention layer 220 may be formed with one or more seams 222 (optional) joined, for example, by sewing, stapling, welding, heat bonding, and/or gluing. In some instances, media retention layer 220 may be a partial layer that partially encloses (e.g., surrounds less than the total volume of) porous media 210 of a treatment fin 200. In some example cases, media retention layer 220 may be generally U-shaped, shaped as an arcuate portion of a circle/ellipse, or otherwise open-ended and arranged to cover, but not fully surround, porous media 210. In some other example cases, a plurality of media retention layers 220 configured in this manner may be overlapped, interlocked, mated, or otherwise arranged with one another such that, although they individually would only partially enclose porous media 210, together they surround porous media 210 to a given desired degree. Other suitable configurations for optional media retention layer 220 will depend on a given application and will be apparent in light of this disclosure. In embodiments without a media retention layer 220, the porous media 210 can comprise a porous monolith or a plurality of fragments that are retained by an adhesive or by sintering, for example.

In accordance with some embodiments, one or more internal barrier layers 230 optionally may be disposed within porous media 210. When included, a given optional internal barrier layer 230 may serve, at least in part, to catch any sludge/solids which manage to migrate out of distribution unit 100 and into a given treatment fin 200. To that end, a given optional internal barrier layer 230 may be formed from any of the example materials discussed above, for instance, with respect to optional media retention layer 220. In some cases in which a given optional internal barrier layer 230 includes a semi-permeable or an impermeable material, for example, it may be desirable to breach (e.g., needle-punch or otherwise puncture) that material to ensure that liquid can flow therethrough at a given target rate. Also, it may be desirable to ensure that the one or more optional internal barrier layers 230 are appropriately sized and arranged within porous media 210 so as not to prevent or otherwise significantly inhibit the ability of the liquid waste to reach portions of the porous media 210 located, for example, beneath such internal barrier layer(s) 230. In some instances, a given optional internal barrier layer 230 may be a partial layer that partially encloses (e.g., surrounds less than the total volume of) porous media 210 of a treatment fin 200. In some example cases, a given optional internal barrier layer 230 may be generally U-shaped (e.g., as generally shown by the optional barrier layer 230 denoted by the dashed line in FIG. 9), shaped as an arcuate portion of a circle/ellipse, or otherwise open-ended and arranged to cover, but not fully surround, porous media 210. Thus, in accordance with some embodiments, a given optional internal barrier layer 230 may cover less than the entire internal circumference or perimeter of treatment fin 200 (e.g., less than about ¾, less than about ½, less than about ¼, or any other desired amount of the internal surface of treatment fin 200). Other suitable configurations for a given optional internal barrier layer 230 will depend on a given application and will be apparent in light of this disclosure.

In some cases, a plurality of internal barrier layers 230 optionally may be disposed within porous media 210. In accordance with some embodiments, each successive barrier layer 230, going from innermost to outermost, may be of greater surface area and/or size (e.g., encompassing a greater space) than one before it. In accordance with some other embodiments each successive barrier layer 230, going from innermost to outermost, may be of lesser surface area and/or size (e.g., encompassing a lesser space) than one before it. In a more general sense, and in accordance with some embodiments, the size of successive barrier layers 230 can be varied, as desired for a given target application or end-use. In an example case, a first impermeable barrier layer 230 may be configured to form a reservoir having a first volume, and a second impermeable barrier layer 230 may be positioned outside of the first impermeable barrier layer 230 and may form a second volume greater than the first volume. In some embodiments, each successive barrier layer 230, going from innermost to outermost, may be of greater or lesser porosity (e.g., pore quantity, pore size, pore density, etc.) than one before it. The depth and/or curvature of a given barrier layer 230 may be customized. The amount of porous media 210 or other space retained by (e.g., volume defined by) a given barrier layer 230 or between adjacent barrier layers 230 may be customized. In some cases, adjacent barrier layers 230 may have a space there between, which optionally may be filled with porous medium 210. In some instances, the may be a space between a given barrier layer 230 and media retention layer 220, which optionally may be filled with porous medium 210.

In accordance with some embodiments, a spacer layer optionally may be included between consecutive barrier layers 230. When included, a given optional spacer layer may be configured to facilitate the flow of liquids within a treatment fin 200 and to provide space for bacterial activity between adjacent internal barrier layers 230. To that end, a given spacer layer may be constructed from any of a wide range of materials, including, for example: a polymer, such as polyethylene, polypropylene, or polyester; a rubber (natural or synthetic); a metal; a glass; a ceramic; and/or a combination of any one or more thereof. In some cases, a given optional spacer layer may be, for example, a fiber mat formed from coarse, random fibers. In some cases, a given optional spacer layer may be, for example, a mesh having channels therein. In some instances, a given optional spacer layer may be formed from a porous material, such as, for example, a bed of aggregate or polymeric fragments, among others. The thickness of a given spacer layer may be customized, as desired for a given target application or end-use. In some cases, the presence of a given spacer may promote development and/or maintenance of bioactivity on the surfaces of the adjacent internal barrier layers 230 which it separates.

Figure 10A:
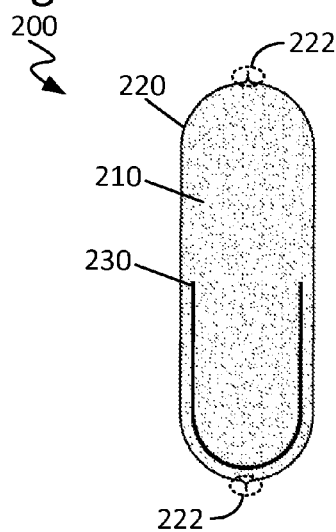
FIGS. 10A-10C are cross-sectional views of several example treatment fins configured in accordance with some embodiments of the present disclosure.
Figure 10B:
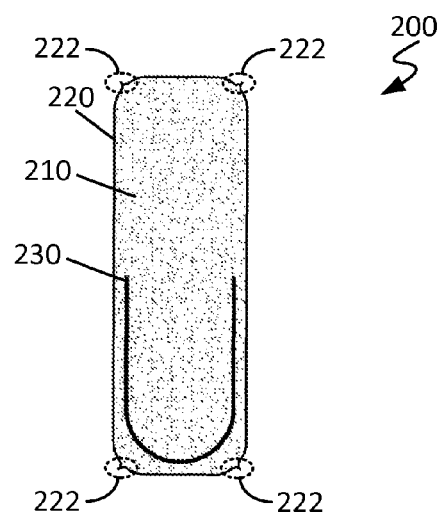
Figure 10C:
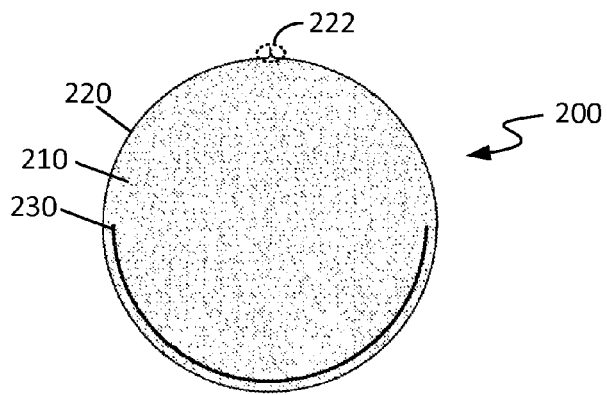

The profile of a given treatment fin 200 may be customized, as desired for a given target application or end-use. FIGS. 10A-10C illustrate cross-sectional views of several example treatment fins 200 configured in accordance with some embodiments of the present disclosure. As can be seen, in some cases, a given treatment fin 200 may be of a curvilinear cross-sectional geometry (e.g., generally oval, as in FIG. 10A; generally circular, as in FIG. 10C; elliptical; oblong; etc.). In some other cases, a given treatment fin 200 may be of a polygonal cross-sectional geometry (e.g., triangular; rectangular; square; rounded-rectangular, as in FIG. 10B; hexagonal; octagonal; etc.). In many cases, the shape of a given treatment fin 200 is malleable from one cross-sectional shape to another without detrimentally affecting performance.

Figure 11A:
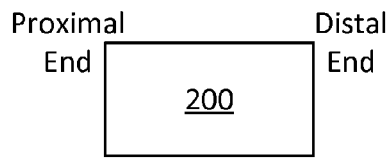
FIGS. 11A-11B are side views of several example treatment fins configured in accordance with some embodiments of the present disclosure.
Figure 11B:
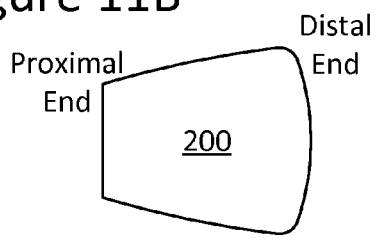
Figure 12A:
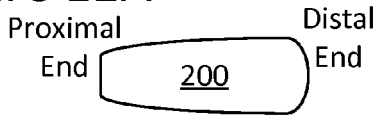
FIGS. 12A-12C are top-down views of several example treatment fins configured in accordance with some embodiments of the present disclosure.
Figure 12B:
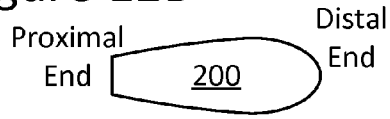
Figure 12C:
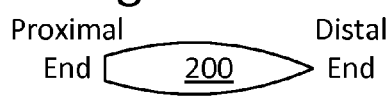
Figure 13A:
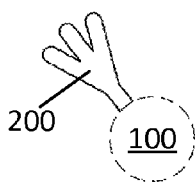
FIGS. 13A-13G are plan views of several example treatment fins configured in accordance with some embodiments of the present disclosure.
Figure 13B:
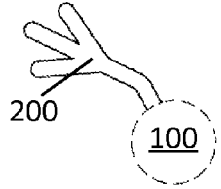
Figure 13C:
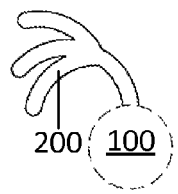
Figure 13D:
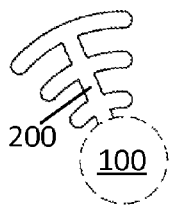
Figure 13E:
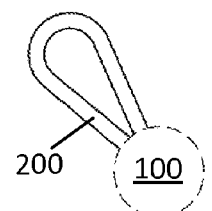
Figure 13F:
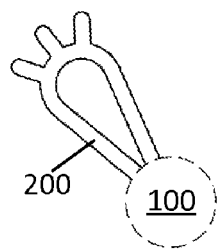
Figure 13G:
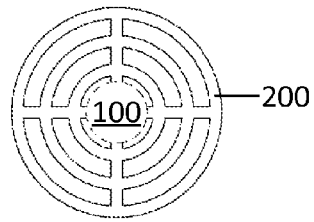

FIGS. 11A-11B illustrate side views of several example treatment fins 200 configured in accordance with some embodiments of the present disclosure. FIGS. 12A-12C illustrate top-down views of several example treatment fins 200 configured in accordance with some embodiments of the present disclosure. FIGS. 13A-13G illustrate top-down views of several example treatment fins 200 configured in accordance with some embodiments of the present disclosure. As can be seen here, in some cases, a given treatment fin 200 may be of substantially uniform profile (e.g., cross-sectional profile; longitudinal profile; etc.). In some other cases, a given treatment fin 200 may be of non-uniform profile. In some instances, a given treatment fin 200 may have a tapered, flared, rounded, or bullet-like profile. In some cases, the top of a given treatment fin 200 may extend above the upper end 132 of an associated distribution unit 100. In some instances, the bottom of a given treatment fin 200 may extend below the lower end 112 of an associated distribution unit 100. In some instances, a given treatment fin 200 may have a cross-sectional shape that changes in at least one of size and/or geometry from a first end to a second end thereof.

In some embodiments, a given treatment fin 200 may exhibit a generally straight/linear longitudinal profile, whereas in some other embodiments, a curved/non-linear longitudinal profile may be provided. For instance, in some embodiments, a given treatment fin 200 may have one, two, three, four, or more points of curvature, as desired for a given target application or end-use. The treatment fin 200 can be curved to obtain a desired distance from a second treatment fin 200 that may be part of the same or a different treatment module 10. In some cases, a given treatment fin 200 may have a branched profile (e.g., as in FIGS. 13A-13D). In some instances, a given treatment fin 200 may have a loop-shaped profile (e.g., as in FIGS. 13E and 13F). In some cases, a given treatment fin 200 may have a radial grid-shaped profile (e.g., as in FIG. 13G). Numerous configurations for a given treatment fin 200 will be apparent in light of this disclosure.

In some embodiments, a given treatment fin 200 may be flexible, malleable, or otherwise manipulable and thus may be manipulated into any shape, as desired for a given target application or end-use. The shape of the treatment fin 200 from end to end may be altered and so may the cross-sectional shape thereof. In an example case, a given treatment fin 200 may be sufficiently malleable such that its thickness can be changed by ±10% without causing damage thereto and/or without negatively impacting its treatment performance. In some cases, a given treatment fin 200 may be of sufficient flexibility, for example, to be manipulated to avoid obstacles (e.g., natural obstacles or other installed system equipment), adjust treatment behavior, and/or expand or collapse system footprint. In an example case, a given treatment fin 200 may be sufficiently flexible so as to be capable of being wrapped around a 1 ft.-diameter pipe without breakage. In another example case, a given treatment fin 200 may be sufficiently flexible so as to be capable of being wrapped around a 6 inch, 12 inch, 18 inch, or 24 inch-diameter pipe without breakage (e.g., breaching media retention layer 220) and/or inhibiting fluid flow through porous medium 210. Other suitable configurations, profiles, and geometries for a given treatment fin 200 will depend on a given application and will be apparent in light of this disclosure.

In some embodiments, a given treatment fin 200 may have a width/diameter (W), for example, in the range of about 3-18 inches (e.g., about 3-6 inches, about 6-12 inches, about 12-18 inches, or any other sub-range in the range of about 3-18 inches). In some embodiments, a given treatment fin 200 may have a height (H), for example, in the range of about 6-24 inches (e.g., about 6-12 inches, about 12-18 inches, about 18-24 inches, or any other sub-range in the range of about 6-24 inches). In some embodiments, a given treatment fin 200 may have a length (L), for example, in the range of about 24-84 inches (e.g., about 24-36 inches, about 36-48 inches, about 48-60 inches, about 60-72 inches, about 72-84 inches, or any other sub-range in the range of about 24-84 inches). In accordance with some embodiments, the volume of a given treatment fin 200 may be, for example, about 1 gallon or greater, about 2 gallons or greater, about 3 gallons or greater, about 4 gallons or greater, or about 5 gallons or greater. In some embodiments, a given treatment fin 200 may have a volume, for example, in the range of about 5-10 gallons, about 10-15 gallons, or about 15-20 gallons. In some other embodiments, a given treatment fin 200 may have a volume of about 20 gallons or greater. It should be noted, however, that the present disclosure is not so limited to only these example dimensional ranges for a given treatment fin 200, as in a more general sense, and in accordance with an embodiment, the size of a given treatment fin 200 may be customized, as desired for a given target application or end-use. Numerous configurations will be apparent in light of this disclosure.

In some instances, the treatment fins 200 of a given treatment module 10 may be configured to maximize fin area per ground area for a target treatment capacity. In accordance with some embodiments, a plurality of treatment fins 200 can be in flow communication with a given distribution unit 100 such that the area required for installing one treatment fin 200 can be, for example, less than 100 ft$^2$, less than 50 ft$^2$, less than 20 ft$^2$, or less than 10 ft$^2$. In some embodiments, the ratio of square feet of horizontal space required per treatment fin 200 is, for example: greater than about 5:1; greater than about 10:1; greater than about 50:1; or greater than about 100:1. In some embodiments, this ratio may be, for example: less than about 100:1; less than about 50:1; less than about 20:1; less than about 10:1; or less than about 5:1. In accordance with some embodiments, the total square footage of fin outer surface area per square foot of ground surface can be, for example: greater than about 1:1; greater than about 2:1; greater than about 3:1; greater than about 5:1; or greater than about 10:1. In some embodiments, a given treatment fin 200 may have an exterior or outer surface area that is greater than the exterior surface area of a distribution unit 100 associated therewith. In some cases, a given treatment fin 200 (or arrangement of treatment fins 200) may have an outer surface area, for example, of about 10 ft$^2$ or greater, about 15 ft$^2$ or greater, or about 20 ft$^2$ or greater. Numerous configurations will be apparent in light of this disclosure.

Figure 14A:
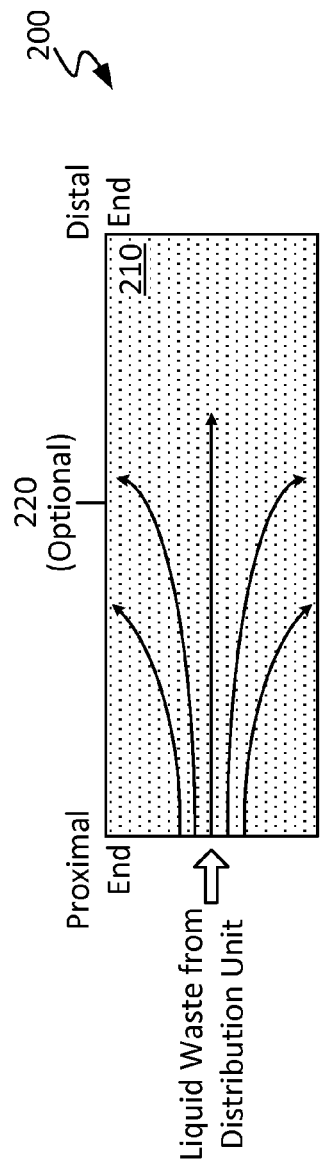
FIGS. 14A-14B are side cross-sectional views of several example treatment fins configured in accordance with some embodiments of the present disclosure.
Figure 14B:
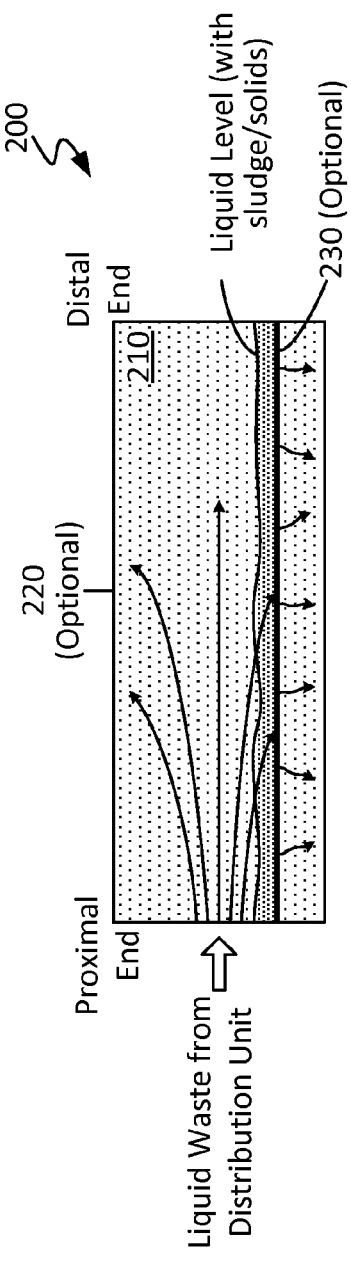

FIGS. 14A-14B illustrate cross-sectional side views of some example treatment fins 200 configured in accordance with some embodiments of the present disclosure. As can be seen from FIG. 14A, for example, liquid waste received by treatment fin 200 at its proximal end (which may be open to the sidewall 102 of the mid-portion 120 of a distribution unit 100) may migrate generally axially along treatment fin 200 through porous media 210, before passing radially out of porous media 210 (e.g., through optional media retention layer 220, if included). As can be seen from FIG. 14B, however, the presence of one or more optional internal barrier layers 230 may affect the radial migration of liquid waste within treatment fin 200, causing liquid (and any attendant solids/sludge) to settle/accumulate on the barrier layer(s) 230, at least temporarily. The degree of permeability of the one or more optional internal barrier layers 230 may be customized to provide a given rate of flow therethrough, as desired for a given target application or end-use. In some instances, a given optional internal barrier layer 230 may serve to reduce flow downwardly through porous medium 210 and, optionally, without reducing longitudinal flow therethrough. In some embodiments, a given treatment fin 200 may be configured such that liquid waste flows into and/or is retained by only a lower portion thereof (e.g., within the lower 50% of the height of such fin 200). In some other embodiments, a given treatment fin 200 may be configured such that liquid waste flows into only an upper portion thereof (e.g., within the upper 50% of the height of such fin 200) before being allowed to flow downward into a lower portion of the fin 200. In some cases, the geometry and/or size of a given treatment fin 200 may be configured to facilitate gravity-driven draining/flow downward and/or wicking/flow upward through its porous media 210.

In some other embodiments, a given treatment fin 200 may be configured such that two or more of its ends (e.g., proximal, distal, or otherwise) are in flow communication with distribution unit 100. For instance, consider configurations such as those of FIGS. 13E-13G. As will be appreciated in light of this disclosure, in such cases, liquid waste received by such a treatment fin 200 may migrate as described with respect to FIGS. 14A-14B, but from both (or multiple) ends or points. As will be further appreciated in light of this disclosure, the same may be said for such configurations also having optional pipes 303/305, such as are described below with respect to FIGS. 17A-17B, in accordance with some embodiments.

In some cases, treatment fin 200 optionally may include one or more reinforcement structures (e.g., a rigid framework) therein that are configured to serve, at least in part, to prevent or otherwise reduce the opportunity for collapse of an associated treatment fin 200 and/or for passage of porous medium 210 therefrom. In some instances, such a structure may partition the interior of a host treatment fin 200 into one or more sections containing porous medium 210 and one or more sections devoid of porous medium 210. In some example embodiments, one or more wire ribs may be disposed within treatment fin 200. In some other embodiments, a frame may be disposed within treatment fin 200. In some other embodiments, one or more rigid or flexible pipes may be disposed within treatment fin 200. The geometry and dimensions of a given optional reinforcement structure may be customized, as desired for a given target application or end-use. If a given reinforcement structure is sufficiently large in size, it may be desirable to form passageways (e.g., perforations or other openings/orifices) therein which allow for liquid to flow therethrough so as to minimize or otherwise reduce any inhibitive effect that the presence of the reinforcement structure might have on the flow of liquid waste through the associated treatment fin 200. Other suitable configurations for a given optional reinforcement structure will depend on a given application and will be apparent in light of this disclosure.

Figure 15:
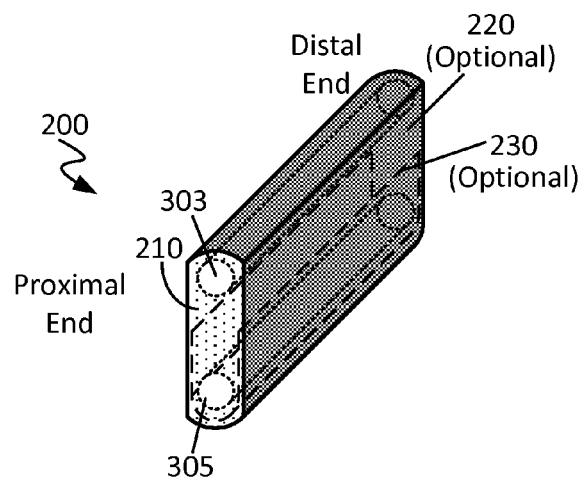
FIG. 15 is an end perspective view of an example treatment fin configured in accordance with another embodiment of the present disclosure.
Figure 16A:
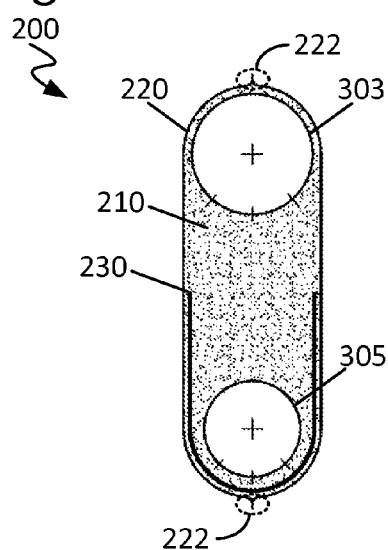
FIGS. 16A-16C are cross-sectional views of several example treatment fins configured in accordance with some embodiments of the present disclosure.
Figure 16B:
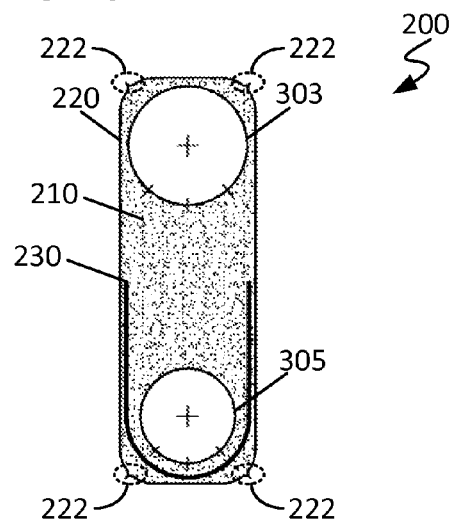
Figure 16C:
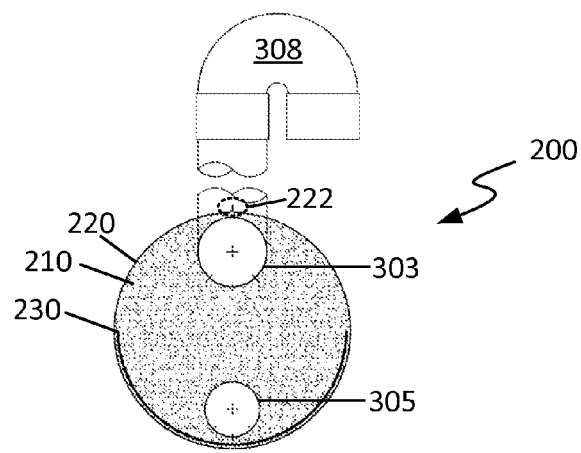

FIG. 15 illustrates a treatment fin 200 configured in accordance with another embodiment of the present disclosure. FIGS. 16A-16C illustrate cross-sectional views of several example treatment fins 200 configured in accordance with some embodiments of the present disclosure. As can be seen here, in some embodiments, treatment fin 200 optionally may include a pipe 303 and/or a pipe 305 passing through its one or more porous media 210. A given pipe 303/305 may have one or more apertures (e.g., perforations or other openings/orifices) formed in its sidewall which allow for liquid waste carried through such pipe 303/305 to drain into the surrounding porous media 210, in accordance with some embodiments. In accordance with some other embodiments, the one or more apertures may allow for air flow within a given pipe 303/305 and into the host treatment fin 200. In some instances, such air flow may facilitate aerobic treatment of liquid waste. In some cases, a given treatment fin 200 including a pipe 303 and/or a pipe 305 may be of a curvilinear cross-sectional geometry (e.g., generally oval, as in FIG. 16A; generally circular, as in FIG. 16C; elliptical; etc.). In some other cases, a given treatment fin 200 including a pipe 303 and/or a pipe 305 may be of a polygonal cross-sectional geometry (e.g., triangular; rectangular; square; rounded-rectangular, as in FIG. 16B; hexagonal; octagonal; etc.). A given pipe 303/305 may be smooth-walled, corrugated, or a combination thereof, in part or in whole, as desired. As will be appreciated in light of this disclosure, a given pipe 303/305 may be formed from any of the example materials discussed below, for example, with respect to pipes 302/304. In some instances, optional pipe 303 may be coupled with a vent stack 308 (e.g., as in FIG. 16C). To provide flow communication between a given pipe 303/305 and a distribution unit 100, one or more perforations (e.g., slotted openings or other suitable apertures) may be formed within the sidewall 102 of distribution unit 100. Such perforation(s) may be configured to permit air and/or liquid waste to flow between distribution unit 100 and a given pipe 303/305. The dimensions and arrangement of such perforation(s) may be customized, as desired for a given target application or end-use. Other suitable configurations will depend on a given application and will be apparent in light of this disclosure.

Figure 17A:
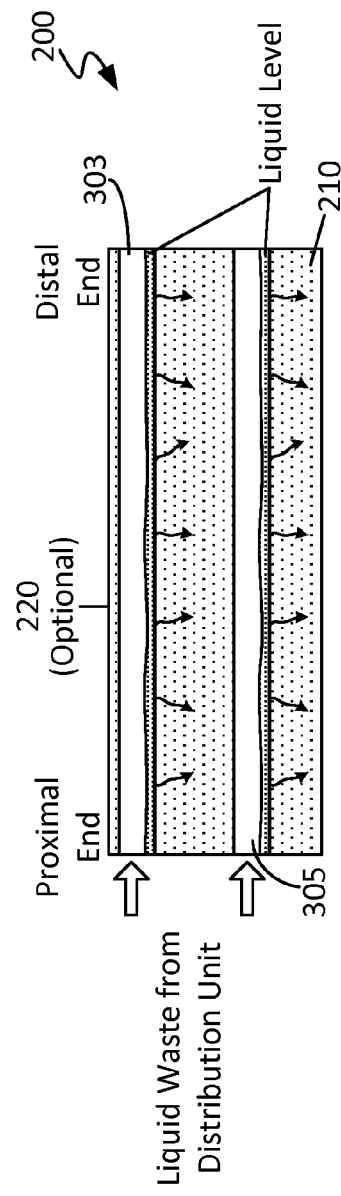
FIGS. 17A-17B are side cross-sectional views of several example treatment fins configured in accordance with some embodiments of the present disclosure.
Figure 17B:
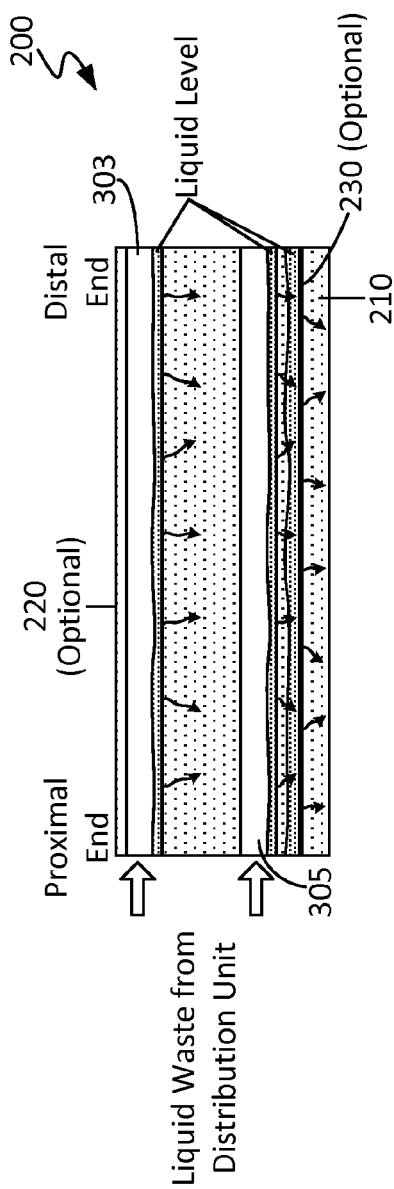

FIGS. 17A-17B illustrate cross-sectional side views of some example treatment fins 200 configured in accordance with some embodiments of the present disclosure. As can be seen from FIG. 17A, for example, liquid waste received by treatment fin 200 at its proximal end (which may be open to the sidewall 102 of the mid-portion 120 of a distribution unit 100) may migrate generally axially along treatment fin 200 through a pipe 303 and/or a pipe 305 in porous media 210, before draining therefrom and passing radially out of porous media 210 (e.g., through optional media retention layer 220, if included). As can be seen from FIG. 17B, however, the presence of one or more optional internal barrier layers 230 may affect the radial migration of liquid waste within treatment fin 200, causing liquid (and any attendant solids/sludge) to settle/accumulate on the barrier layer(s) 230, at least temporarily. The degree of permeability of a given optional pipe 303, optional pipe 305, and the one or more optional internal barrier layers 230 may be customized to provide a given rate of flow therethrough, as desired for a given target application or end-use. In a general sense, configuration of a given treatment fin 200 with one or more pipes 303/305 may serve to separate its treatment function from a conduit/liquid waste conveyance function.

The quantity and arrangement of treatment fins 200 for a given treatment module 10 can be customized, as desired for a given target application or end-use. In some cases, a given treatment module 10 may include 1-10 treatment fins 200 (e.g., 1-3 treatment fins 200; 3-5 treatment fins 200; 5-8 treatment fins 200; 8-10 treatment fins 200). In some other cases, a given treatment module 10 may include 10 or more treatment fins 200 (e.g., 15 or more; 20 or more; etc.). In some embodiments, the treatment fins 200 of a given treatment module 10 may be configured to extend radially from a distribution unit 100 (e.g., in a general hub-and-spoke arrangement). In some example cases, two or more treatment fins 200 may extend radially in a horizontal plane from an associated distribution unit 100. In some embodiments in which a distribution unit 100 of polygonal shape is provided, a single treatment fin 200 may extend from a given side/face of distribution unit 100, whereas in some other such embodiments, multiple treatment fins 200 may extend from a given side/face of such distribution unit 100 (e.g., such as can be seen with respect to FIG. 22). In some example cases, neighboring treatment fins 200 may be spaced with respect to one another about 3-6 inches apart, about 6-12 inches apart, or about 12 inches apart or greater. In some cases, neighboring treatment fins 200 may be radially spaced with respect to one another in a horizontal plane about 15° apart or less, about 30° apart or less, about 45° apart or less, about 60° apart or less, about 75° apart or less, or about 90° apart or less. In some other cases, neighboring treatment fins 200 may be radially spaced with respect to one another about 90°-120° apart, 120°-150° apart, or about 120°-180° apart. In any case, as discussed herein, treatment sand (and/or other suitable treatment or filtration media) may be utilized to fill interstitial space between treatment fins 200, in accordance with some embodiments. In some instances, any portion of a given treatment fin 200 not contacting a distribution unit 100 may be surrounded by treatment sand (and/or other suitable treatment or filtration media). Other suitable quantities and arrangements of treatments fins 200 for a given treatment module 10 will depend on a given application and will be apparent in light of this disclosure.

Figure 18A:
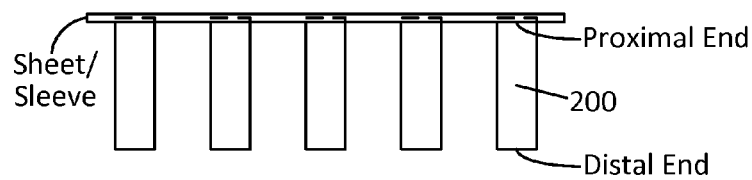
FIGS. 18A-18E illustrate an example method of assembling a plurality of treatment fins in flow communication with a distribution unit, in accordance with an embodiment of the present disclosure.

FIGS. 18A-18E illustrate an example method of assembling a plurality of treatment fins 200 in flow communication with a distribution unit 100, in accordance with an embodiment of the present disclosure. FIG. 18A depicts a plurality of treatment fins 200. The plurality of treatment fins 200 may be provided in a symmetrical pattern or an asymmetrical pattern, as desired. In some embodiments, the plurality of fins 200 may be affixed to or otherwise share a flexible sheet/sleeve. In some other embodiments, the plurality of fins 200 may be formed from a single flexible sheet/sleeve of media retention layer 220 that has been manipulated to form several recesses therein which define the volume of the treatment fins 200 and which may be filled with porous media 210. In some such cases, the recesses of the media retention layer 220 may be filled with the porous media 210 on site to avoid any need for transportation of a bulky plurality of treatment fins 200. In other cases, filling with porous media 210 may be performed off site. A given treatment fin 200 may be filled partially (e.g., less than 90%, less than 75%, less than 50%) or entirely with porous material 210, as desired. Thus, in a general sense, a given treatment fin 200 may be a non-hollow treatment body that is filled with one or more porous media 210, in accordance with some embodiments.

The proximal end of each treatment fin 200 may be left open, for example, to facilitate flow communication with distribution unit 100 when assembled therewith, and the distal end of each treatment fin 200 may be sealed/sewn, for example, to prevent loss of porous media 210. In some embodiments, the sleeve/sheet may be made of an impermeable fabric that ensures that liquid waste which has flowed through the sidewall 102 at the mid-portion 120 of distribution unit 100 remains confined between it and the exterior of distribution unit 100, thus creating a common space containing liquid waste from which the treatment fins 200 are fed.

Figure 18B:
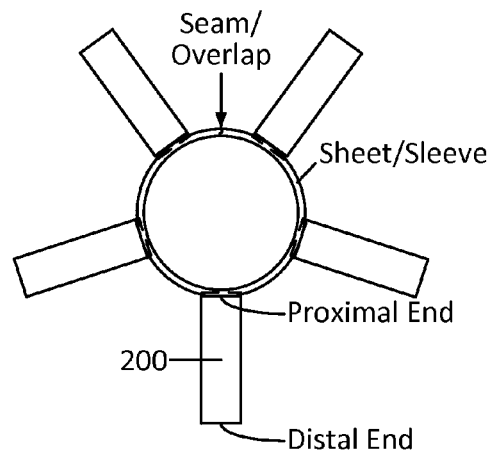
Figure 18C:
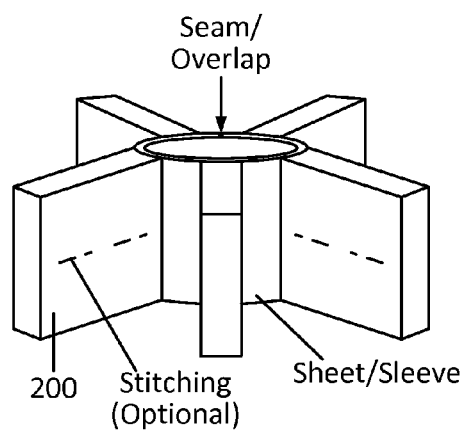
Figure 18D:
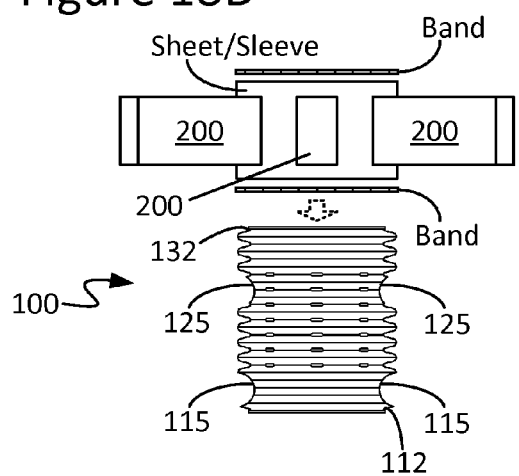
Figure 18E:
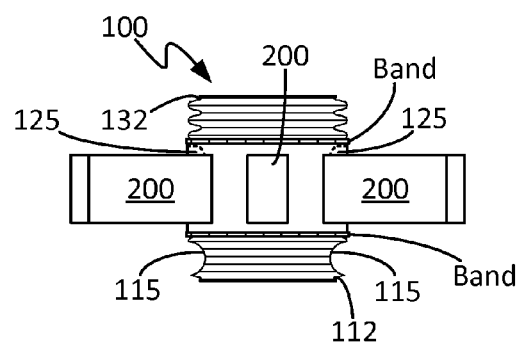

As in FIGS. 18B-18C, the sheet/sleeve may be folded back towards/onto itself, radially fanning out the plurality of treatment fins 200. In FIG. 18D, the sheet/sleeve may be slid onto or wrapped around the distribution unit 100. One or more securing bands (e.g., wires, clamps, ties, etc.) may be utilized to secure the sheet/sleeve once it is in place around the distribution unit 100. In FIG. 18E, the treatment fins 200 are positioned about the mid-portion 120 (having one or more apertures 122), and the band(s) are tightened to secure the sheet/sleeve about the distribution unit 100 (e.g., against an exterior corrugation ridge of distribution unit 100, if corrugated). In some embodiments, the band(s) may seal the sheet/sleeve against the exterior of unit 100 to provide a liquid-tight sealing relationship at the banded edge(s). Other suitable techniques for assembling one or more treatment fins 200 about a given distribution unit 100 will depend on a given application and will be apparent in light of this disclosure. For instance, in accordance with some other embodiments, treatment fins 200 may be assembled (e.g., with one another and/or distribution unit 100) with a hook-and-loop fastener fabric, such as VELCRO fabric, or other suitable fastener material. In accordance with some other embodiments, a given treatment fin 200 optionally may include stitching along one or more of its sides (e.g., such as is generally shown in FIG. 18C). For example, a treatment fin 200 may include stitching that passes from one side thereof, through its body, to another side thereof. In some cases in which treatment fin 200 is formed using a fabric or other flexible material, tightening of the stitching may cause the sides of the treatment fin 200 to draw inwards toward one another, producing localized puckering or other dimpling of the flexible material (e.g., of media retention layer 220). In some such instances, this may form generally cell-like pockets or pillowed regions along the treatment fin 200. The presence of such optional stitching may provide additional structural support for the form of the treatment fin 200, in some instances. In some cases in which a pipe 303/305 is included within treatment fin 200, such optional stitching may help to support and/or physically separate such elements (e.g., pipe 303 may reside above the stitching, whereas pipe 305 may reside below the stitching).

Example System Installations/Arrangements

Treatment module 10 may be configured, in accordance with some embodiments, to be installed, in part or in whole, above the ground and/or within the ground. When installed, the distribution unit 100 of a given module 10 may be oriented substantially vertically (e.g., within 10° of vertical) with respect to the ground or other installation site, in accordance with some embodiments. In some such cases, the one or more treatment fins 200 associated therewith may be oriented substantially horizontally (e.g., within 10° of horizontal) with respect to the ground or other installation site. In an example case, a given treatment fin 200 may extend substantially parallel (e.g., precisely parallel or otherwise within a given tolerance) to the surface of the ground. In some other embodiments, however, the distribution unit 100 of a given module 10 may be oriented substantially horizontally (e.g., precisely horizontally or otherwise within a given tolerance) with respect to the ground or other installation site. In some such cases, the one or more treatment fins 200 may be oriented substantially vertically (e.g., within 10° of vertical) with respect to the ground or other installation site. In an example case, a given treatment fin 200 may extend substantially perpendicular (e.g., precisely perpendicular or otherwise within a given tolerance) to the surface of the ground. Numerous configurations will be apparent in light of this disclosure.

In some embodiments, a given treatment module 10 may be configured in a general hub-and-spoke arrangement, with its distribution unit 100 as the hub and its one or more treatment fins 200 as the spoke(s). In some cases, a plurality of treatment fins 200 may be arranged about a distribution unit 100 such that they lay within a common plane along the length of unit 100, whereas in some other cases, a plurality of fins 200 may be provided in a spiral, helical, or otherwise staggered arrangement along the length of unit 100. In some instances, the treatment fins 200 of a given treatment module 10 may be configured such that a horizontal plane passes through all (or some sub-set) thereof. In accordance with some embodiments, the space around the distribution unit 100 and the one or more treatment fins 200 of a given treatment module 10 may be backfilled, for example, with treatment sand (and/or any other suitable treatment/filtration media), and topsoil may be disposed there over. The presence of such supplemental treatment media may provide for further treatment of liquid draining from a given treatment fin 200 before such liquid enters into the surrounding/underlying soil, in accordance with an embodiment.

Figure 19A:
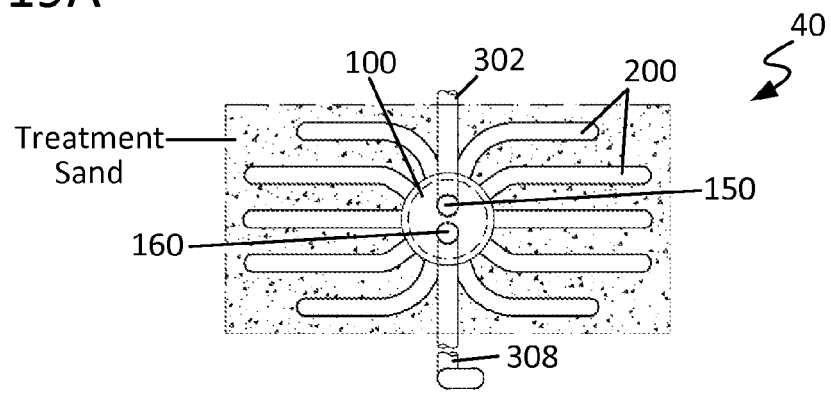
FIG. 19A is a plan view of a rectangular treatment cell configured in accordance with an embodiment of the present disclosure.
Figure 19B:
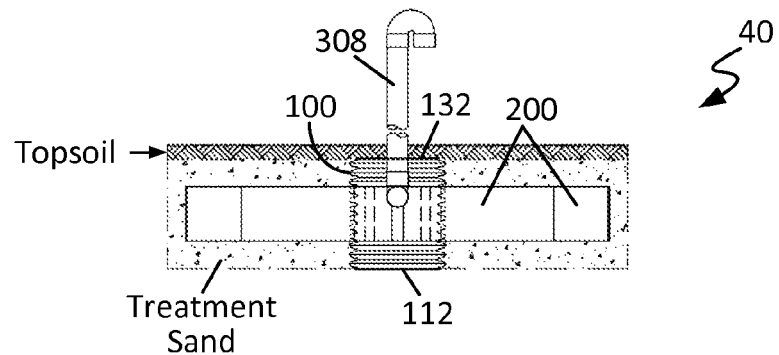
FIG. 19B is a side view of the rectangular treatment cell of FIG. 19A.
Figure 19C:
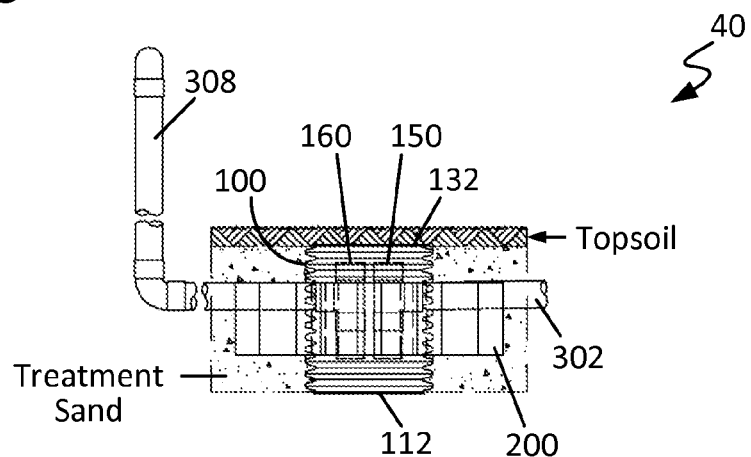
FIG. 19C is another side view of the rectangular treatment cell of FIG. 19A.

The arrangement of treatment fins 200 and surrounding treatment sand can be customized to provide a treatment cell 40 (or treatment cell 50, discussed below) having a treatment module 10 of a given configuration, as desired for a given target application or end-use. For instance, consider FIGS. 19A-19C, which illustrate several views of a rectangular treatment cell 40 configured in accordance with an embodiment of the present disclosure. In some cases, treatment fins 200 may be at substantially the same height with respect to one another along the length of distribution unit 100 (e.g., as in FIG. 19B). However, as previously noted above with respect to FIG. 1C, in some other cases, a first treatment fin 200 may be vertically offset from a second treatment fin 200 by a vertical distance ($\Delta Y$) along the length of unit 100. In some example cases, first and second treatment fins 200 may be separated by a vertical offset distance ($\Delta Y$), for example, in the range of about 0.5-6.0 inches (e.g., about 0.5-2.0 inches, about 2.0-4.0 inches, about 4.0-6.0 inches, or any other sub-range in the range of about 0.5-6.0 inches). Greater or lesser vertical offset distance ($\Delta Y$) values may be provided, as desired. In some such cases in which the treatment fins 200 are staggered in this manner, liquid waste may accumulate within distribution unit 100, reaching each fin 200 in succession up the length of unit 100, in accordance with an embodiment.

Figure 23A:
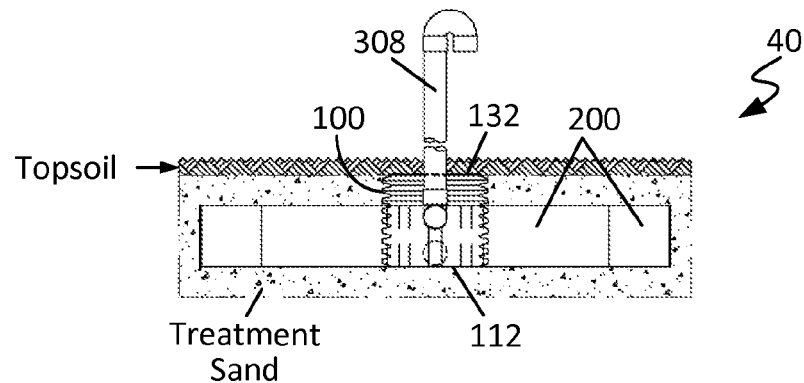
FIG. 23A is a side view of a rectangular treatment cell configured in accordance with another embodiment of the present disclosure.
Figure 23B:
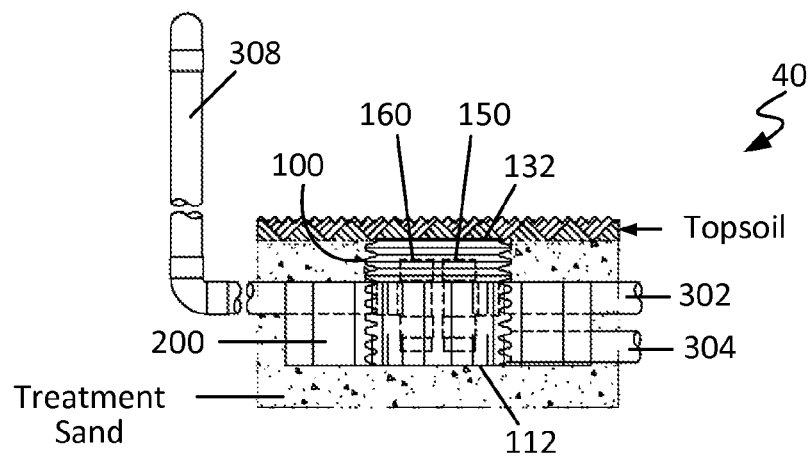
FIG. 23B is another side view of the rectangular treatment cell of FIG. 23A.

In some instances, a given treatment fin 200 may be arranged such that its major axis is substantially parallel with the longitudinal axis of an associated distribution unit 100. In some other instances, a given treatment fin 200 may be arranged such that its major axis is offset in alignment with respect to the longitudinal axis of an associated distribution unit 100. For example, a treatment fin 200 may be oriented such that its major axis is offset from the longitudinal axis of a unit 100 by about 45° (e.g., ±5°), by about 90° (e.g., ±5°), or by any other angle, as desired for a given target application or end-use. Also, consider FIGS. 23A-23B, which illustrate several views of a rectangular treatment cell 40 configured in accordance with another embodiment of the present disclosure. As can be seen here, a distribution unit 100 may have a truncated sump portion 110 (e.g., as previously discussed with respect to FIGS. 7A-7D), thereby reducing the total vertical depth of an installed treatment module 10, in accordance with an embodiment.

Figure 20A:
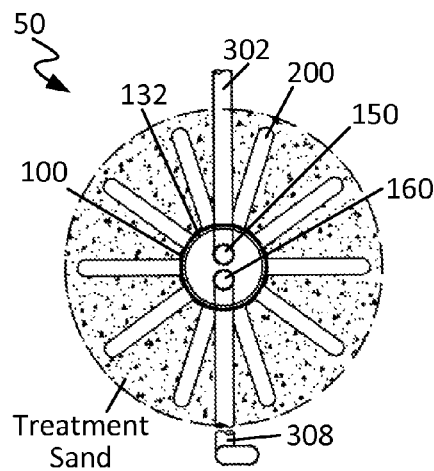
FIG. 20A is a plan view of a rounded treatment cell configured in accordance with an embodiment of the present disclosure.
Figure 20B:
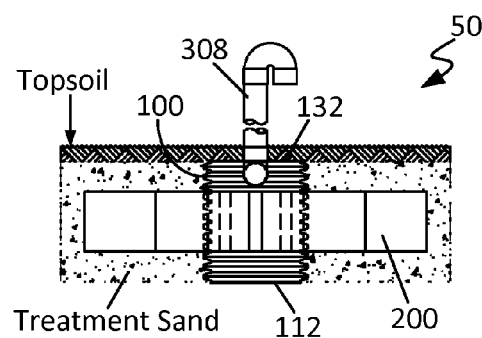
FIG. 20B is a side view of the rounded treatment cell of FIG. 20A.
Figure 21B:
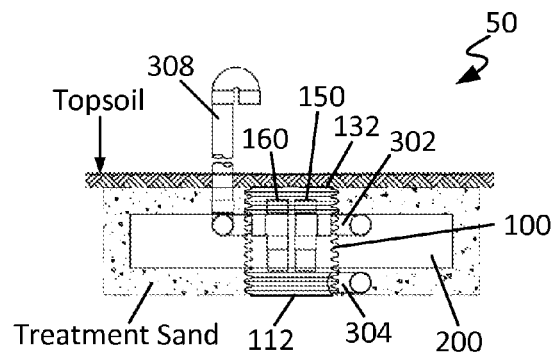
FIG. 21B is a side view of the rounded treatment cell of FIG. 21A.

It should be noted, however, that the present disclosure is not so limited only to rectangular treatment cell configurations. For instance, consider FIGS. 20A-20B, which illustrate several views of a rounded treatment cell 50 configured in accordance with an embodiment of the present disclosure, and FIGS. 21A-21B, which illustrate several views of a rounded treatment cell 50 configured in accordance with another embodiment of the present disclosure. As can be seen from these figures, in some cases, treatment fins 200 may be arranged about distribution unit 100 in a generally linear configuration (e.g., as in FIG. 20A), whereas in some other cases, a generally spiraled arrangement of treatment fins 200 may be provided (e.g., as in FIG. 21A). Furthermore, consider FIG. 22, which illustrates a rounded treatment cell 50 configured in accordance with another embodiment of the present disclosure. As can be seen here, in some cases, a multi-faceted distribution unit 100 may be provided, and multiple treatment fins 200 may be in flow communication with a given side/facet of such unit 100, in accordance with some embodiments. Other suitable treatment cell geometries (e.g., curvilinear; polygonal) will depend on a given application and will be apparent in light of this disclosure.

In accordance with some embodiments, multiple treatment modules 10 may be operatively coupled with one another. The quantity and arrangement of modules 10 can be customized, as desired for a given target application or end-use. In some cases, a plurality of treatment modules 10 may be arranged, for example, in a straight trench arrangement, a curved trench arrangement, a substantially horizontal planar arrangement on a hill, a graded arrangement (e.g., within ±25° of horizontal), a bed arrangement, a tiered arrangement, and/or a serial distribution arrangement. Multiple treatment modules 10 may be coupled in a linear or non-linear fashion, as desired. Multiple treatment modules 10 may be coupled in series and/or parallel arrangements, as desired. The spacing of treatment modules 10 may be customized, for example, to adjust the distribution of liquid waste across such system and/or the total system footprint.

Figure 24B:
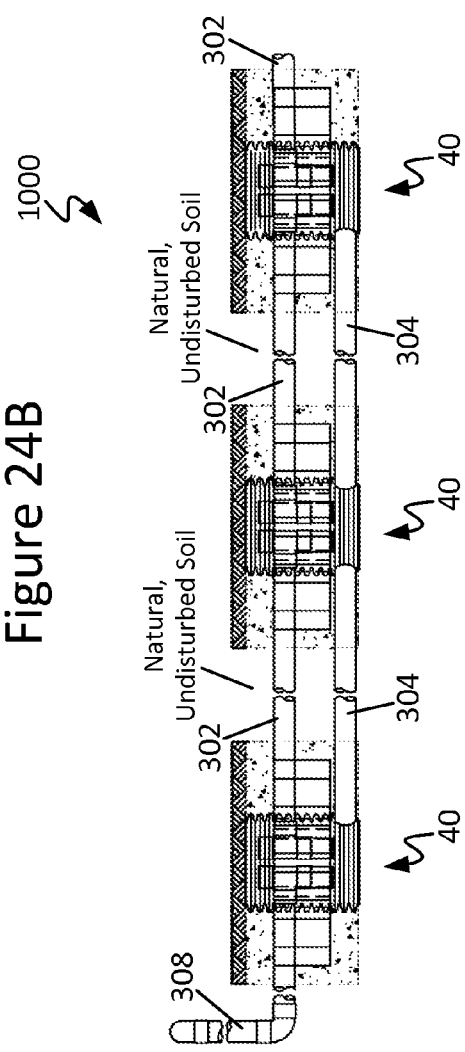
FIG. 24B is a side view of the serial arrangement of FIG. 24A.
Figure 24C:
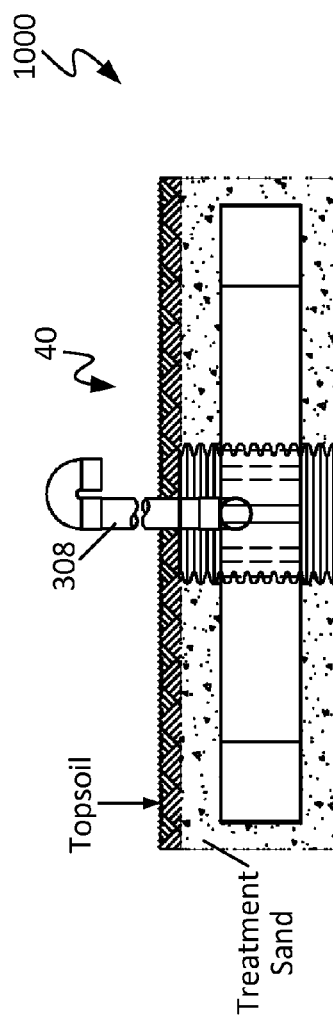
FIG. 24C is another side view of the serial arrangement of FIG. 24A.
Figure 24A:
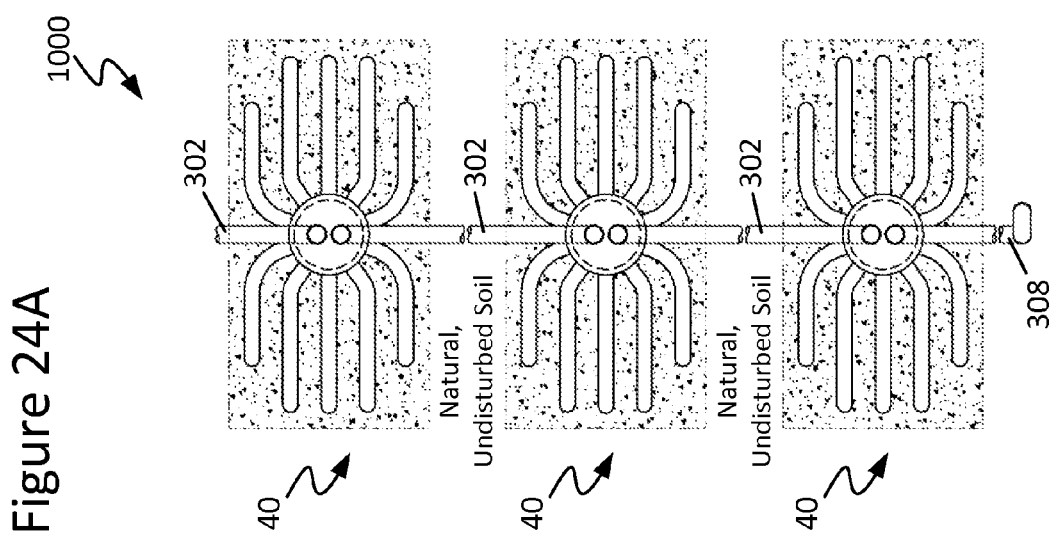
FIG. 24A is a plan view of a serial arrangement of rectangular treatment cells configured in accordance with an embodiment of the present disclosure.
Figure 25A:
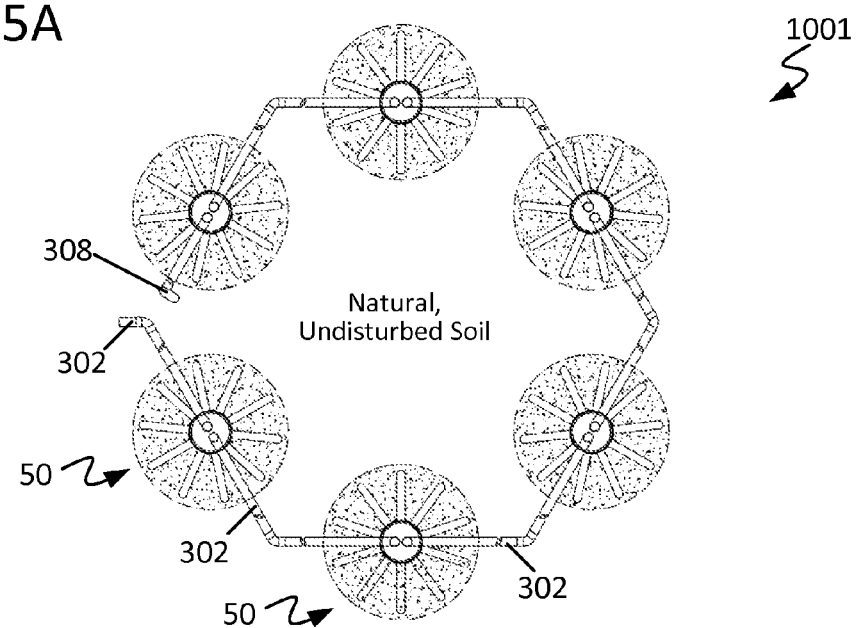
FIG. 25A is a plan view of a serial arrangement of rounded treatment cells configured in accordance with an embodiment of the present disclosure.
Figure 25B:
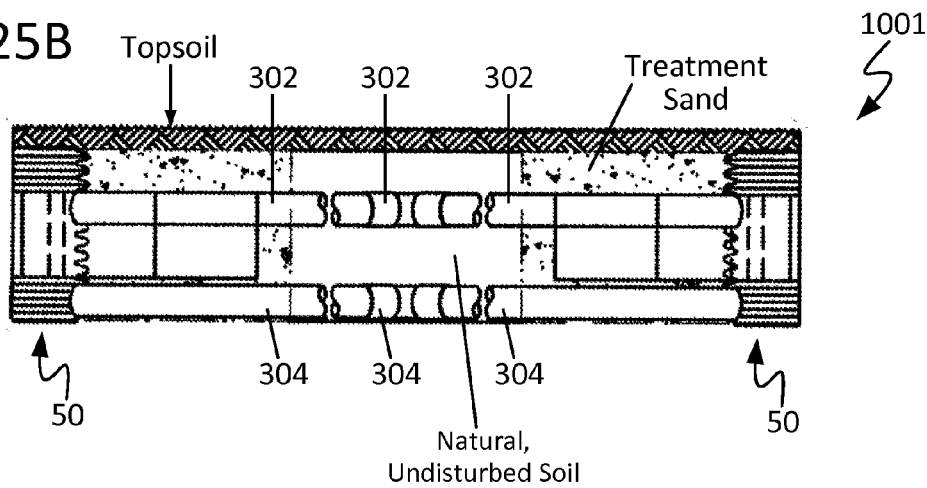
FIG. 25B is a partial side view of the serial arrangement of FIG. 25A.
Figure 25C:
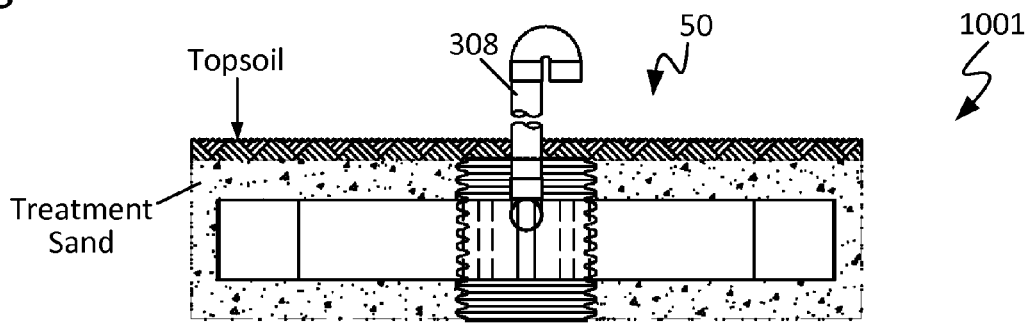
FIG. 25C is another side view of the serial arrangement of FIG. 25A.

FIGS. 24A-24C illustrate several views of a serial arrangement 1000 of rectangular treatment cells 40 configured in accordance with an embodiment of the present disclosure. FIGS. 25A-25C illustrate several views of a serial arrangement 1001 of rounded treatment cells 50 configured in accordance with another embodiment of the present disclosure. As can be seen from these figures, multiple treatment modules 10 of multiple treatment cells 40 may be connected with one another via a plurality of pipes 302 and/or pipes 304. A first treatment cell 40 in a given series may be coupled with a source of liquid waste via a pipe 302, and the last treatment cell 40 in the series may be coupled with a vent stack 308 via a pipe 302. As can be seen further, the mid-portions 120 of the distribution units 100 may be coupled in flow communication with one another via pipes 302 (e.g., serial feed pipes), and the sump portions 110 thereof may be coupled in flow communication with one another via pipes 304 (e.g., equalization pipes). A given pipe 302/304 may be any standard and/or custom pipe/conduit, and the geometry, size, and material composition of a given pipe 302/304 can be customized, as desired for a given target application or end-use. In accordance with some embodiments, pipe 302 and/or pipe 304 may be formed from an impermeable material to prevent or otherwise reduce leakage of liquid waste migrating between distribution units 100 in flow communication with one another. To that end, a given pipe 302/304 may be formed from any of the example material(s) discussed above, for instance, with respect to distribution unit 100, in accordance with some embodiments.

Figure 26A:
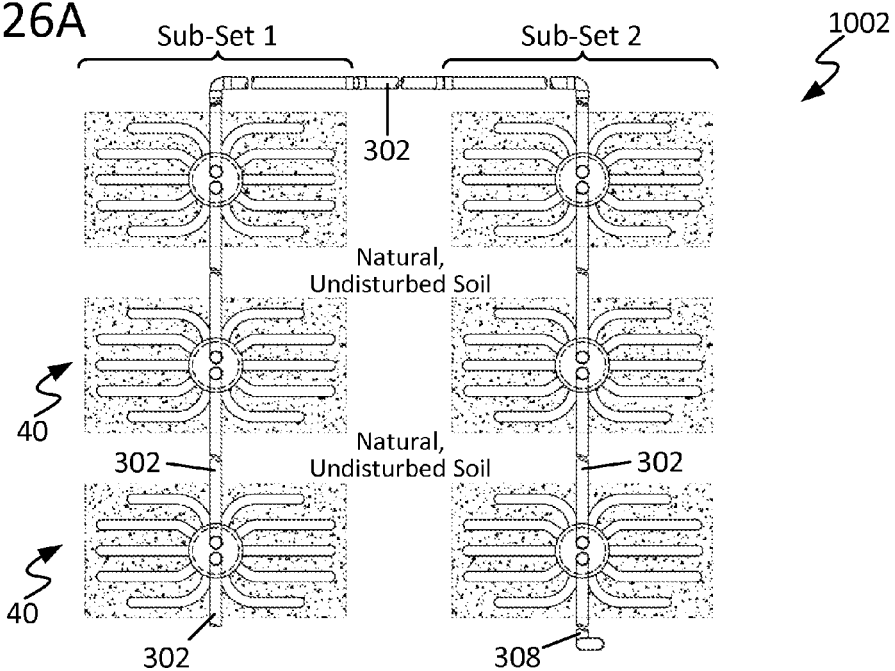
FIG. 26A is a plan view of a terraced serial arrangement of rectangular treatment cells configured in accordance with an embodiment of the present disclosure.
Figure 26B:
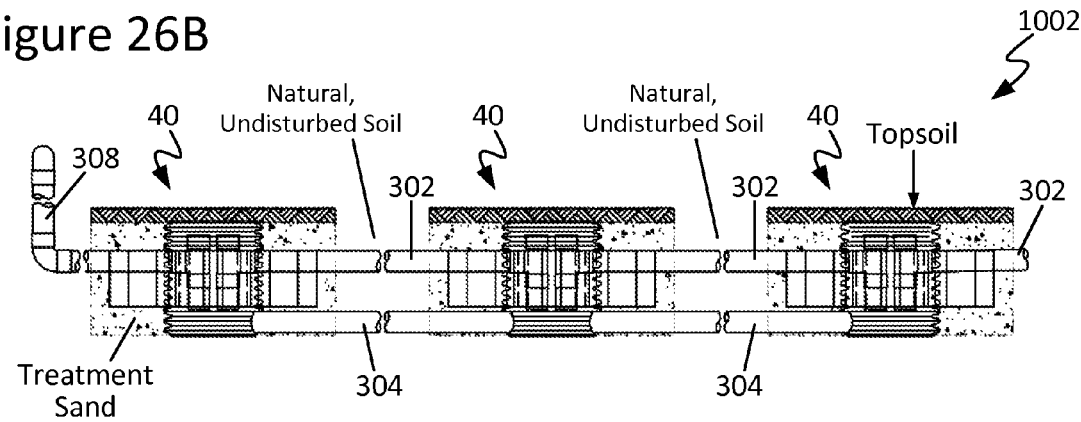
FIG. 26B is a side view of the terraced serial arrangement of FIG. 26A.
Figure 26C:
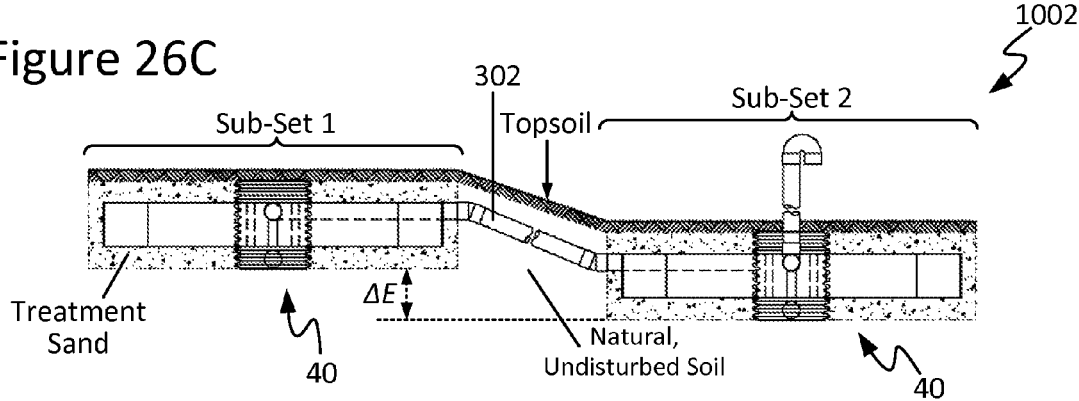
FIG. 26C is another side view of the terraced serial arrangement of FIG. 26A.
Figure 27A:
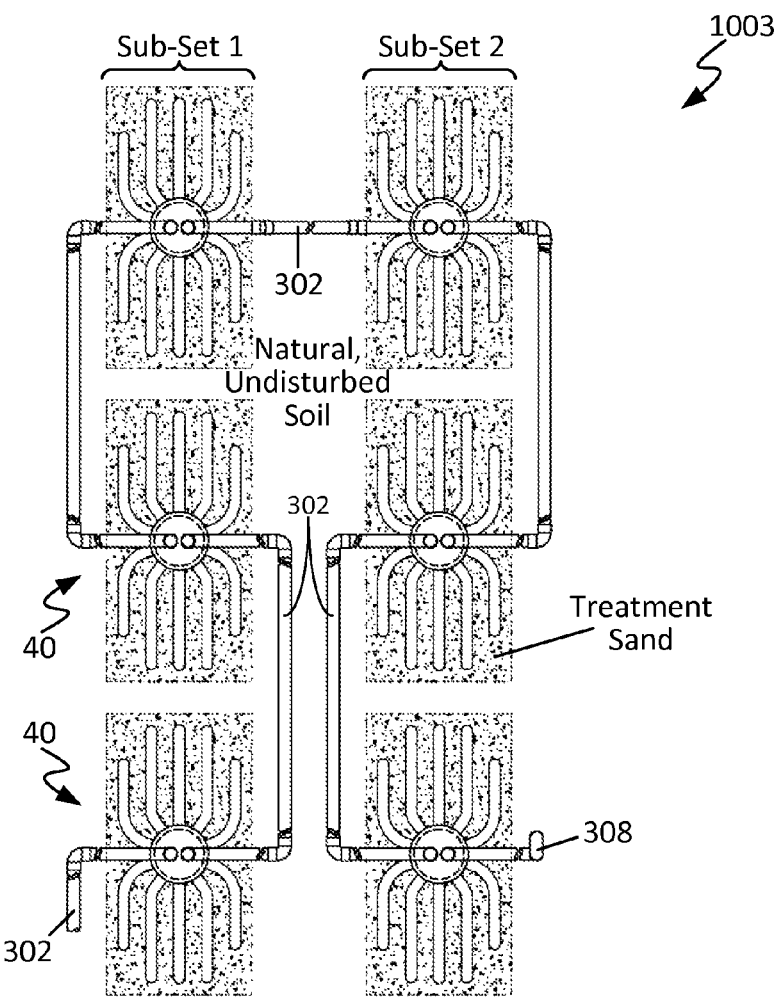
FIG. 27A is a plan view of a narrow/consolidated terraced serial arrangement of rectangular treatment cells configured in accordance with another embodiment of the present disclosure.
Figure 27B:
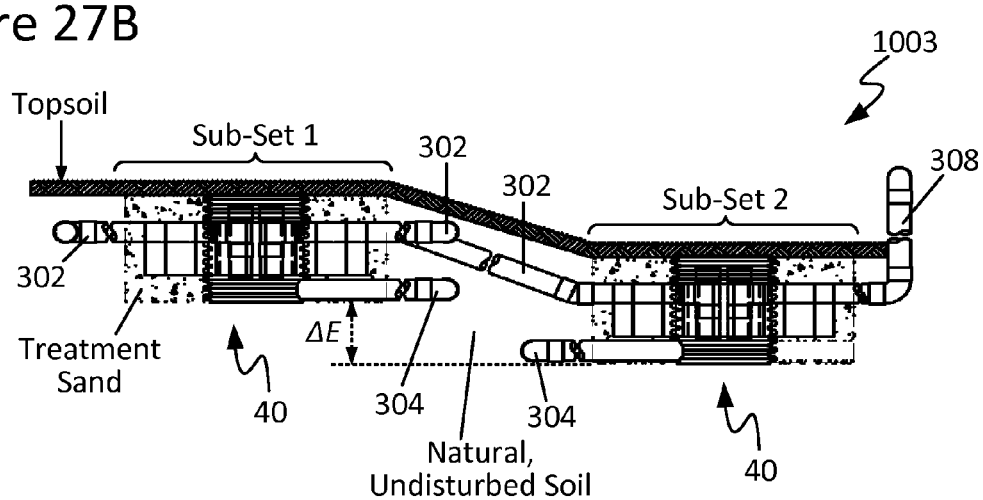
FIG. 27B is a side view of the narrow/consolidated terraced serial arrangement of FIG. 27A.
Figure 28A:
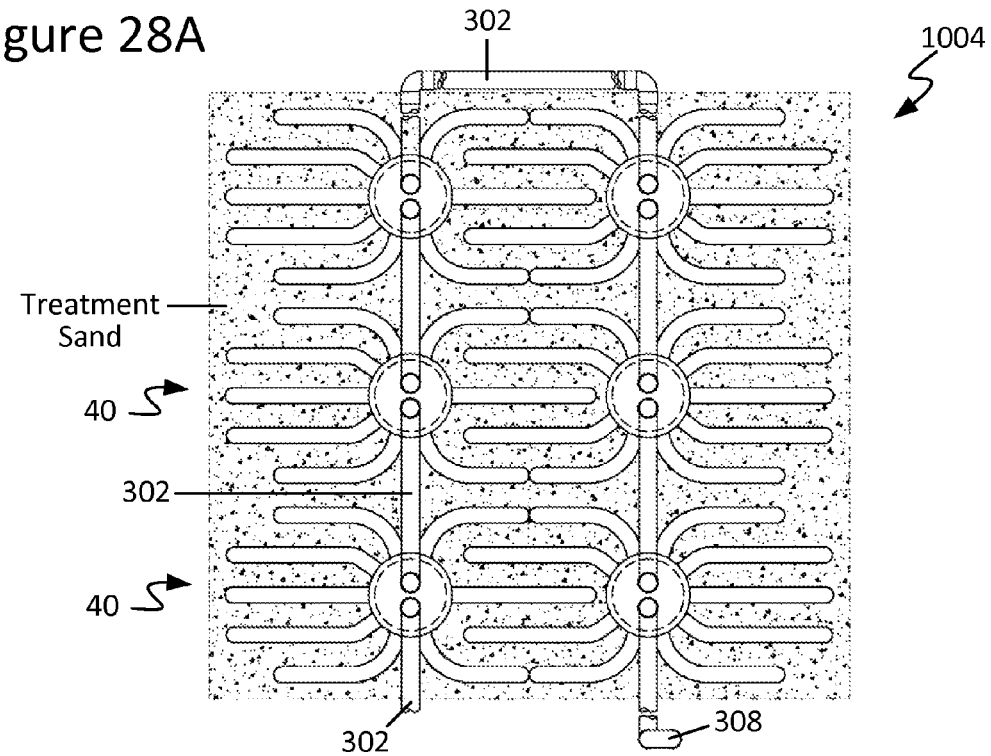
FIG. 28A is a plan view of an interlocking serial arrangement of rectangular treatment cells configured in accordance with an embodiment of the present disclosure.
Figure 28B:
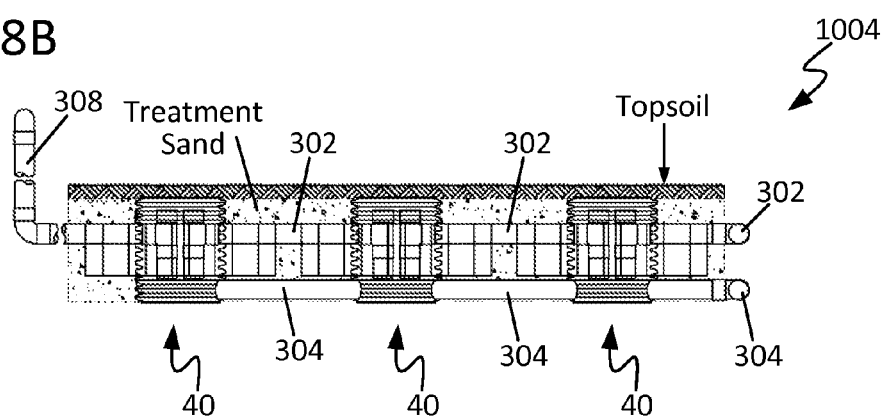
FIG. 28B is a side view of the interlocking serial arrangement of FIG. 28A.
Figure 28C:
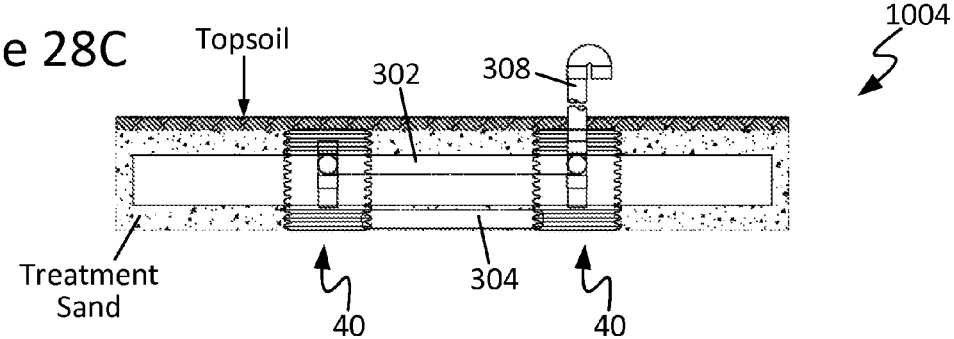
FIG. 28C is another side view of the interlocking serial arrangement of FIG. 28A.

FIGS. 26A-26C illustrate several views of a terraced serial arrangement 1002 of rectangular treatment cells 40 configured in accordance with an embodiment of the present disclosure. FIGS. 27A-27B illustrate several views of a narrow/consolidated terraced serial arrangement 1003 of rectangular treatment cells 40 configured in accordance with another embodiment of the present disclosure. As can be seen, a first sub-set (Sub-Set 1) of rectangular treatment cells 40 may be vertically offset from a second sub-set (Sub-Set 2) thereof by a vertical offset distance ($\Delta E$). The vertical offset distance ($\Delta E$) can be customized, as desired for a given target application or end-use. In accordance with some embodiments, the vertical offset distance ($\Delta E$) may be selected such that the flow of liquid waste from a first distribution unit 100 of a first cell 40 to a second distribution unit 100 of a second cell 40 is within about ±25° of horizontal. As can be seen further, in some cases, natural, undisturbed soil may remain between the rectangular treatment cells 40 (e.g., adjacent to the treatment sand, if provided). In some other cases, however, the soil may be removed and replaced with treatment sand (and/or other treatment/filtration media). For instance, consider FIGS. 28A-28C, which illustrate several views of an interlocking serial arrangement 1004 of rectangular treatment cells 40 configured in accordance with an embodiment of the present disclosure. As can be seen here, the treatment fins 200 of the constituent treatment cells 40 may be arranged so as to at least partially interlock, overlap, or otherwise reside adjacent to one another to facilitate a reduction in the overall system footprint, in accordance with an embodiment. In a more general sense, a first treatment cell 40 or 50 having a first areal footprint (e.g., of X ft$^2$) and a second treatment cell 40 or 50 having a second areal footprint (e.g., Y ft$^2$) may be installed or otherwise arranged such that the first and second areal footprints at least partially overlap one another (e.g., the installation/arrangement is less than X ft$^2$+Y ft$^2$). In some instances, the treatment cells 40 or 50 may be arranged without inclusion of any soil there between; that is, treatment sand (and/or any other treatment/filtration media) may fill the interstitial space between neighboring treatment cells 40 or 50. As will be appreciated in light of this disclosure, the areal footprint of a given treatment cell 40 or 50 may be substantially conformal to the constituent components of a given treatment module 10 (or treatment cell 40 or 50), or it may be the smallest (or other specified) area fitted by a geometric shape (e.g., circle, ellipse, rectangle, square, etc.) that substantially encompasses it (e.g., when viewed from a top-down plan view).

Figure 29A:
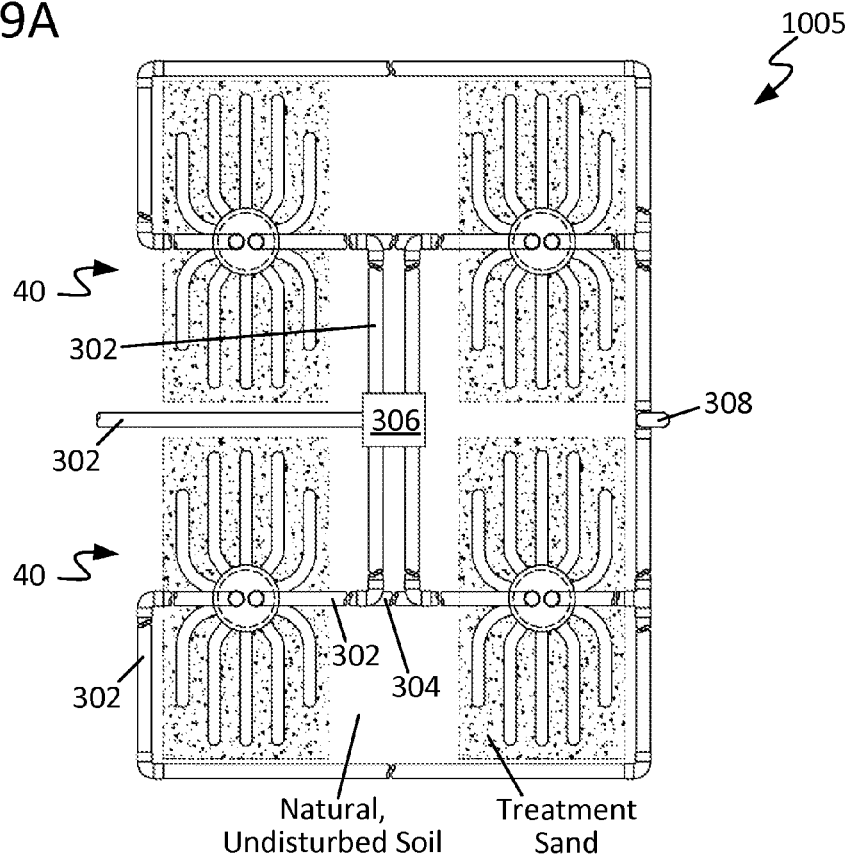
FIG. 29A is a plan view of an arrangement of rectangular treatment cells including a distribution box configured in accordance with an embodiment of the present disclosure.
Figure 29B:
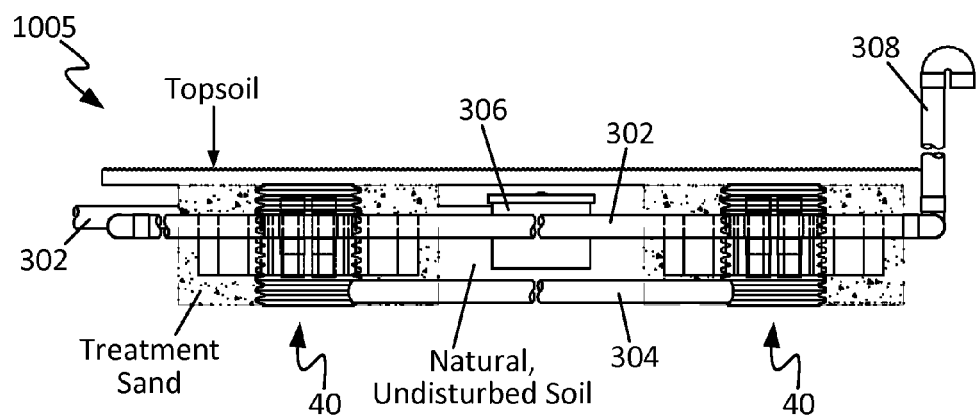
FIG. 29B is a side view of the arrangement of FIG. 29A.

FIGS. 29A-29B illustrate several views of an arrangement 1005 of rectangular treatment cells 40 including a distribution box 306 configured in accordance with an embodiment of the present disclosure. As can be seen here, a distribution box 306 optionally may be in flow communication with one or more downstream treatment cells 40. Distribution box 306 may be configured as typically done and may serve to deliver liquid waste to one or more downstream distribution units 100 from an upstream source (e.g., septic tank).

FIGS. 30A-30C illustrate several views of a multi-level arrangement 1006 of rectangular treatment cells 40 configured in accordance with an embodiment of the present disclosure. As can be seen here, a first tier (Tier 1) of rectangular treatment cells 40 may be disposed at a first depth (e.g., with respect to the ground), and a second tier (Tier 2) may be disposed at a second, different depth (e.g., with respect to the ground). The quantity of tiers, the quantity of treatment cells 40 per tier, and the depth of a given constituent treatment cell 40 may be customized, as desired for a given target application or end-use. It may be desirable, in some instances, to extend the length of the headspace portion 130 of a given distribution unit 100 of a given lower tier, for example, up to or above the ground surface to facilitate access to the interior hollow 105 thereof (e.g., for cleaning) In some cases, a distribution box 306 may be included to facilitate distribution of liquid waste between constituent tiers.

FIGS. 31A-31C illustrate several views of a serial arrangement 1007 of rectangular treatment cells 40 configured in accordance with another embodiment of the present disclosure. As can be seen in this example case, arrangement 1007 is configured for single point discharge. To that end, arrangement 1007 includes a containment liner 320, drainage material 322, and a collection pipe 324, in accordance with an embodiment. It should be noted, however, that the present disclosure is not so limited, as in some other embodiments, multiple discharge/collection points may be provided, as desired.

Liner 320 may serve, at least in part, to collect treated liquid that has passed through a given treatment fin 200 of a given treatment module 10 and to prevent that treated liquid from freely draining to the surrounding soil (or other installation site). To that end, optional liner 320 may be formed from any suitable impermeable or semi-permeable material (or combination of such materials) including, for example: clay; a plastic; a metal (e.g., steel); and/or a combination of any one or more thereof. In a more general sense, optional liner 320 can be formed from any of the example materials discussed above, for instance, with respect to optional media retention layer 220 and optional internal barrier layer 230. In some instances, a first portion of optional liner 320 may be provided with a first degree of permeability (or impermeability), whereas a second portion thereof may be provided with a second, different degree of permeability (or impermeability). For example, a bottom portion of liner 320 may be more permeable than a side portion thereof. Numerous configurations and variations will be apparent in light of this disclosure. In some cases, liner 320 may be flexible (e.g., a bag or sheet), whereas in some other cases, a rigid or semi-rigid liner 320 (e.g., a bin or housing) may be provided. In some instances, optional liner 320 may be affixed to or otherwise supported by a frame (e.g., a metal frame; a composite frame; a wooden frame; etc.), the dimensions of which may be selected, at least in part, based on the dimensions of the one or more treatment modules 10 with which it is associated. In some cases, optional liner 320 may include one or more coatings (e.g., a sealant). The thickness of liner 320 may be customized, as desired for a given target application or end-use, and in some example cases may be in the range of about 0.01-2.0 inches (e.g., about 0.01-0.1 inches, about 0.1-0.5 inches, about 0.5-1.0 inches, about 1.0-1.5 inches, about 1.5-2.0 inches, or any other sub-range in the range of about 0.01-2.0 inches). Other suitable configurations for liner 320 will depend on a given application and will be apparent in light of this disclosure.

Drainage material 322 may be disposed between a given treatment module 10 and underlying liner 320. Drainage material 322 may include any of the example materials (e.g., aggregate, coarse material, fibers, etc.) discussed above, for instance, with respect to porous material 210, in accordance with some embodiments. In some cases, a constituent piece/portion of such drainage material 322 may have an average thickness (e.g., width/diameter), for instance, of: about 1/64 inch or greater; about 1/32 inch or greater; about 1/16 inch or greater; about 1/8 inch or greater; about 1/4 inch or greater; about 3/8 inch or greater; about 1/2 inch or greater; about 1 inch or greater; or about 1½ inches or greater. In some cases, a constituent piece/portion of such drainage material 322 may have an average length, for instance, in the range of about 0.25-1.5 inches (e.g., about 0.25-0.5 inches, about 0.5-0.75 inches, about 0.75-1.0 inches, about 1.0-1.25 inches, about 1.25-1.5 inches, or any other sub-range in the range of about 0.25-1.5 inches). Other suitable drainage materials 322 will depend on a given application and will be apparent in light of this disclosure.

As can be seen, collection pipe 324 may be disposed, at least in part, within drainage material 322 under a given treatment module 10. In accordance with some embodiments, collection pipe 324 may be formed from any of the example materials discussed above, for instance, with respect to distribution unit 100. Also, the dimensions of collection pipe 324 may be customized, as desired for a given target application or end-use. In accordance with an embodiment, collection pipe 324 may be configured to receive treated liquid that has passed through drainage material 322 and to deliver that treated liquid downstream to an outlet point 325. To that end, collection pipe 324 may have one or more apertures (e.g., holes, perforations, elongate slots, or other orifices) defined in its sidewall, allowing liquid to flow into pipe 324. In accordance with an embodiment, the end of collection pipe 324 having outlet point 325 may pass through liner 320. In some such cases, a bulkhead (or other suitable interface) may be included at the location where collection pipe 324 passes through liner 320 to provide a liquid-tight sealing arrangement between pipe 324 and liner 320. Collection pipe 324 may have any desired geometry (e.g., linear, V-shaped, etc.), and in some instances may be graded (e.g., within about ±25° of horizontal). Other suitable configurations for collection pipe 324 will depend on a given application and will be apparent in light of this disclosure.

In accordance with some embodiments, liquid received from outlet point 325 of collection pipe 324 may be directed, for example, back into an upstream septic tank and/or one or more additional treatment systems or devices. For instance, treated liquid may be collected from collection pipe 324 and subjected to one or more additional treatment processes, such as: nitrification; denitrification; chlorination; ultraviolet germicidal irradiation (UVGI) or other disinfection process; recirculation; and/or any other desired liquid waste treatment process, as desired for a given target application or end-use.

It should be noted that any of the example system arrangements (e.g., arrangements 1000, 1001, 1002, 1003, 1004, 1005, 1006, and/or 1007) discussed herein may utilize rectangular treatment cells 40, rounded treatment cells 50, and/or any other treatment cell geometry, as desired, in accordance with some embodiments. Numerous suitable configurations and arrangements will be apparent in light of this disclosure.

In some cases, a given treatment module 10 may be coupled with a recharge pipe or other access point by which substances such as, for instance, nutrients, additives, microorganisms, carbon, and/or sulfur, among others, may be delivered without having to dig up or otherwise disassemble the treatment system. In some instances, such an access point may facilitate bacterial injection/seeding. In accordance with some embodiments, accumulated sludge/solids may be removed from a given distribution unit 100, for example, by removing cover 134 (if optionally included) and vacuuming out sump portion 110. In some instances, a given distribution unit 100 may be cleaned out individually. In some cases, connections between sump portions 110 of coupled distribution units 100 (e.g., via pipes 304) may facilitate cleaning across multiple distribution units 100.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. A liquid waste treatment system comprising:
   a central distribution unit having an interior and an exterior and comprising a sidewall portion defining one or more perforations in the sidewall of the central distribution unit; and
   a plurality of treatment fins external to the central distribution unit, extending radially from the central distribution unit, and in flow communication with its interior via a sleeve that surrounds the central distribution unit, housing a common space between the exterior of the central distribution unit and the sleeve, from which the plurality of treatment fins are fed, the plurality of treatment fins comprising:
   a porous medium; and
   an outer fabric layer at least partially surrounding the porous medium.

2. The liquid waste treatment system of claim 1, wherein the central distribution unit is a distribution box.

3. The liquid waste treatment system of claim 1, wherein the central distribution unit is a corrugated conduit of at least one of a generally cylindrical and/or generally prismatic shape.

4. The liquid waste treatment system of claim 1, wherein the central distribution unit further comprises at least one of:
   one or more skimmer tabs disposed within its interior over its sidewall portion; and/or
   one or more ridges disposed along its exterior over its sidewall portion.

5. The liquid waste treatment system of claim 1, wherein the porous medium comprises at least one of randomly distributed coarse fibers, coarse sand, stone, gravel, polymeric beads, glass, carbon blocks, natural aggregate, synthetic aggregate, polypropylene, polyethylene, and/or polystyrene.

6. The liquid waste treatment system of claim 1, wherein the outer fabric layer comprises at least one of polypropylene, polyethylene, and/or polyester fabric.

7. The liquid waste treatment system of claim 1, wherein:
   the plurality of treatment fins further comprises a semi-permeable or impermeable barrier layer disposed within the porous medium; and
   there is space between the outer layer and the barrier layer, the space filled at least partially with the porous medium.

8. The liquid waste treatment system of claim 7, wherein the barrier layer is a partial layer that surrounds less than the total volume of the porous medium.

9. The liquid waste treatment system of claim 7, wherein the barrier layer comprises at least one of polypropylene, polyethylene, and/or polyester fabric.

10. The liquid waste treatment system of claim 1, wherein the plurality of treatment fins further comprises a plurality of semi-permeable or impermeable barrier layers disposed within the porous medium, wherein:
    there is space between adjacent barrier layers, the space filled at least partially with the porous medium; and
    each successive barrier layer, going from innermost to outermost, is of at least one of greater surface area and/or size than one before it.

11. The liquid waste treatment system of claim 1, wherein at least one of the plurality of treatment fins further comprises a plurality of semi-permeable or impermeable barrier layers disposed within the porous medium, wherein:
    there is space between adjacent barrier layers, the space filled at least partially with the porous medium; and
    each successive barrier layer, going from innermost to outermost, is of at least one of lesser surface area and/or size than one before it.

12. The liquid waste treatment system of claim 1, wherein the plurality of treatment fins further comprises at least one pipe disposed within the porous medium and coupled with the common space defined by the sleeve, and wherein the at least one pipe is configured to permit air flow within the plurality of treatment fins.

13. The liquid waste treatment system of claim 1, further comprising treatment material surrounding at least one of the central distribution unit and/or the plurality of treatment fins, the treatment material comprising at least one of treatment sand, crushed stone, gravel, soil, natural aggregate, synthetic aggregate, glass beads, polymer beads, expanded polymer beads, organic material, cellulose, and/or a combination of any one or more thereof.

14. The liquid waste treatment system of claim 1, wherein the system is further configured to provide for at least one of recirculation and/or denitrification of the liquid waste.

15. A liquid waste treatment system comprising:
    a first treatment cell comprising a first liquid waste treatment system configured according to claim 1, wherein the central distribution unit of the first treatment cell is a first central distribution unit; and
    a second treatment cell comprising a second liquid waste treatment system configured according to claim 1, wherein the central distribution unit of the second treatment cell is a second central distribution unit;
    wherein the first treatment cell is configured to be positioned at a first depth with respect to the ground and the second treatment cell is configured to be positioned at a different second depth with respect to the ground,
    wherein liquid waste is fed sequentially from the first central distribution unit to the second central distribution unit.

16. A liquid waste treatment system comprising:
    a first treatment cell comprising a first liquid waste treatment system configured according to claim 1, the first treatment cell having an areal footprint of X ft$^2$; and
    a second treatment cell comprising a second liquid waste treatment system configured according to claim 1, the second treatment cell having an areal footprint of Y ft$^2$;
    wherein the first and second treatment cells are installed in an area that is less than X ft$^2$ +Y ft$^2$.

17. The liquid waste treatment system of claim 1, wherein the porous medium facilitates bacterial growth.

18. The liquid waste treatment system of claim 17, wherein the porous medium is coated with a substance that increases surface area, increases porosity, increases or reduces surface tension, and/or improves bacterial growth.

19. The liquid waste treatment system of claim 17, wherein the porous medium provides a surface area that is more than five times an outer surface area of the treatment fin.

20. The liquid waste treatment system of claim 17, wherein the porous medium provides a surface area that is more than twenty times an outer surface area of each of the plurality of treatment fins.

21. The liquid waste treatment system of claim 17, wherein the outer surface area-to-volume ratio ($ft^2/ft^3$) of each of the plurality of treatment fins is greater than 10:1.

22. The liquid waste treatment system of claim 1, wherein the porous medium may occupy at least 60% of the volume of each of the plurality of treatment fins.

23. The liquid waste treatment system of claim 7, wherein the semi-permeable or impermeable barrier layer is located in a lower half of the treatment fin.

24. The liquid waste treatment system of claim 7, wherein the semi-permeable or impermeable barrier layer is U-shaped.

* * * * *